US012761460B2

(12) United States Patent
Gafford et al.

(10) Patent No.: US 12,761,460 B2
(45) Date of Patent: Oct. 13, 2026

(54) APPARATUSES AND METHODS FOR ENDOSCOPE LASER FIBER STEERING

(71) Applicant: EndoTheia, Inc., Nashville, TN (US)

(72) Inventors: Joshua Gafford, Nashville, TN (US); Patrick Anderson, Nashville, TN (US); Scott Webster, Nashville, TN (US); Daniel Caleb Rucker, Nashville, TN (US); Jake Childs, Nashville, TN (US); Robert Webster, Nashville, TN (US); Tyler Efird, Nashville, TN (US); Mina Ann Schaafsma, Nashville, TN (US)

(73) Assignee: EndoTheia, Inc., Nashville, TN (US)

( * ) Notice: Subject to any disclaimer, the term of this patent is extended or adjusted under 35 U.S.C. 154(b) by 0 days.

(21) Appl. No.: 19/219,806

(22) Filed: May 27, 2025

(65) Prior Publication Data

US 2025/0370245 A1 Dec. 4, 2025

Related U.S. Application Data

(60) Provisional application No. 63/651,972, filed on May 25, 2024.

(51) Int. Cl.

| | |
|---|---|
| ***G02B 23/00*** | (2006.01) |
| ***G02B 23/24*** | (2006.01) |
| ***H01S 3/067*** | (2006.01) |

(52) U.S. Cl.

CPC ..... *G02B 23/2469* (2013.01); *G02B 23/2476* (2013.01); *H01S 3/06708* (2013.01)

(58) Field of Classification Search

CPC ............ H01S 3/06708; G02B 23/2469; G02B 23/2476

See application file for complete search history.

(56) References Cited

U.S. PATENT DOCUMENTS

| | | | | |
|---|---|---|---|---|
| 12,478,445 B2 * | 11/2025 | Riojas | A61B 1/0052 |
| 2017/0079716 A1 * | 3/2017 | Zerfas | A61B 18/22 |
| 2020/0390456 A1 * | 12/2020 | Nguyen | A61B 17/00 |
| 2024/0122647 A1 * | 4/2024 | Vandebroek | A61B 18/1492 |
| 2024/0138865 A1 * | 5/2024 | Gafford | A61B 17/221 |

OTHER PUBLICATIONS

International Search Report and Written Opinion issued in the related Application Serial No. PCT/US2025/031031 on Aug. 1, 2025.

* cited by examiner

*Primary Examiner* — Gerald J Sufleta, II

(74) *Attorney, Agent, or Firm* — Holland & Knight LLP; Matthew C. Cox; Forrest S. Tinnin

(57) ABSTRACT

The present disclosure provides for an endoscopic apparatus. The apparatus may include a sheath. The sheath may include a first tube concentrically nested within a second tube. The apparatus may further include a laser fiber disposed in the sheath and movable therein along a longitudinal axis of the sheath. The sheath may be actuable to form a first bend by relative axial translation between the first tube and the second tube. Advancing movements of the laser fiber may cause a distal tip of the laser fiber to project out of a distal end of the sheath; and retreating movements of the laser fiber may cause the distal tip of the laser fiber to retract towards the distal end of the sheath.

20 Claims, 64 Drawing Sheets

APPARATUSES AND METHODS FOR ENDOSCOPE LASER FIBER STEERING

CROSS-REFERENCES TO RELATED APPLICATIONS

This application is a non-provisional of and claims priority to and benefit of U.S. Provisional Application No. 63/651,972, filed May 25, 2024 entitled "APPARATUSES AND METHODS FOR ENDOSCOPE LASER FIBER STEERING," which is hereby incorporated by reference in its entirety.

STATEMENT REGARDING FEDERALLY SPONSORED RESEARCH OR DEVELOPMENT

Not Applicable.

REFERENCE TO SEQUENCE LISTING OR COMPUTER PROGRAM LISTING APPENDIX

Not Applicable.

BACKGROUND

The present disclosure relates to endoscopic surgical procedures. More particularly, the present disclosure relates to enhanced apparatuses and methods of ureteroscopic stone lithotripsy.

Each year 3.5 million people suffer from kidney stones (1), with 1 in 5 requiring an intervention (2; 3). Of these 700,000 patients, 63% have small stones (4) and are well-served by the standard of care (including flexible ureteroscopy and external shock wave lithotripsy). However, surgeons face a troubling dilemma (5) in how to treat the remaining 37% of patients (260,000 per year in the USA alone) who have larger stones (11 mm or larger in diameter) (5).

Flexible ureteroscopy is highly effective at removing large stones, but dexterity limitations in laser aiming and stone basketing make procedure durations long and highly variable (6), with many excessively long (defined clinically as exceeding 2 hours (6; 7; 8)). This is particularly true in lower-pole cases where lack of dexterity makes it extremely challenging to basket all stones effectively (4).

Many laser fiber systems have been developed to enable minimally-invasive endoscopic lithotripsy of ureteral and renal calculi. At a minimum, these systems consist of (1) a laser generator which houses the laser source and amplifying hardware for generating the laser energy, and (2) a laser fiber for focusing the laser energy and delivering it to the surgical site. Common laser sources include pulsed-dye, Holmium: Yttrium-Aluminum-Garnet (Ho:YAG), and Thulium. Laser fibers typically consist of a silica core which transmits the laser energy, as well as a cladding layer to contain the energy within the core, promoting internal reflection and preventing energy leakage/losses. Laser fibers contain a jacket layer for further insulation and protection, as well as an (optional) low-friction PTFE layer to facilitate passage through delivery tools and ureteroscopes.

In the context of a urological procedure in which laser energy is employed to break down ureteral and renal stones via lithotripsy, the laser fiber is delivered to the surgical site via a flexible or semi-rigid ureteroscope. The ureteroscope can be manipulated to direct the proximal end of the laser fiber onto the stone of interest, and the physician can use a foot pedal or hand control to trigger laser pulses and transmit laser energy to the fiber tip to fracture the stone. The laser energy can be shaped and configured through variations in amplitude and pulse width to 'fracture' the stone (break a large piece into many smaller pieces, to be captured later with a basket) or 'dust' the stone (slowly shaving away a large stone, generating dust-like residuals that can be naturally passed by the patient).

Dusting is quickly becoming the preferred approach by clinicians as it can improve procedure times compared to fragmenting and basketing. A drawback of the prior art is the fact that the laser can only be inserted into and retracted from the surgical field in a linear fashion. Given this limitation, physicians must actively reposition the scope constantly to achieve this effect and direct the tip of the laser fiber across the stone (i.e. 'painting' the stone). This affects procedural efficiency, and can be especially problematic in the lower calyces where stones may be located around a corner in a calyx that cannot be accessed directly by the ureteroscope.

In addition to ureteroscopic stone lithotripsy, steerable laser fiber technology could also have utility in other urologic procedures. Candidates include trans-urethral bladder cancer resection, and treating benign prostate hy-perplasia via holmium or thulium laser enucleation. There may also be applications in womens' health, including the treatment of cervical cancer. Further, steerable laser technology could be used in laryngeal surgery (wherein fiber lasers are used to remove vocal fold polyps or laryngeal cancer) and cholangioscopy (wherein fiber lasers are used to break down and remove gallstones).

It would be advantageous to provide an ureteroscope, or components thereof, that provides enhanced steerable laser functionality.

BRIEF SUMMARY

This Brief Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One aspect of the present disclosure is an endoscopic apparatus. The apparatus may include a sheath. The sheath may include a first tube concentrically nested within a second tube. The apparatus may further include a laser fiber disposed in the sheath and movable therein along a longitudinal axis of the sheath. The first tube may include a first deflectable section, and the second tube may include a second deflectable section. The first and second deflectable sections may be selectively weakened portions of the first and second tubes that are angularly oriented, relative to a longitudinal axis of the sheath, in directions that are offset from each other by an angle equal to or less than one-hundred and eighty degrees. The first and second tubes may be joined at a location distal to the first and second deflectable sections.

The sheath may be actuable to form a first bend by relative axial translation between the first tube and the second tube. Advancing movements of the laser fiber may cause a distal tip of the laser fiber to project out of a distal end of the sheath; and retreating movements of the laser fiber may cause the distal tip of the laser fiber to retract towards the distal end of the sheath.

Another aspect of the present disclosure is a method of performing endoscopic surgery. The method may include providing the sheath and the laser fiber disposed in the sheath. The method may further include forming the first bend in the sheath, wherein forming the first bend causes the distal end of the sheath to be steered toward an anatomical region within a patient. The method may further include advancing the laser fiber relative to the sheath, wherein advancing the laser fiber relative to the sheath causes a distal tip of the laser fiber to project out of the distal end of the sheath, such that the distal tip of the laser fiber is positioned about an object located within the anatomical region. The method may further include transmitting energy along the laser fiber and from the distal tip of the laser fiber to the object.

In some embodiments, the laser fiber includes a glass fiber silica core. The glass silica core may be configured to deliver one of pulsed-dye, Ho:YAG, or Thulium energy. The laser fiber may further include a cladding layer disposed around the glass silica core. The cladding layer may be made of reflective silica.

In some embodiments, the apparatuses and methods discussed herein further provide that first tube further includes a third deflectable section and the second tube includes a fourth deflectable section. The third and fourth deflectable sections may be selectively weakened portions of the first and second tubes that are angularly oriented, relative to the longitudinal axis of the sheath, in directions that are offset from each other by the angle equal to or less than one-hundred and eighty degrees. In such cases, the location at which the first and second tubes are joined is distal to the third and fourth deflectable sections. In turn, the sheath may be actuable to form a second bend by the relative axial translation between the first tube and the second tube. For instance, the first bend may be in an opposite direction of the second bend.

In some embodiments, the sheath includes a rigid section located proximal relative to the first deflectable section of the first tube and the second deflectable section of the second tube. In some cases, the rigid section may additionally be located proximal relative to the third deflectable section of the first tube and the fourth deflectable section of the second tube.

Numerous other objects, advantages and features of the present disclosure will be readily apparent to those of skill in the art upon a review of the following drawings and description of a preferred embodiment.

DETAILED DESCRIPTION

While the making and using of various embodiments of the present invention are discussed in detail below, it should be appreciated that the present invention provides many applicable inventive concepts that are embodied in a wide variety of specific contexts. The specific embodiments discussed herein are merely illustrative of specific ways to make and use the invention and do not delimit the scope of the invention. Those of ordinary skill in the art will recognize numerous equivalents to the specific apparatus and methods described herein. Such equivalents are considered to be within the scope of this invention and are covered by the claims.

Figure 1:
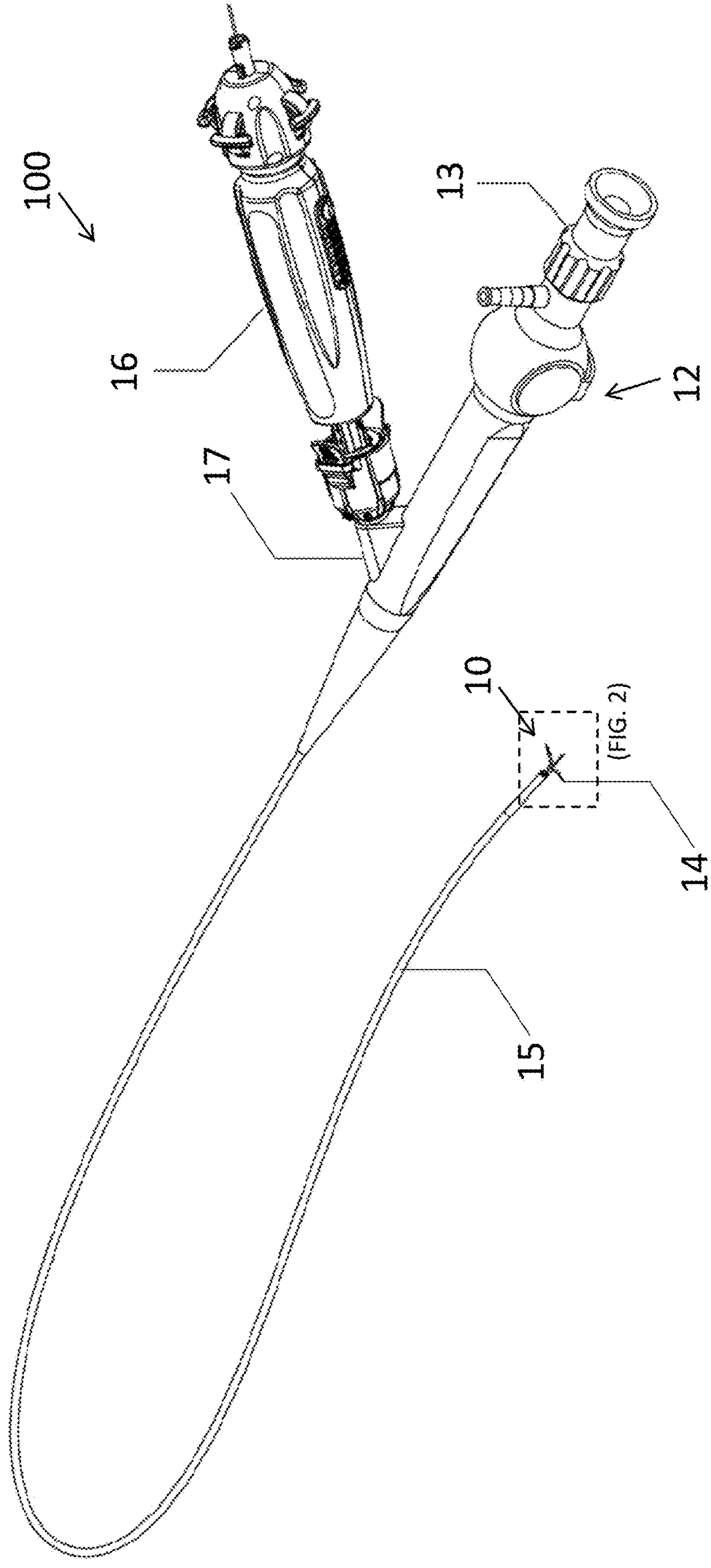
FIG. 1 is a perspective view of an apparatus for endoscopic laser surgery, according to some embodiments of the present disclosure.

Referring now to FIG. 1, an apparatus 100 for endoscopic laser surgery is shown, according to some embodiments of the present disclosure. The apparatus 100 may include an apparatus 10 and an endoscope 12 (e.g., a flexible endoscope, a ureteroscope, a flexible ureteroscope, a rigid endoscope, a rigid ureteroscope, etc.). For instance, the apparatus 10 may be attached to the endoscope 12.

The apparatus 10 may utilize a steerable laser system, thereby providing a minimally-invasive medical device for performing laser surgery. For example, the apparatus 10 may include a laser-sheath assembly 14 and a user interface 16. The endoscope 12 may include a handle 13 and tubing 15. The laser-sheath assembly 14 of the apparatus 10 may be delivered through the tubing 15 of the endoscope 12, and extend from a distal tip 22 of the tubing 15 (shown with reference to FIG. 2) when deployed. The user interface 16 of the apparatus 10 may be rigidly attached to a working port 17 of the endoscope 12, and be configured to control the laser-sheath assembly 14.

Figure 2:
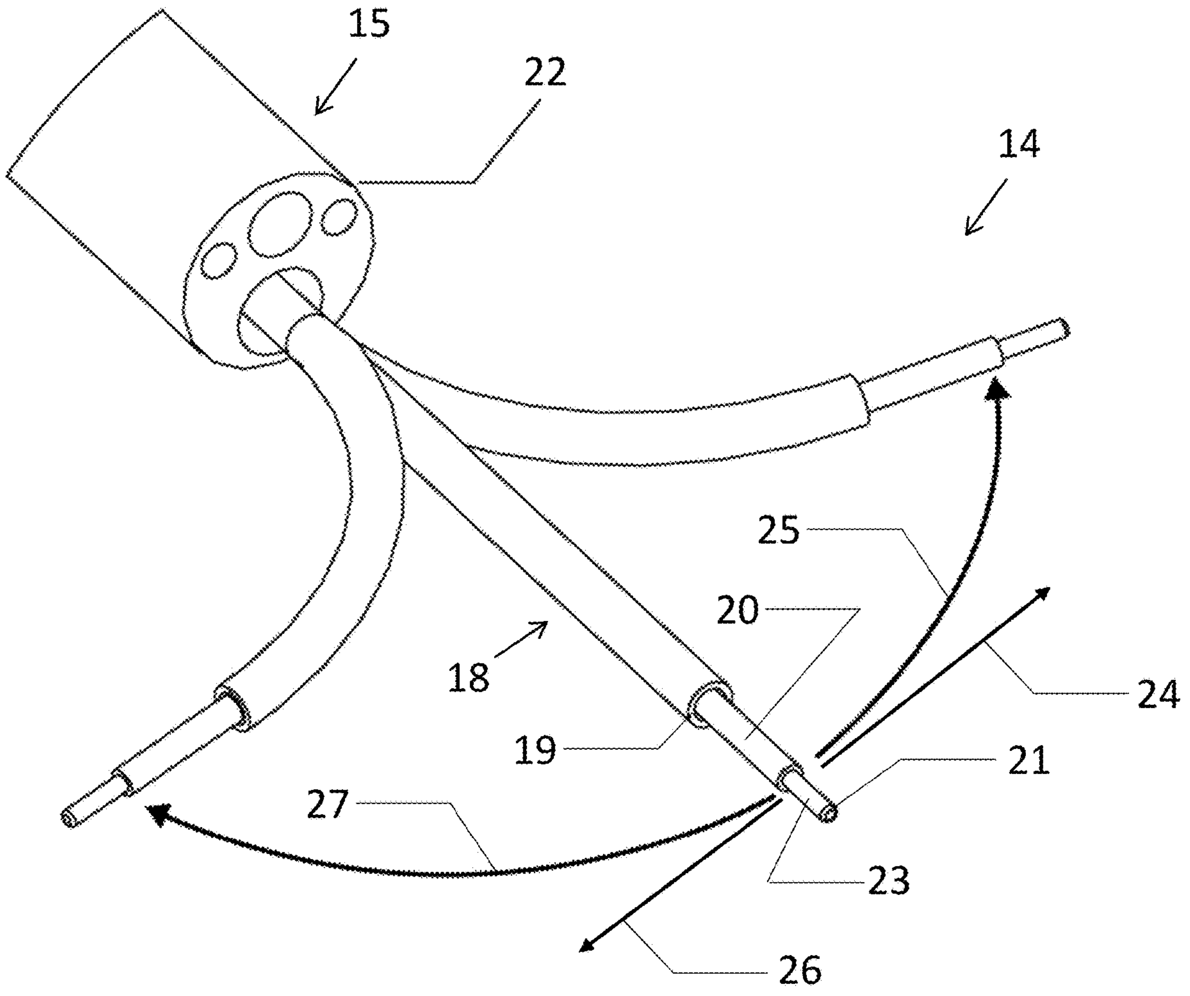
FIG. 2 is a perspective view of a distal end of a sheath of the apparatus of FIG. 1, according to some embodiments of the present disclosure.

Referring now to FIG. 2, the laser-sheath assembly 14 is shown in greater detail, according to some embodiments of the present disclosure. The laser-sheath assembly 14 may include a sheath 18 having a distal end 19. The laser-sheath assembly 14 may further include a laser fiber 20. The laser fiber 20 may be disposed in the sheath 18 and have a distal tip 21. As discussed in greater detail below, the laser fiber 20 may be movable within the sheath 18 along a longitudinal axis 60 of the sheath 18 (shown with reference to FIG. 12, for example). Generally, the laser fiber 20 may be a laser fiber for delivering high-powered laser energy to the surgical site. The sheath 18 may be a flexible, steerable sheath, designed to deliver and/or point the laser fiber 20 to the location of the surgical site and manipulate the orientation of the laser fiber 20 separately from the endoscope 12.

In some embodiments, the laser-sheath assembly 14 is bi-directionally deflectable. In particular, the distal end 19 of the sheath 18 (and thus the distal tip 21 of the laser fiber 20) may be bi-directionally deflectable. For example, the laser-sheath assembly 14 may be deflected in a first direction 24, such that a distal tip 21 of the laser fiber 20 travels along a first path of curvature 25 in said first direction 24; and the laser-sheath assembly 14 may be deflected in a second direction 26 opposite the first direction 24, such that the distal tip 21 travels along a second path of curvature 27 opposite the first path of curvature 25. The user interface 16 (shown with reference to FIG. 1) may include requisite control surfaces that can be used to insert/retract, rotate, and deflect the sheath 18 (e.g., the deflection of the distal end 19) and, thereby, the laser fiber 20 disposed therein. Additionally, the user interface 16 may be configured to drive the insertion and retraction of the laser fiber 20 with respect to the sheath 18. Further, the user interface 16 may be configured to drive the insertion, retraction, and rotation of both the user interface 16 and the steerable sheath 18 (separately from the endoscope 12 through which the laser-sheath assembly 14 is passed).

Figure 3:
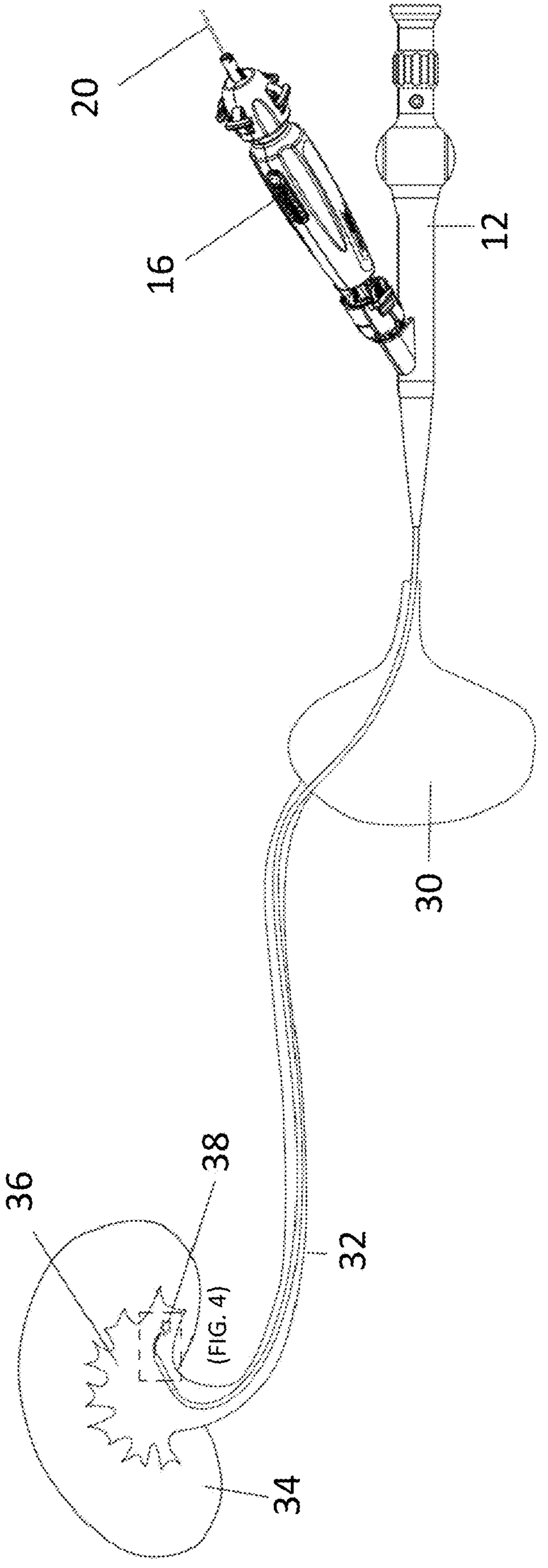
FIG. 3 is a schematic of the apparatus of FIG. 1 being used to perform endoscope surgery, according to some embodiments of the present disclosure.
Figure 4:
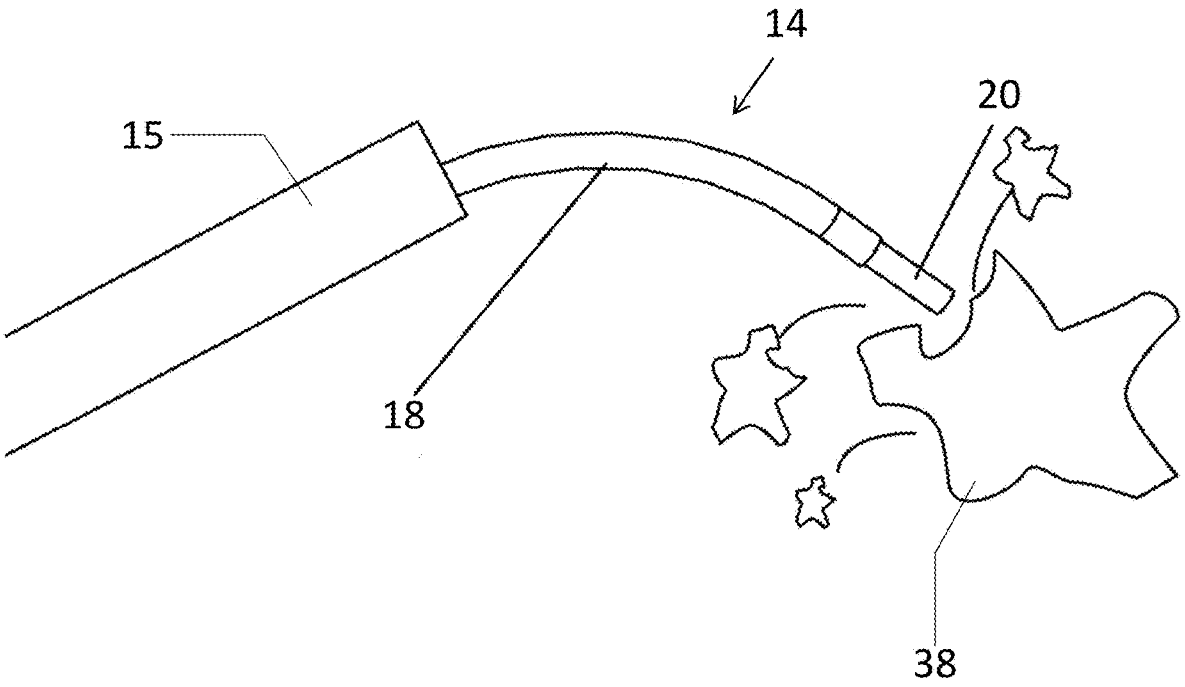
FIG. 4 is a detailed schematic of the apparatus of FIG. 3 performing endoscopic surgery, according to some embodiments of the present disclosure.

Referring now to FIGS. 3 and 4, an exemplary implementation of the apparatus 100 is shown, according to some embodiments of the present disclosure. In some embodiments, the laser-sheath assembly 14 may be passed through a bladder 30, into a calyces 36 of a kidney 34 via a ureter 32, such that the laser fiber 20 may apply laser energy, such as but not limited to, via a laser pulse to tissue or a stone 38 (e.g., calculi). The apparatus 10 may facilitate such functions of the laser-sheath assembly 14 without moving the endoscope 12, by instead steering the laser fiber 20 itself.

Figure 5:
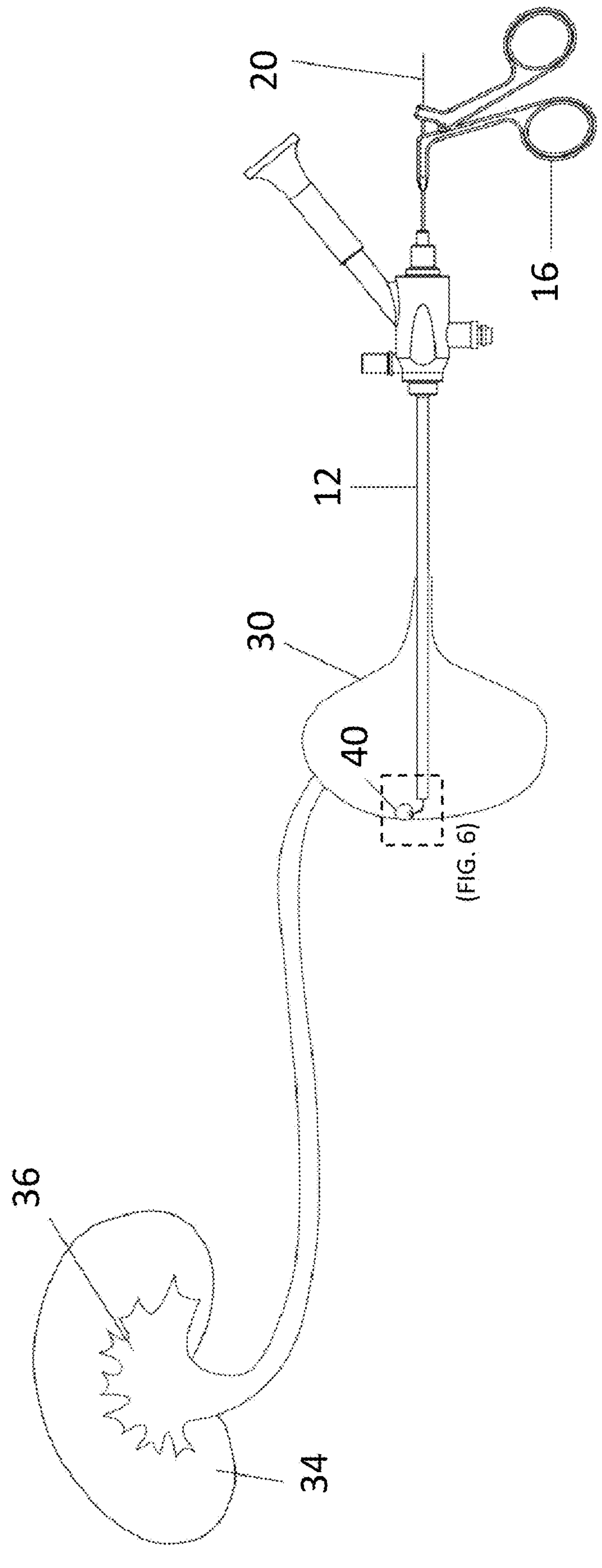
FIG. 5 is a schematic of the apparatus of FIG. 1 being used to perform endoscopic surgery, according to other embodiments of the present disclosure.
Figure 6:
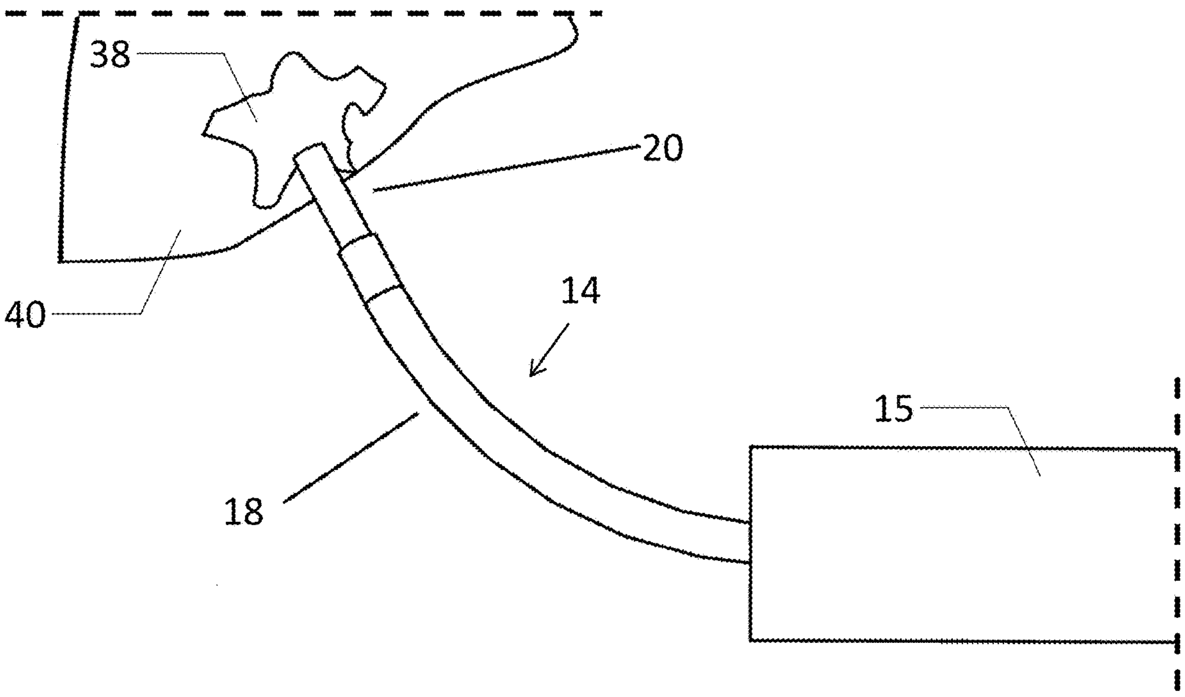
FIG. 6 is a detailed schematic of the apparatus of FIG. 5 performing endoscopic surgery, according to some embodiments of the present disclosure.

Referring now to FIGS. 5 and 6, an exemplary implementation of the apparatus 100 is shown, according to further embodiments of the present disclosure. In such embodiments, the endoscope 12 may be a rigid endoscope. In some embodiments, the laser-sheath assembly 14 may be passed into the bladder 30, such that the laser fiber 20 may apply laser energy, such as but not limited to, via a laser pulse in a lesion 40 of the bladder 30. Accordingly, the apparatus 100 disclosed herein may enables physicians to target and apply laser energy to a lesion or diseased tissue to be removed.

Figure 7:
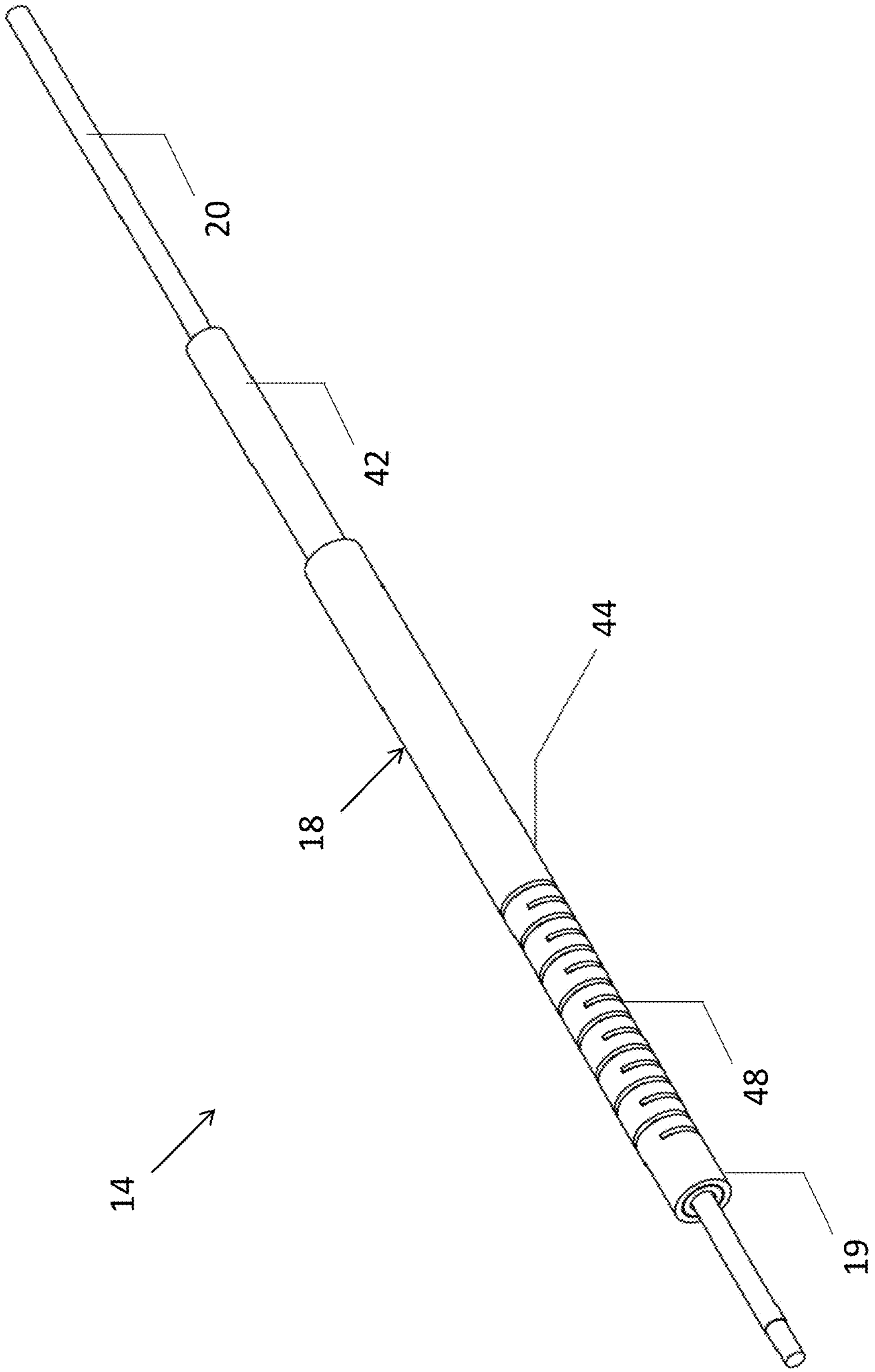
FIG. 7 is a perspective view of a laser-sheath assembly for an endoscopic apparatus, according to some embodiments of the present disclosure.
Figure 8:
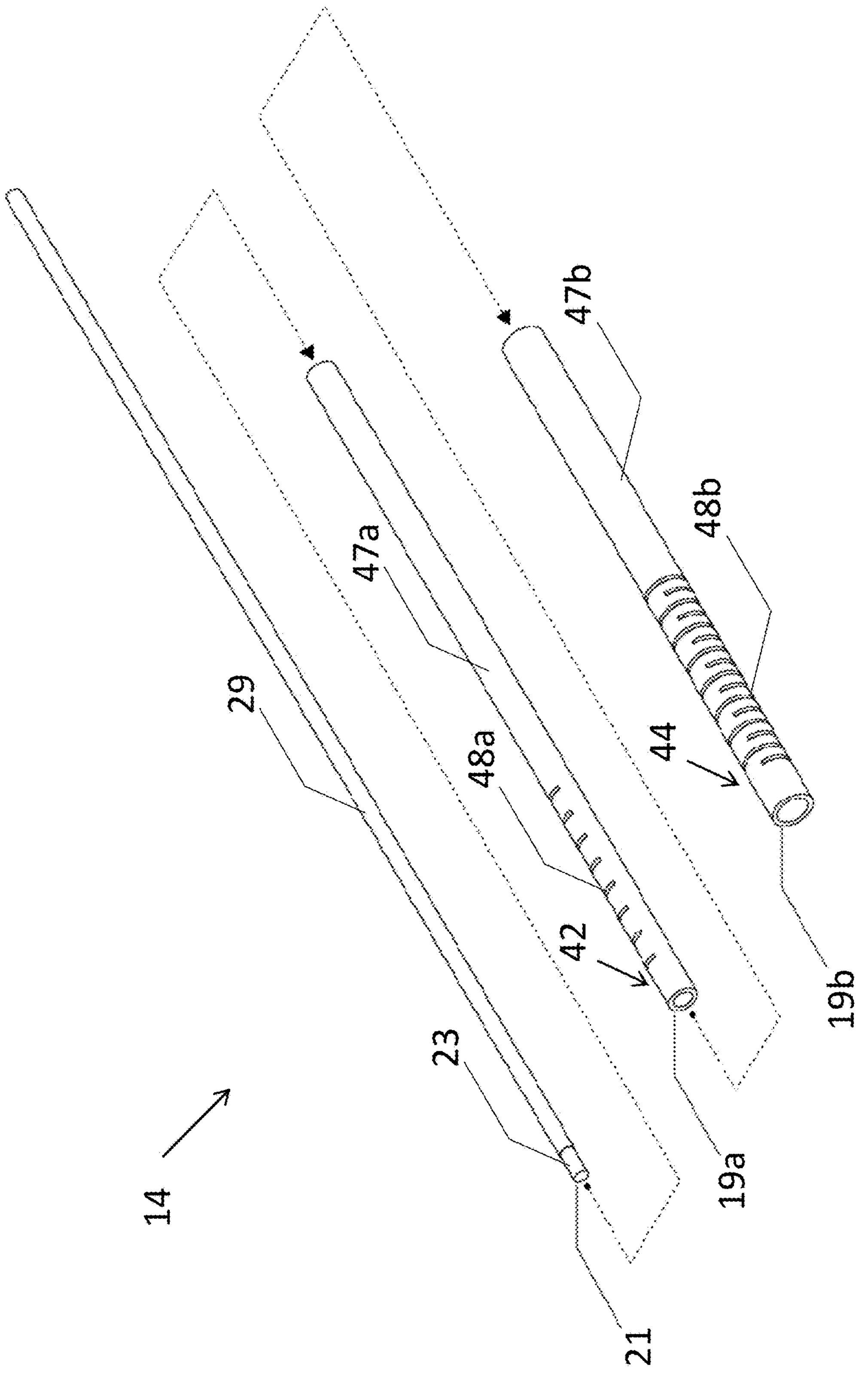
FIG. 8 is an exploded view of the assembly of FIG. 7, according to some embodiments of the present disclosure.

Referring now to FIGS. 7 and 8, the sheath-laser assembly 14 is shown, according to some embodiments of the present disclosure. The sheath 18 of the sheath laser-sheath assembly 14 may include a first (inner) tube 42 disposed in a second (outer) tube 44. As suggested above, the sheath 18 may be disposed around the laser fiber 20, which is configured to bend at its distal end. In some embodiments, the first tube 42 is concentrically nested within the second tube 44. As discussed in greater detail below, the sheath 18 may include a first deflectable section 48.

Figure 9:
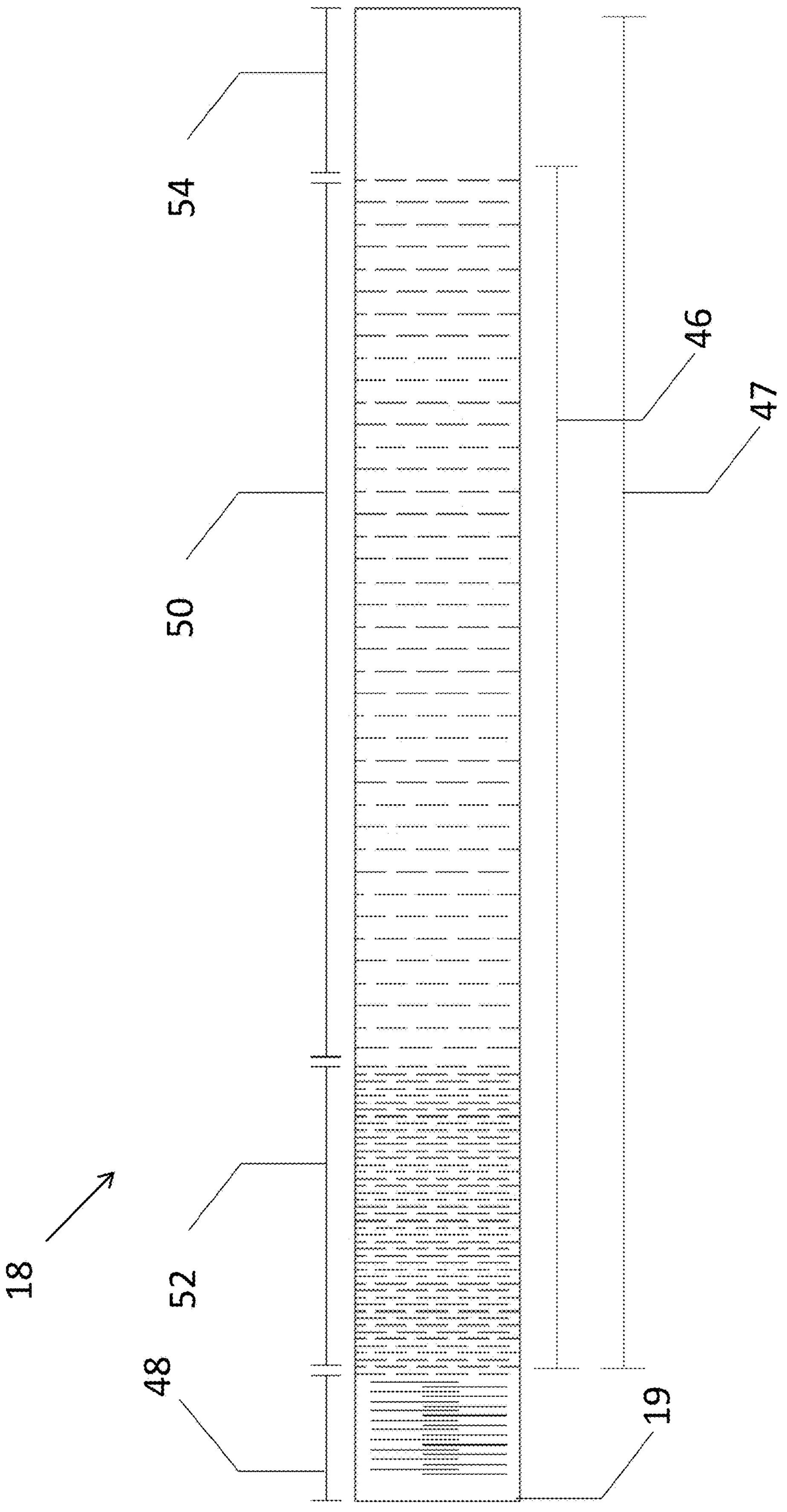
FIG. 9 is a detailed flattened tube view of the assembly of FIG. 7, according to some embodiments of the present disclosure.
Figure 10:
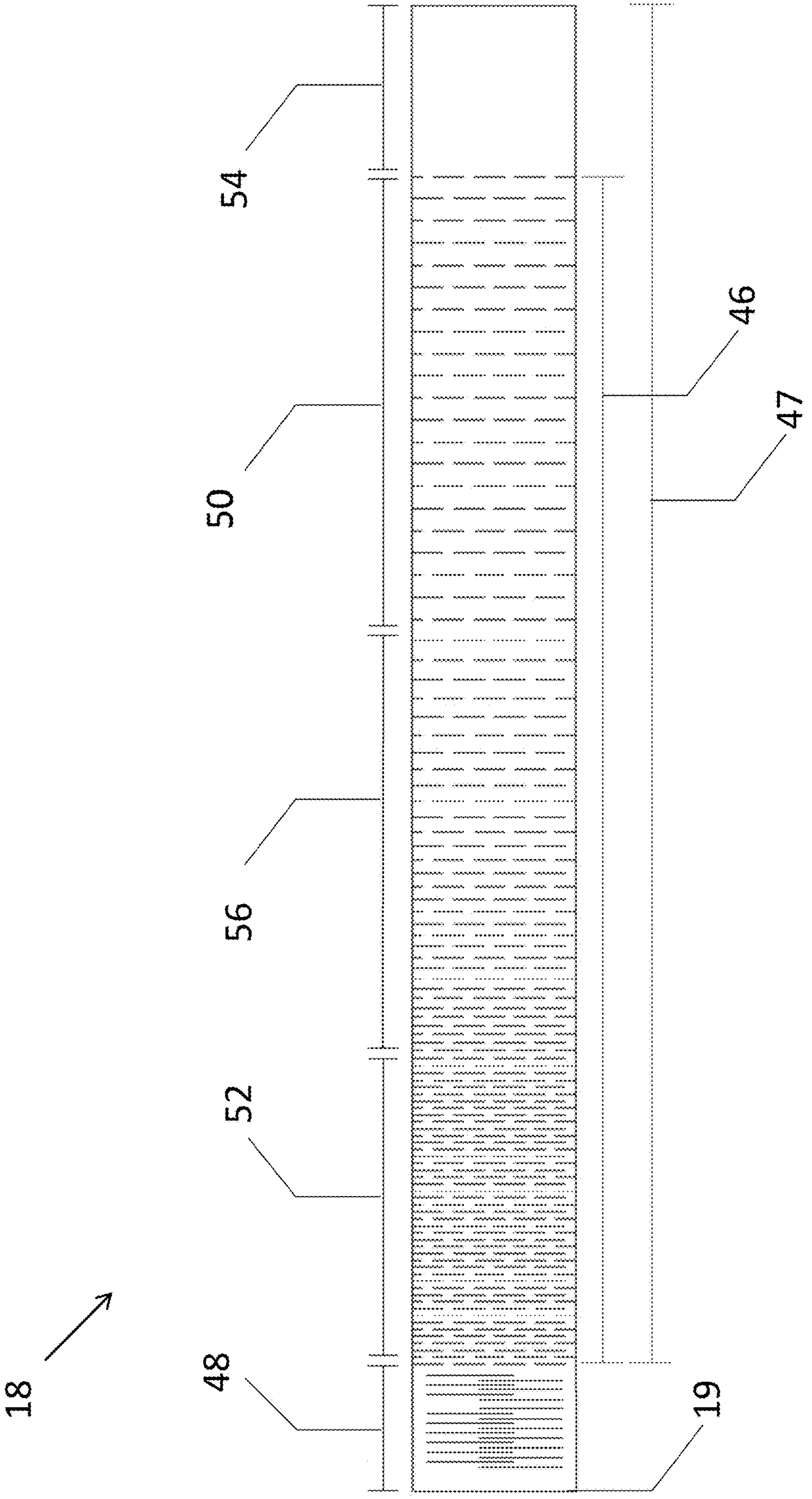
FIG. 10 is a detailed flattened tube view of the assembly of FIG. 7, according to other embodiments of the present disclosure.

Referring now to FIGS. 9 and 10, the sheath 18 (and, thus, each of the first and second tubes 42, 44) may have multiple sections, according to some embodiments of the present disclosure. The sheath 18 may include a proximal section 46 (e.g., a "transmission" section). The proximal section 46 may be configured to be passively flexible in all bending directions while maintaining high torsional and axial stiffness. As discussed in greater detail below, the proximal section 46 may include a flexible section 52 and a stiff section 50.

As mentioned above, the sheath 18 may further include a first deflectable section 48. As described in greater detail below, the first deflectable section 48 may be configured to employ a concentric agonist-antagonist bending scheme in order to deflect the distal end 19 of the sheath 18, as shown with reference to FIG. 2. The depicted embodiments of the sheath 18 illustrate a brickwork pattern of cuts, employed to modify the stiffness of each of the first and second tubes 42, 44, as discussed in greater detail below.

Figure 11:
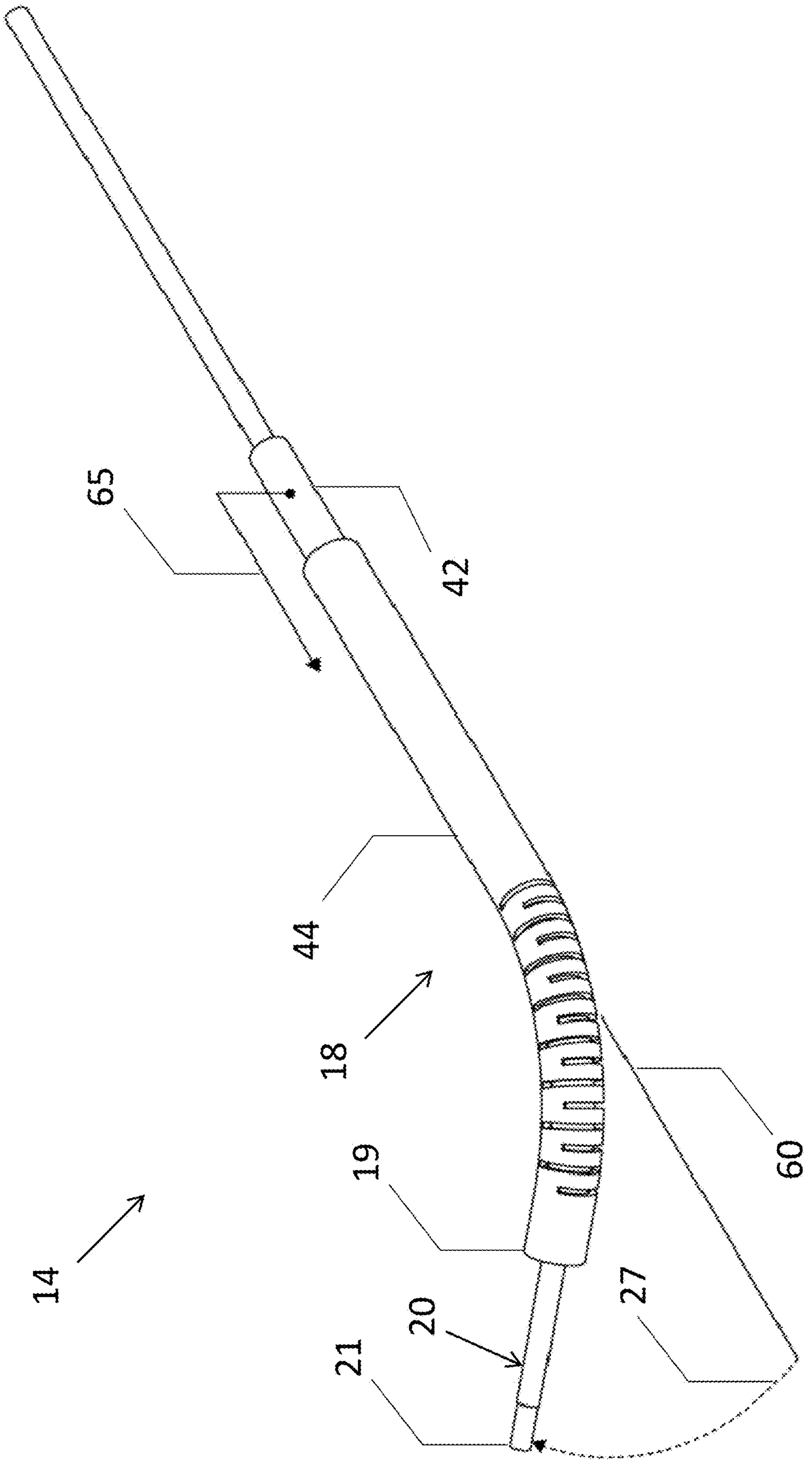
FIG. 11 is a perspective view of the assembly of FIG. 7 being actuated to form a bend in a first direction, according to some embodiments of the present disclosure.
Figure 12:
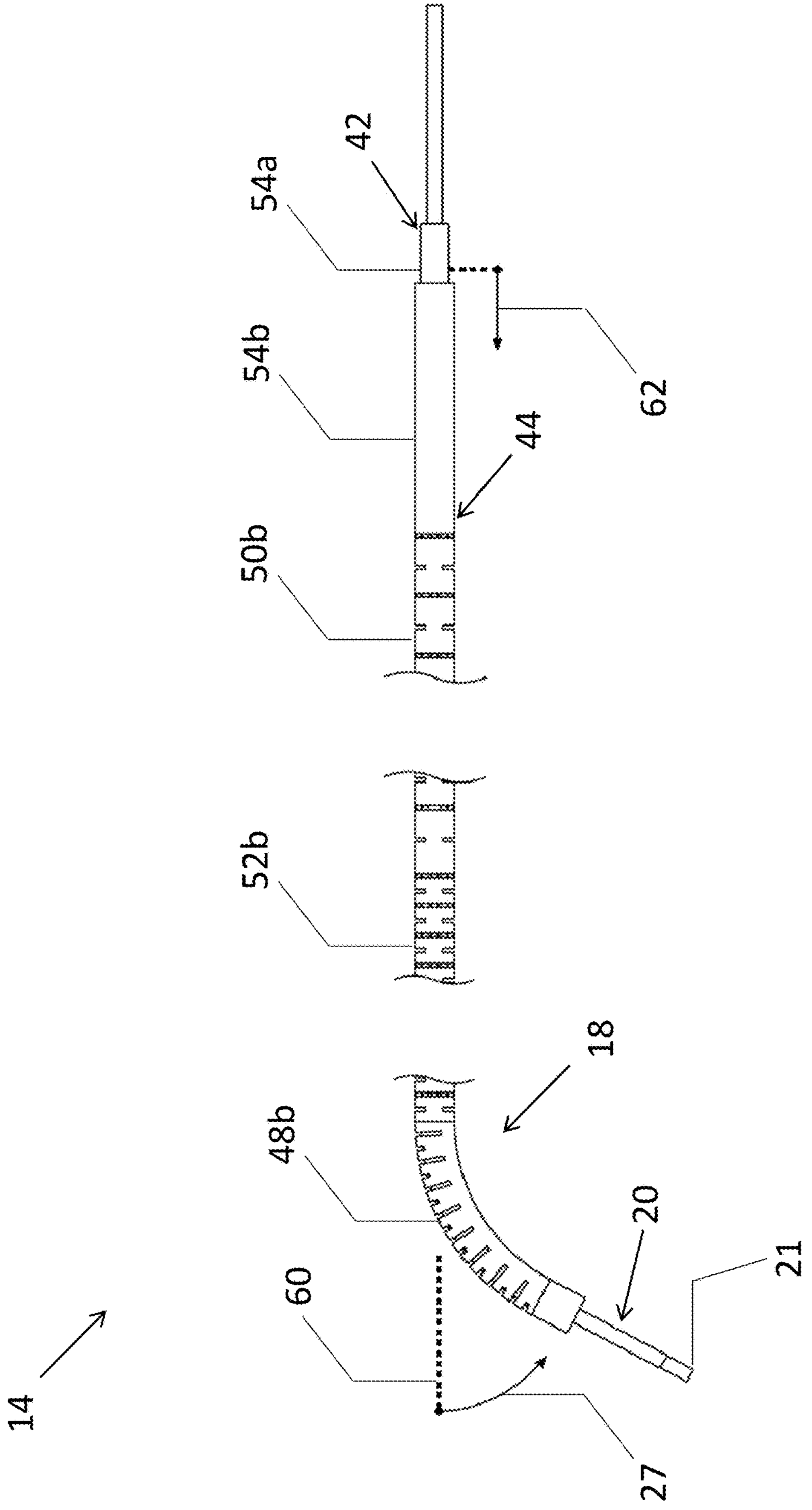
FIG. 12 is a detailed side view of the assembly of FIG. 11, according to some embodiments of the present disclosure.
Figure 13:
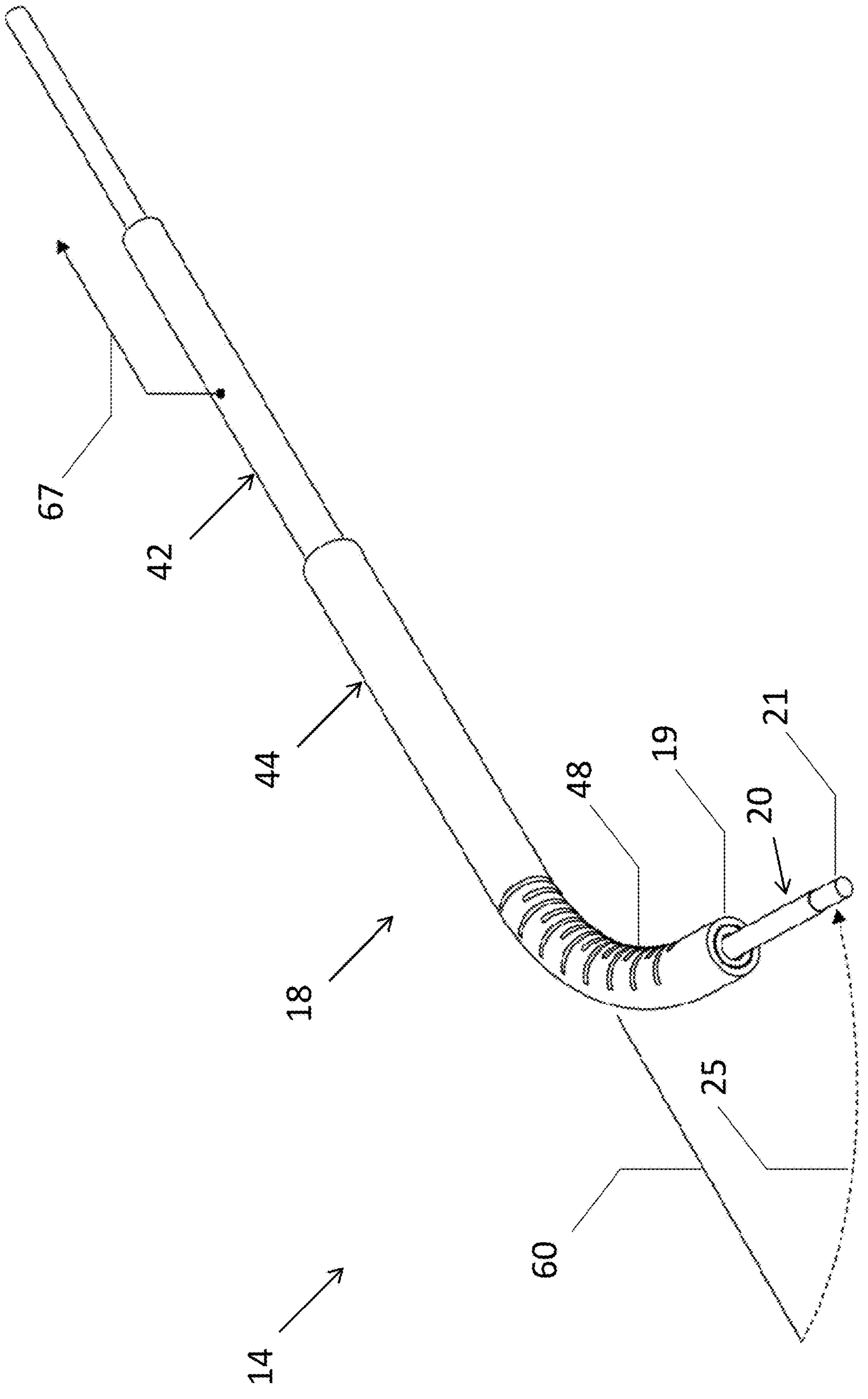
FIG. 13 is a perspective view of the assembly of FIG. 7 being actuated to form a bend in a second direction, according to some embodiments of the present disclosure.
Figure 14:
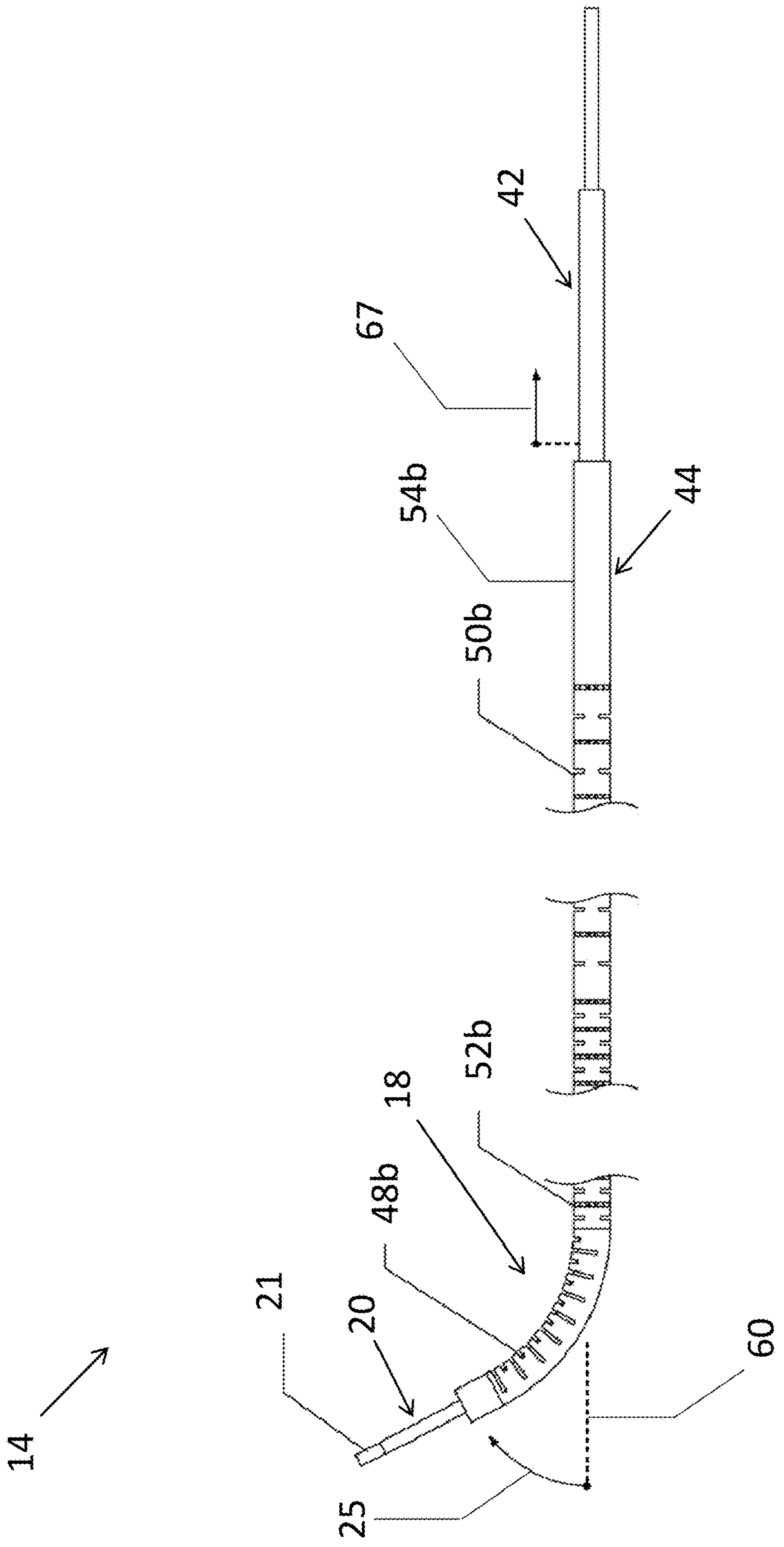
FIG. 14 is a detailed side view of the assembly of FIG. 13, according to some embodiments of the present disclosure.
Figure 15:
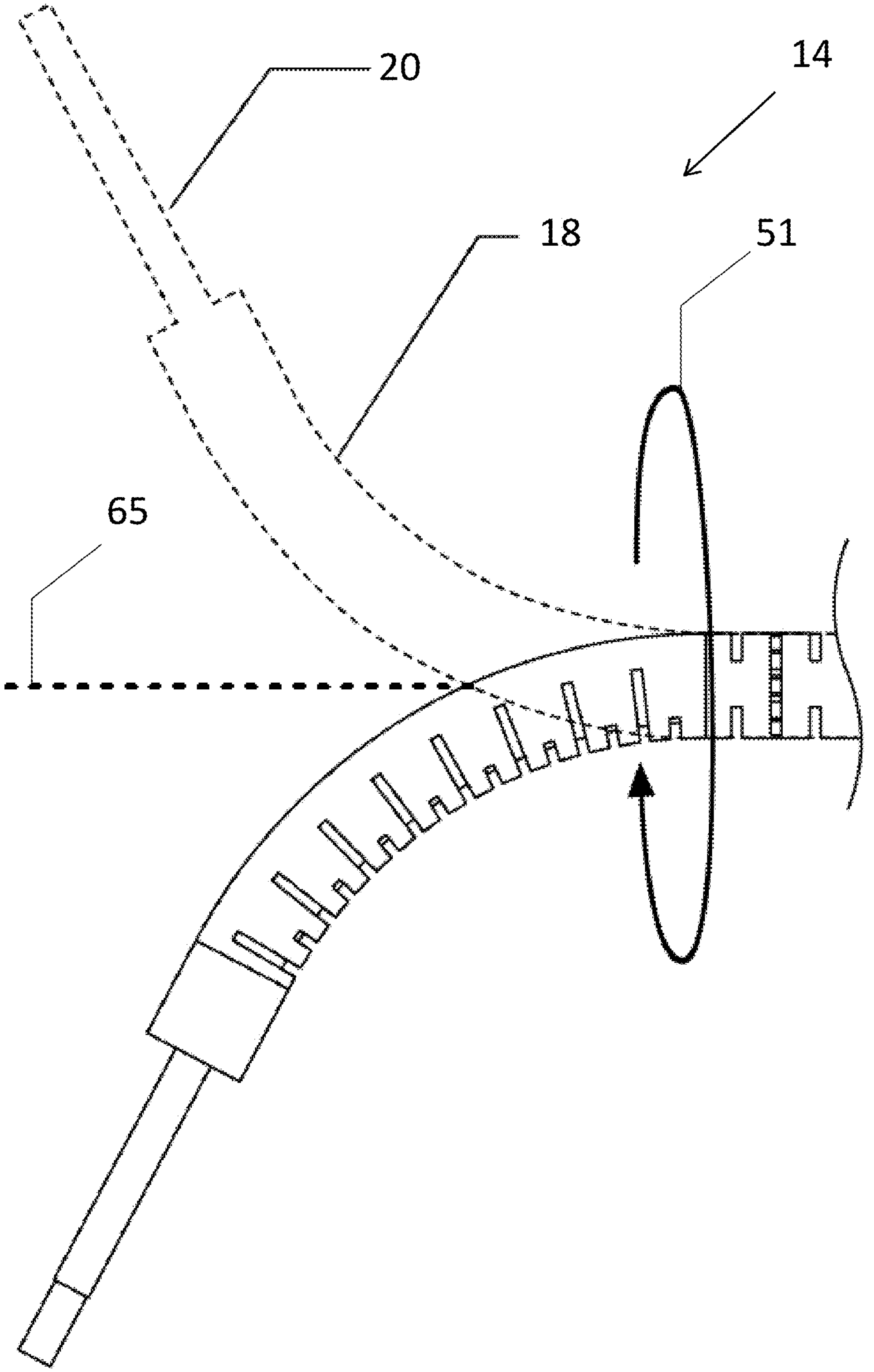
FIG. 15 is a side view of the assembly of FIG. 7 being rotated relative to a central axis, according to some embodiments of the present disclosure.

Referring now to FIGS. 11-14, the laser-sheath assembly 14 is shown being bi-directionally deflected. For instance, FIGS. 11 and 12 depict the sheath 18 being deflected in the first direction 24 (depicted with reference to FIG. 2), such that the distal end 19 of the sheath 18 (and, thus, the distal tip 21 of the laser fiber 20) travels along the first path of curvature 25 in said first direction 24. FIGS. 13 and 14, on the other hand, depict the sheath 18 being deflected in the second direction 26 (depicted with reference to FIG. 2) opposite the first direction 24, such that the distal end 19 of the sheath 18 (and, thus, the distal tip 21 of the laser fiber 20) travels along the second path of curvature 27 opposite the first path of curvature 25. Accordingly, the As mentioned above with reference to FIGS. 9 and 10, the sheath 18 may include the first deflectable section 48 (and, thus, the first tube 42 may have a first deflectable section **48*a* and the second tube 44 may have a second first deflectable section 48b). In some embodiments, the first deflectable section 48 is configured to bend with a constant curvature. In this sense, the flexural stiffness of the sheath 18 may be constant over the length of the first deflectable section 48. In other embodiments, the first deflectable section 48 includes a "tip-first" bending profile. In this sense, the flexural stiffness of the sheath 18 may smoothly decrease towards the distal end 19 of the sheath 18**.

Over the sheath 18, in some embodiments, the first and second tubes 42, 44 are configured to have neutral axes offset from a longitudinal axis 60 (e.g., geometric axis, longitudinal axis, etc.) of the sheath 18 to promote actuation of the bending degree of freedom. The first and second tubes 42, 44 may be aligned such that these neutral axes oppose each other, and are fastened at their tips (e.g., at or about the distal end 19 of the sheath 18). Accordingly, the first and second deflectable portions 48a, 48b may be selectively weakened portions of the first and second tubes 42, 44 that are angularly oriented, relative to the longitudinal axis 60 of the sheath 18, in directions that are offset from each other by an angle equal to or less than one-hundred and eighty degrees. Moreover, the first and second tubes 42, 44 may be joined at a location distal to the first and second deflectable sections 48a, 48b.

Such neutral axes of the first and second tubes 42, 44 offset from the longitudinal axis 60 of the sheath 18 may be achieved by, with respect to one or both of the first and second tubes 42, 44, laser micromachining of a pattern of cuts into one side of the tube(s) (e.g., a brickwork pattern of cuts), selective durometer variation on the tube(s), selective ablation of a jacket layer on the tube(s), integration of an axial braid member on the tube(s) (which, particularly in cases of polymeric tubes that are braid-reinforced, provides a high-stiffness "backbone" to locally reduce bending stiffness), or any other suitable method.

In some embodiments, particularly where a brickwork pattern of cuts is employed to modify the stiffness of each of the first and second tubes 42, 44, as mentioned above, the local stiffness may be modified by changing the pitch (e.g., the spacing) between subsequent rows of notches. A higher such pitch (e.g., shorter spacing) may result in a more flexible profile for each of the first and second tubes 42, 44, whereas a lower such pitch (e.g., larger spacing) may result in a stiffer profile for each of the first and second tubes 42, 44. In other embodiments, an interrupted spiral pattern may be used to modify the stiffness of each of the first and second tubes 42, 44. In such cases, special care may be taken to ensure than any mechanical coupling between axial and torsional displacement (due to an axial load) is minimized over the length of the sheath 18 in order to prevent the first and second deflectable sections 48a, 48b of the first and tubes 42, 44 from mis-aligning from each-other.

As shown with reference to FIGS. 9 and 10, the sheath 18 may have a proximal end 49. Thus, the first tube 42 may have a corresponding proximal end 49a, and the second tube 44 may have a corresponding proximal end 49b. In some embodiments, when a differential force is applied at the proximal ends 49a, 49b of the first and second tubes 42, 44, the first deflectable section 48 of the sheath 18 bends bi-directionally. In this sense, the distal end 19 of the sheath 18 may be deflected, traveling along the first or second paths of curvature 25, 27. Accordingly, the sheath 18 may be actuable to form a first bend by relative axial translation between the first tube 42 and the second tube 44. Such bending may impart a deflection force on the laser fiber 20 disposed in the sheath 18, thereby causing it the laser fiber 20 to bend. In this sense, such bending of the sheath 18 causes corresponding deflection of the distal tip 21 of the laser fiber 20, such that the distal tip 21 similarly travels along the first or second paths of curvature 25, 27. Thus, such differential force may be applied to the first and second tubes 42, 44, in order to "steer" the laser fiber 20.

Depending on the implementation, the first and second tubes 42, 44 may each have a wall thickness nominally between 50 μm and 125 μm. Relatedly, an outer diameter of the sheath 18 may nominally be less than the diameter of a standard ureteroscope working channel (typically 3.6 F or 1.2 mm). The first and second tubes 42, 44 may be constructed of any suitable material for providing the apparatuses and methods discussed herein. As a first example, the first and second tubes 42, 44 may be made of super-elastic Nitinol. As a second example, the first and second tubes 42, 44 may be made of a polymeric material (e.g., Polyimide, PEBAX, Nylon12, etc.), which may include braid reinforcement and a jacket layer, as mentioned above.

In some embodiments, and particularly in order to facilitate enhanced permit irrigant flow around the apparatus 100, the outer diameter of the sheath 18 may be 1 mm or less. An inner diameter of the sheath 18 may be large enough to accommodate the largest laser fiber (e.g., the laser fiber 20) that the apparatus 10 is intended to be compatible with, while also providing adequate clearance to promote smooth insertion and retraction of the laser fiber 20 within the sheath 18. In instances where the laser fiber 20 is configured to be used with a flexible cystoscope or rigid nephroscope, which feature larger working channels (corresponding to the tubing 15 shown with reference to FIG. 1), the outer diameter of the sheath 18 may be as large as 6 F or 2 mm.

In some embodiments, the sheath 18 is long enough to traverse the endoscope or ureteroscope through which it is disposed (e.g., the tubing 15 depicted with reference to FIG. 1, which may typically be 700-850 mm in length), with the proximal end 49 of the sheath 18 connected to a user interface (such as the user interface 16 depicted with reference to FIG. 1), and the first deflectable section 48 extended from the distal tip of the ureteroscope (e.g., a distal tip of the tubing 15) in a fully inserted configuration as shown in FIG. 1.

Referring again to FIGS. 9 and 10, the first and second tubes 42, 44 of the sheath 18 may include multiple sections. For instance, as discussed above, the sheath 18 may include the distal section 48 and the proximal section 46. However, the sheath 18 may include additional sections, as discussed in greater detail below.

Starting from the distal end 19, a first section of the sheath 18 may be the first deflectable section 48 of the steerable sheath 18 which, as discussed above, may be a steerable section which employs an concentric agonist/antagonist actuation scheme, may be up to approximately 25 mm in length. The first deflectable section 48 may have sufficient distal angulation (e.g., +/−90 degrees), and may feature a minimum radius-of-curvature that is greater than the minimum radius-of-curvature allowable by the laser fiber 20, within an adequate safety margin. For instance, if such minimum radius-of-curvature limit is violated, such violation may result in laser energy attenuation due to macrobending losses along the curved section of the laser fiber 20, thereby reducing energy output and overall quality of the therapy provided by the apparatus 10.

Proceeding from the first deflectable section 48 and away from the distal end 19, an additional section of the sheath 18 may be a flexible section 52, which may make up entirety or a portion of the proximal section 46 as discussed above. In some embodiments, the flexible section 52 is up to approximately 100 mm in length. The flexible section 52 may be configured to have enough bending flexibility to permit a bending range-of-motion of the ureteroscope through which it is passed (e.g., the tubing 15 depicted with reference to FIG. 1), as determined by its flexural compliance. For instance, in ureteroscopy procedures, it may be advantageous to minimize impact to an overall angulation of the ureteroscope itself (many of which are configured to bend +/−270 degrees) by optimizing the flexibility of the portion of the sheath 18 which is positioned within the ureteroscope (e.g., the tubing 15) when assembled as such. Accordingly, the flexible section 52 may have a different flexural compliance than the remaining sections of the sheath 18, in order to permit adequate bending of the ureteroscope bending section through which the sheath 18 is passed.

Proceeding from the flexible section 52 and away from the distal end 19, an additional section of the sheath 18 may be a stiff section 50. The stiff section 50 may be up to 800 mm in length, and be stiffer than the flexible section 52. As a first example, the stiff section 50 may have a higher bending stiffness than the flexible section 52. As a second example, the stiff section 50 may have a higher axial stiffness than the flexible section 52, in order to maximize column strength for push-ability and minimize transmission stretch resulting from actuation forces. As a third example, the stiff section 50 may have a higher torsional stiffness than the flexible section 52 for torque control. As indicated in FIG. 9, the stiff section 50, together with the flexible section 52, may make up the proximal section 46. In further embodiments, the stiff section 50 extends from the first deflectable section 48 (in other words, the stiff section 50 makes up the entirety of the proximal section 46).

In some embodiments, and as shown with particular reference to FIG. 10, the sheath 18 includes a transition section 56 positioned between the flexible section 52 and the stiff section 50. The transition section 56 may have mechanical properties that are linearly or otherwise smoothly interpolated between the flexible section 52 and the stiff section 50, in order to achieve a more gradual mechanical transition between such sections.

In some embodiments, the sheath 18 includes a rigid section 54. The rigid section 54 may extend from the proximal section 46 (away from the distal end 19 of the sheath 18) or, in further embodiments, replace the proximal section 46. The rigid section 54 may attach the sheath 18 to its respective actuation elements within the user interface or drive system (e.g., the user interface 16 depicted with reference to FIG. 1). Overall, the sheath 18 may include a base 47, which may be considered any and all sections proximal relative to the first deflectable section 48. For instance, the base 47 may include the proximal section 46 and the rigid section 54. Accordingly, the sheath 18 may include the rigid section 54 located proximal relative to the first deflectable portion 48*a* of the first tube 42 and the second deflectable portion 48*b* of the second tube 44. The rigid section 54 may be made of any suitable material including but not limited to, a high-modulus tube (e.g., steel, titanium, Nitinol) with high axial, torsional, and bending stiffness. The length of the rigid section 54 and proximal section 46 may be long enough to traverse the tubing 15 through which the sheath 18 is passed.

Figure 16:
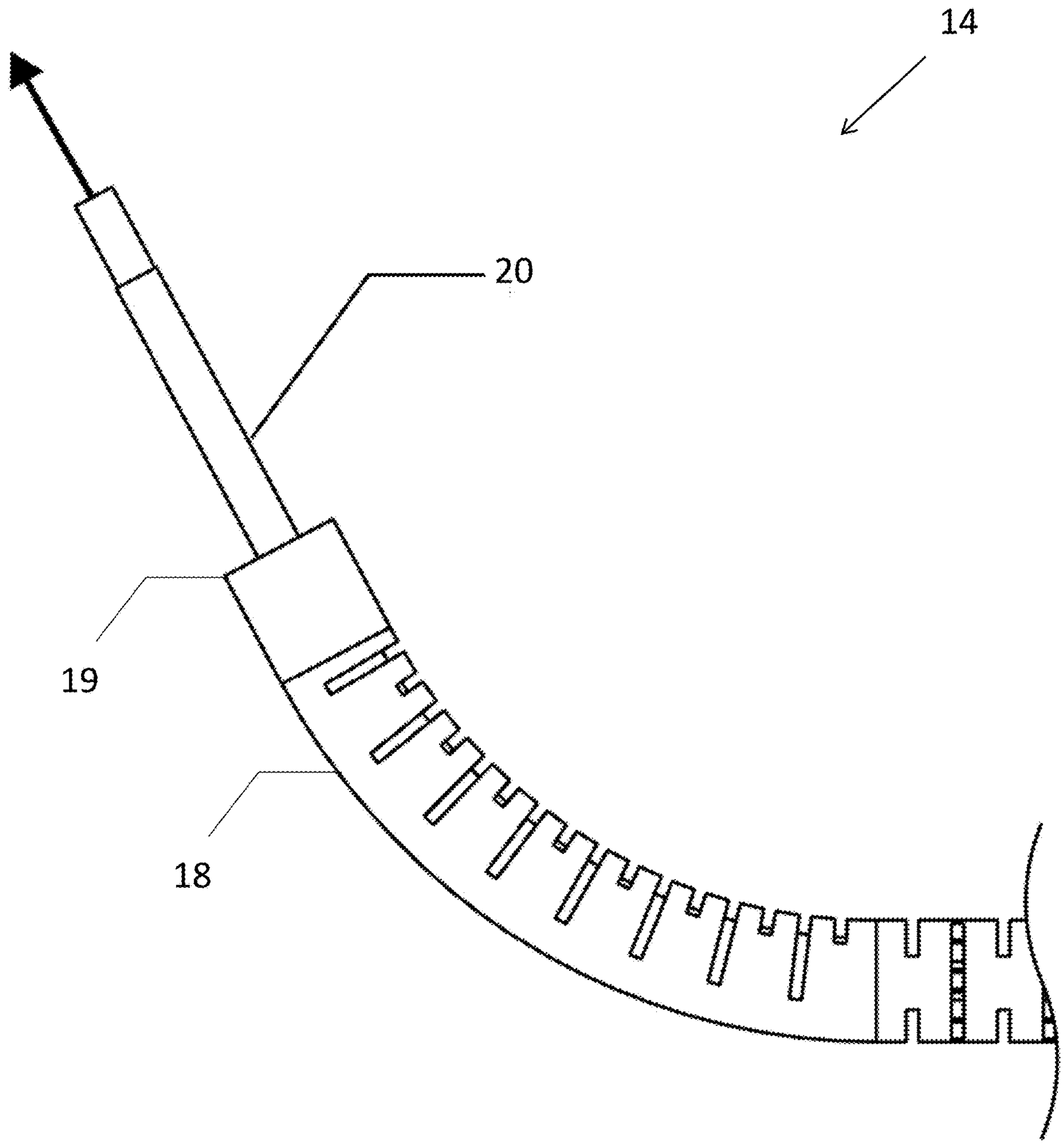
FIG. 16 is a side view of the assembly of FIG. 7 with a laser fiber projecting from a distal end of a sheath, according to some embodiments of the present disclosure.
Figure 17:
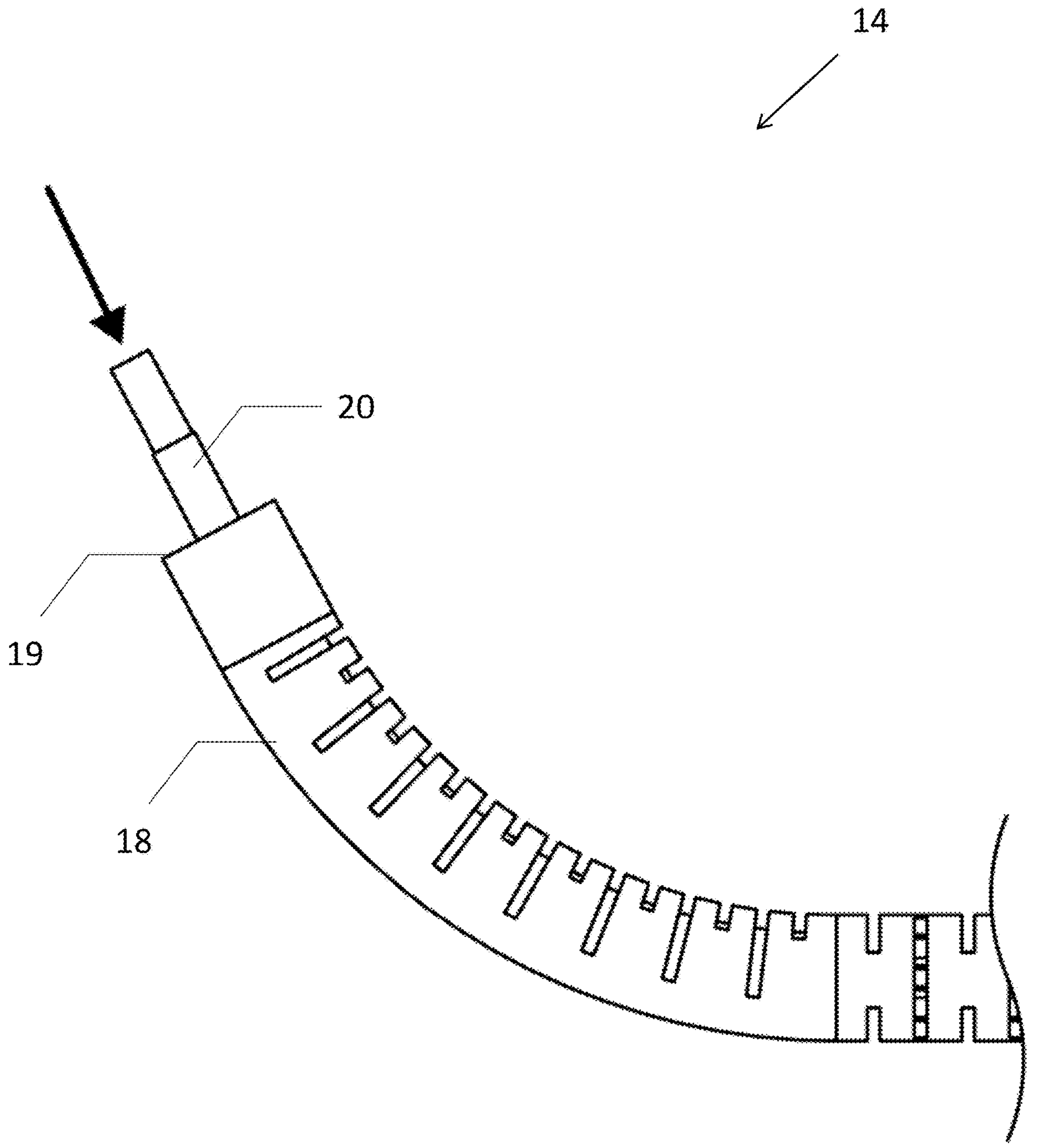
FIG. 17 is a side view of the assembly of FIG. 7 with a laser fiber being retracted into a distal end of a sheath, according to some embodiments of the present disclosure.

Referring now to FIGS. 16 and 17, the laser fiber 20 is shown being extended out of and reacted into the sheath 18, according to some embodiments of the present disclosure. For instance, advancing movements of the laser fiber 20 may cause the distal tip 21 of the laser fiber 20 to project out of the distal end 19 of the sheath 18; and retreating movements of the laser fiber 20 may cause the distal tip 21 of the laser fiber to retract towards the distal end 19 of the sheath 18.

As mentioned above, the laser fiber 20 may be disposed within the sheath 18. In some embodiments, the laser fiber 20 is configured to be retracted into or extended out from the sheath 18 by pushing the laser fiber 20 from the proximal end of the device. An ability to translate the laser fiber 20 with respect to the sheath 18 may be advantageous, as the fiber tip 23 of the laser fiber 20 may be consumed (e.g., retracted into the steerable sheath 18) during the laser lithotripsy process, and as such, the fiber tip 23 should have the ability to be fed into the surgical field on an as-needed basis.

Figure 18:
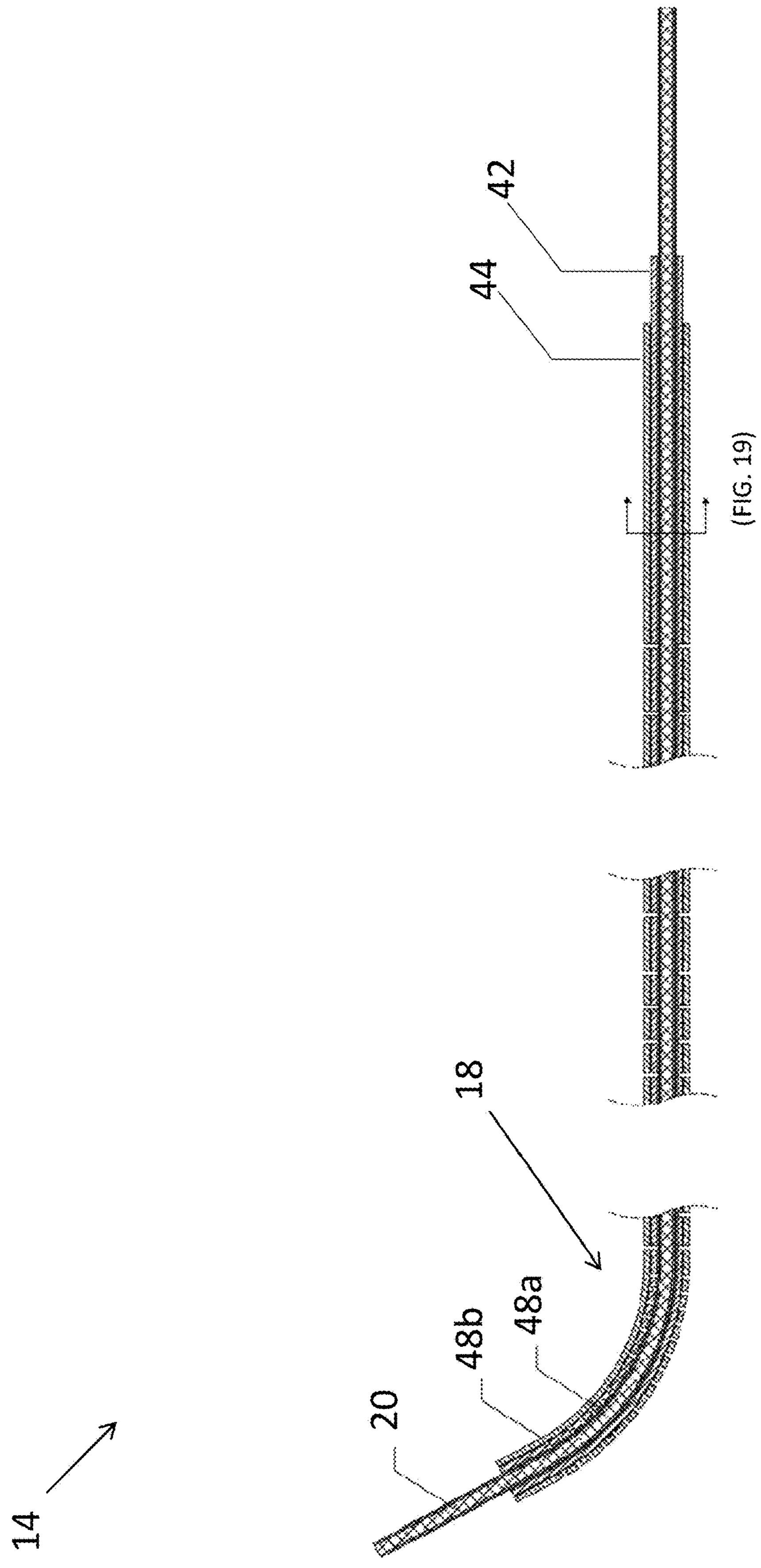
FIG. 18 is a side cross-sectional view of the assembly of FIG. 7, according to some embodiments of the present disclosure.
Figure 19:
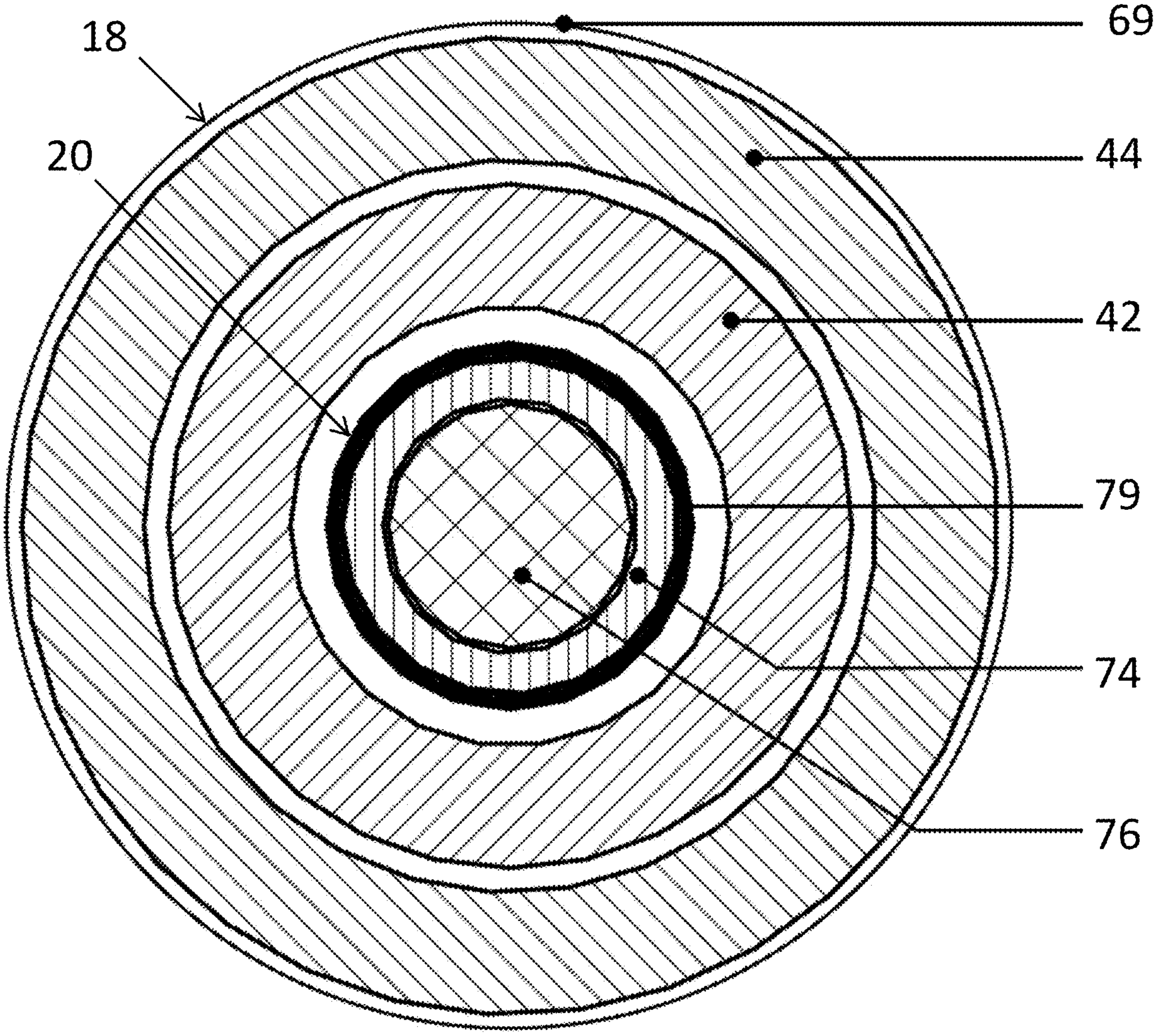
FIG. 19 is an axial cross-sectional view of the assembly of FIG. 7, according to some embodiments of the present disclosure.
Figure 20:
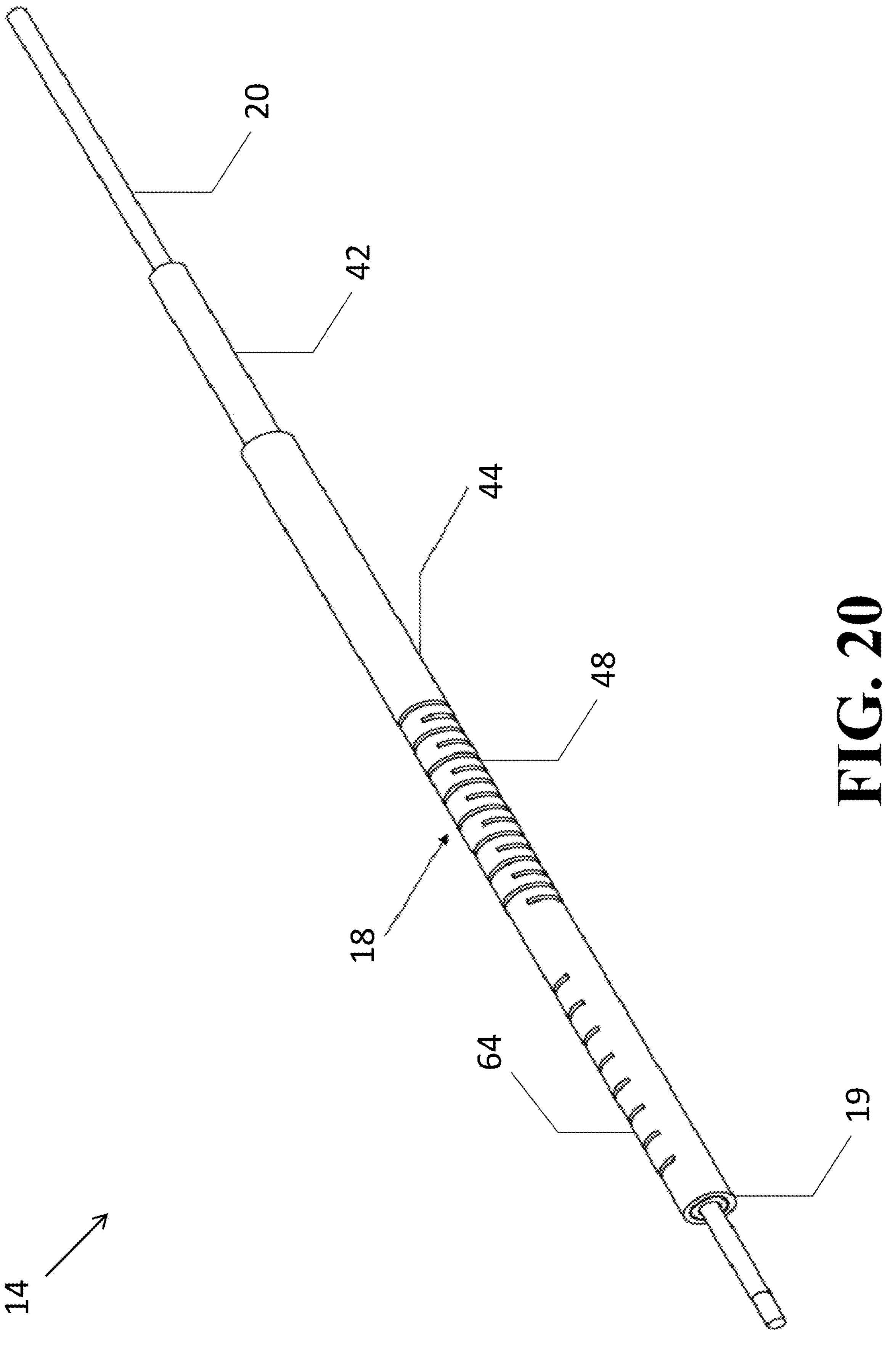
FIG. 20 is perspective view of a laser-sheath assembly for an endoscopic apparatus configured to form two bends, according to some embodiments of the present disclosure

Referring now to FIGS. 18 and 19, cross sections of the laser-sheath assembly 14 are shown, according to some embodiments of the present disclosure. For instance, FIG. 18 depicts a side cross-sectional view of the laser-sheath assembly 14, and FIG. 19 depicts an axial cross-sectional view of the laser-sheath assembly 14. In some embodiments, the laser-sheath assembly 14 includes an outer tube 69. For instance, the sheath 18 may be nested within the outer tube 69. The outer tube 69 may be a polymer tube or jacket, which may be affixed to the second tube 44 of the sheath 18 via flexible adhesive or reflow for the purpose of creating a lubricious interface between the sheath 18 and the working channel through which the sheath 18 is passed. The outer tube 69 may further provide a benefit of closing off the machined slots of the sheath 18 to prevent water ingress during irrigation. Depending on the implementation the outer jacket 70 may be constructed primarily from PEBAX, Polyester (PET), PTFE, FEP, or any other suitable material. In some embodiments, the laser-sheath assembly 14 includes an inner tube 79. The inner tube 79 may be positioned between the first tube 42 of the sheath 18 and the laser fiber 20, and may be an inner polymer liner. Advantageously, the inner tube 79 may add lubricity to the first tube 42 of the sheath 18, and facilitate translation of the laser fiber 20 within the sheath 18.

Referring now to FIGS. 20-25, the laser-sheath assembly 14 with multiple discrete bending sections is shown, according to some embodiments of the present disclosure. For instance, while the sheath 18 with a single bending section (e.g., the first deflectable section 48) as shown in FIGS. 7-18 is sufficient to deflect the laser fiber 20 contained therein, the resulting deflection may cause an angle offset between the laser fiber 20 and the axis of the scope through which the steerable laser sheath is delivered (e.g., the tubing 15 depicted with reference to FIG. 1). In the context of laser lithotripsy or resection, laser energy delivery to the target tissue may be optimal when the laser fiber (e.g., the laser fiber 20) is perpendicular to the target (e.g., a kidney stone or tumor), and any angular offset can result in sub-optimal energy delivery and reduced therapeutic outcomes. In order to keep a central axis 63 of the laser fiber 20 (depicted with particular reference to FIGS. 24 and 25) parallel to a central axis of the tubing 15 (and, therefore, perpendicular to the target), the sheath 18 may be provided with multiple bending sections, as discussed in greater detail below.

In some embodiments, the sheath 18 includes two steerable sections. In this sense, the sheath 18 may further include a second deflectable section 64. In this sense, the first tube 42 may further include a third deflectable portion 64*a*, the second tube 44 may include a fourth deflectable portion 64*b*. As suggested above, the third and fourth deflectable portions 64*a*, 64*b* may be being selectively weakened portions of the first and second tubes 42, 44 that are angularly oriented, relative to the longitudinal axis 60 of the sheath 18, in directions that are offset from each other by the angle equal to or less than one-hundred and eighty degrees. In turn, the location at which the first and second tubes 42, 44 are joined may be distal to the third and fourth deflectable sections 64*a*, 64*b*, along with the first and second deflectable sections 48*a*, 48*b*. Accordingly, the sheath 18 may be actuable to additionally form a second bend by the relative axial translation between the first tube 42 and the second tube 44. In some embodiments, the first bend is in an opposite direction of the second bend.

Figure 24:
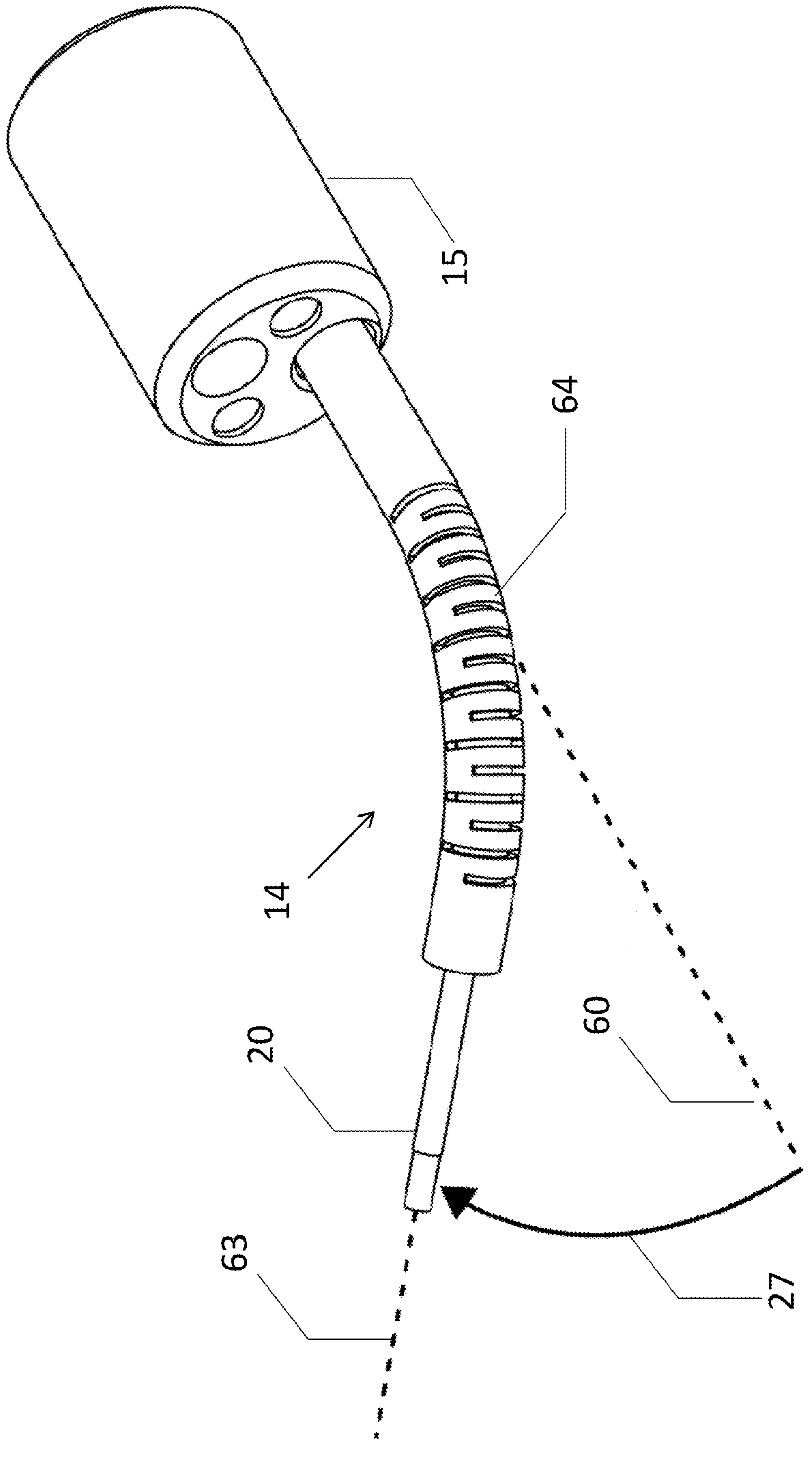
FIG. 24 is a perspective view of the assembly of FIG. 20 being projected from an endoscopic tube to facilitate a first bend of the two bends, according to some embodiments of the present disclosure.
Figure 25:
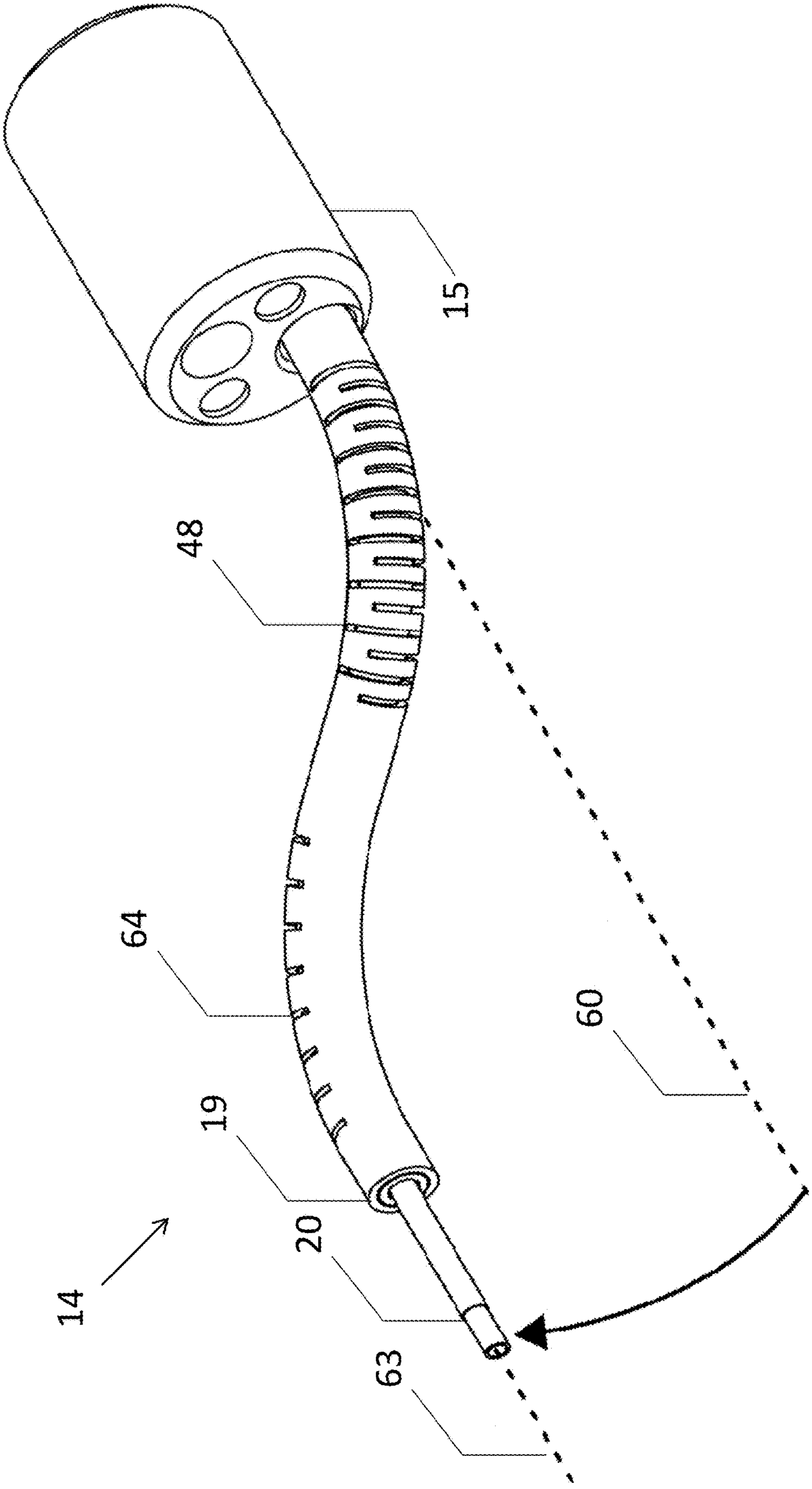
FIG. 25 is a perspective view of the assembly of FIG. 20 being projected from an endoscopic tube to facilitate the two bends, according to some embodiments of the present disclosure.

The first and second deflectable sections 48, 64 may be separated by a section of solid tube (e.g., a section formed similar to the flexible section 52 or the stiff section 50 discussed above). By providing the sheath 18 with the first and second discrete deflectable sections 48, 64 separated by a solid section of tube, with the proximal section 46 rotated 180 degrees with respect to the distal section, an "S"-shaped curve is created where the distal tip 21 of the laser fiber 20 is displaced laterally, but the central axis 63 of the laser fiber 20 at the distal tip 21 of the laser fiber 20 remains parallel to the central axis 65 of the base 47 of the sheath 18. This is an example of an underactuated system, where a single actuation degree of freedom (e.g., the differential displacement applied at the proximal ends of the first and second tubes 42, 44) drives two degrees of freedom at the distal end (in this case, first and second deflectable sections 48, 64). Such an embodiment enables displacement of the laser fiber 20 while mitigating or eliminating any off-axis motion of the distal end 23 of the laser fiber 20, ensuring that the central axis 63 of the distal end 23 remains parallel with the central axis of the base of the sheath, as shown in FIGS. 24 and 25.

In some embodiments, the first and second deflectable sections 48, 64 are configured to be identical, with the same flexural stiffness, and producing the same curvature and maximum deflection angles. Such a configuration may be beneficial when the target is primarily a flat plane. In other embodiments, the first and second deflectable sections 48, 64 may exhibit different properties (i.e. different stiffnesses, curvatures, and maximum deflection angles).

Figure 21:
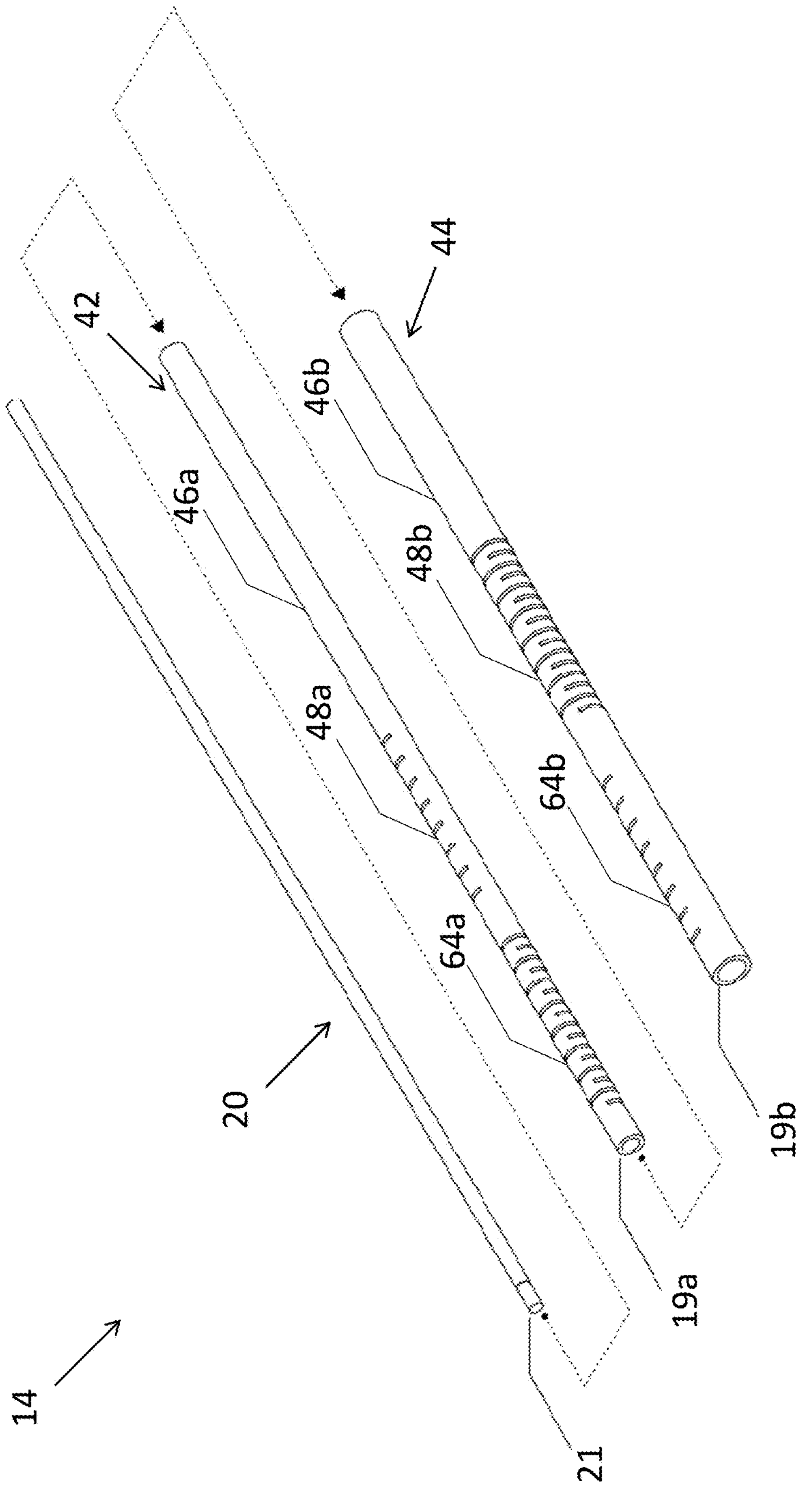
FIG. 21 is an exploded view of the assembly of FIG. 20, according to some embodiments of the present disclosure.
Figure 22:
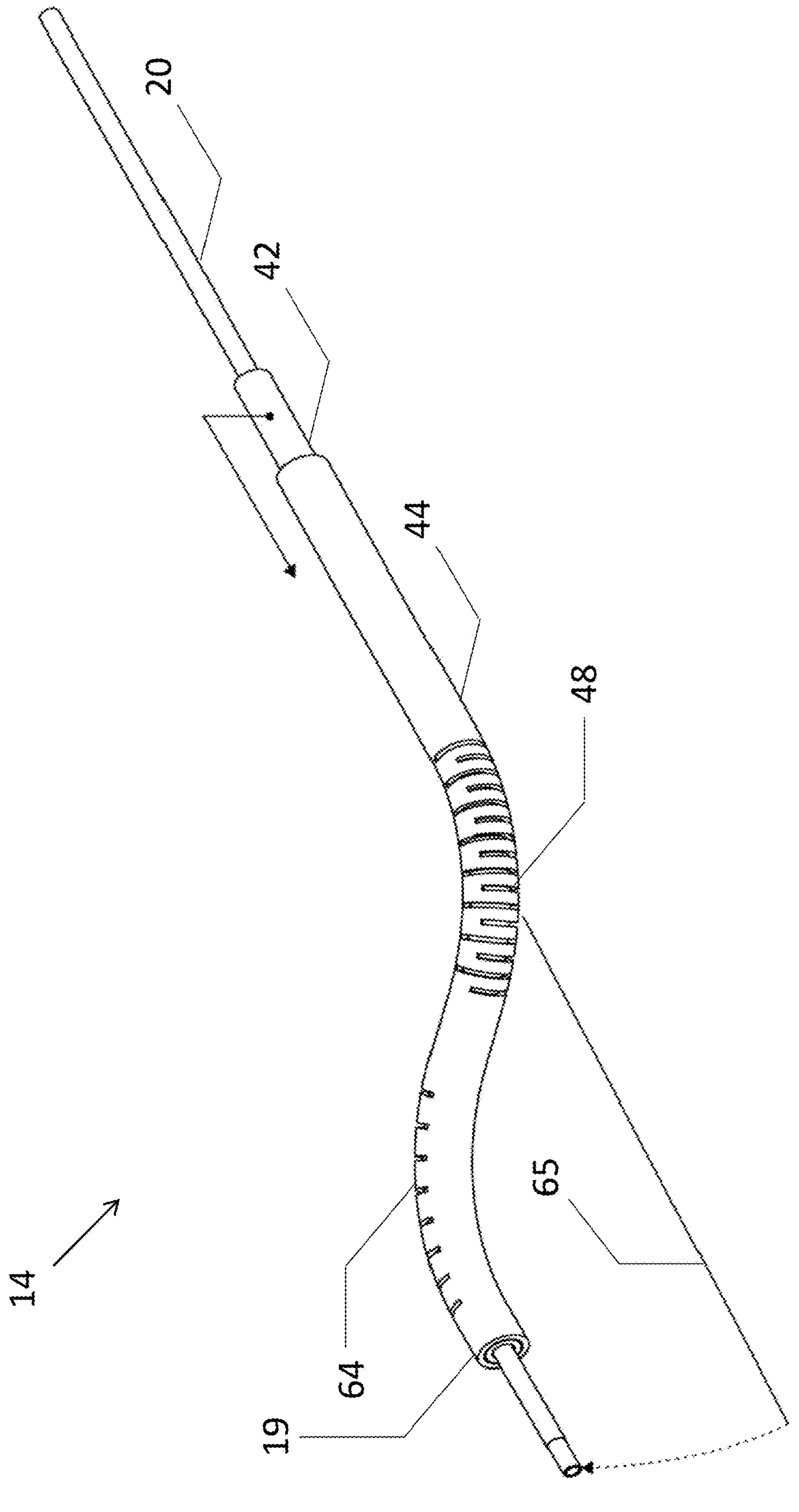
FIG. 22 is a perspective view of the assembly of FIG. 20 being actuated to form two bends in a first direction, according to some embodiments of the present disclosure.
Figure 23:
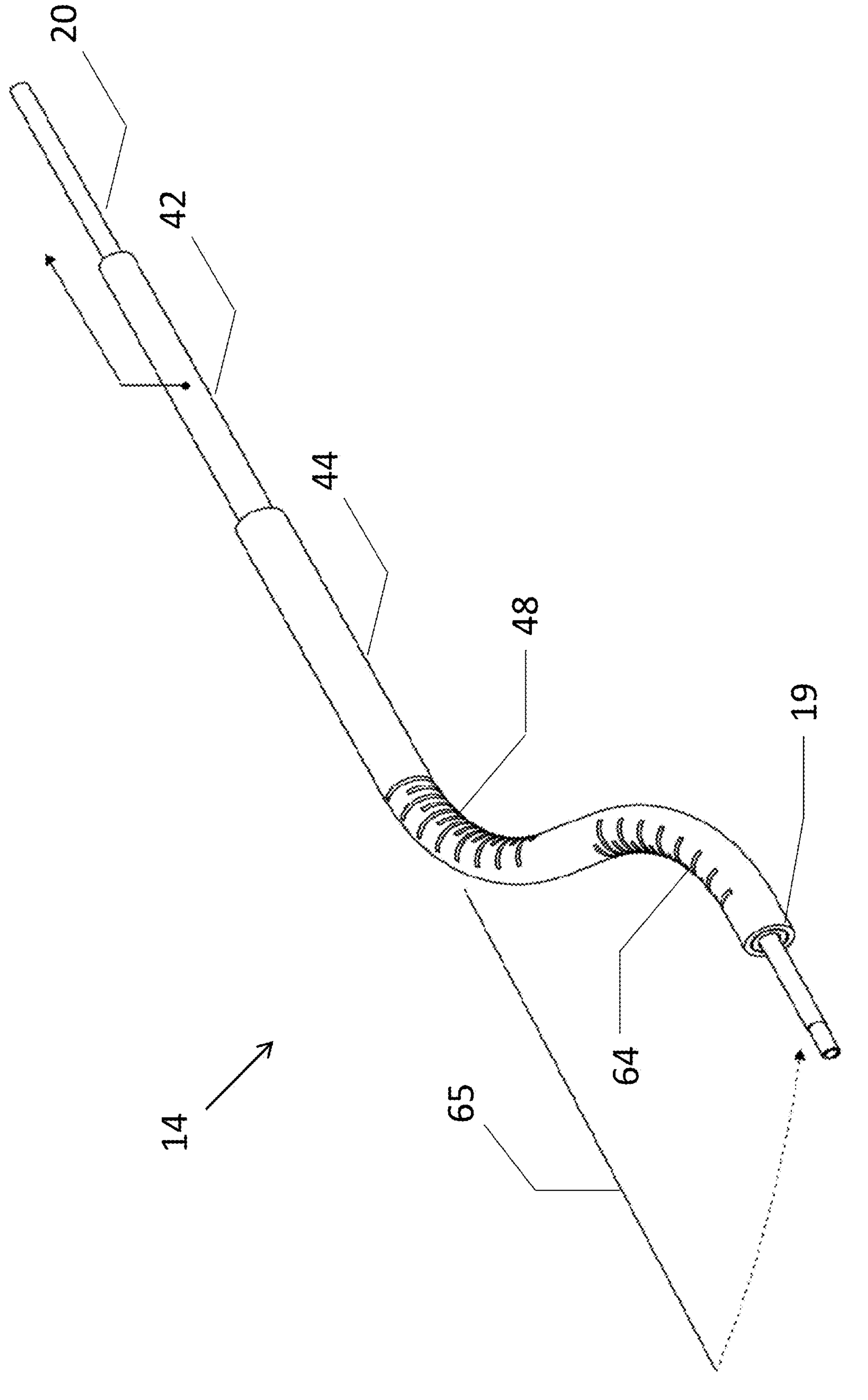
FIG. 23 is a perspective view of the assembly of FIG. 20 being actuated to form two bends in a second direction, according to some embodiments of the present disclosure.

Referring now to FIGS. 8 and 21, the laser fiber 20 is discussed in greater detail, according to some embodiments of the present disclosure. The laser fiber 20 may be steerable laser fiber intended for rigid endoscopic workflows. As discussed above, steering of the laser fiber 20 may be enabled by the sheath 18 disposed around the fiber itself, which is configured to bend at its distal end.

In some embodiments, the laser fiber 20 includes a glass silica core of 50-500 μm in diameter. This core, which may include the distal end 23, may be configured to deliver pulsed-dye, Ho:YAG, or Thulium energy. The laser fiber 20 may include an outer layer 29 disposed around the core. The outer layer 29 may include a cladding layer in order to facilitate internal reflection of the laser energy and prevent transmission losses along the length of the laser fiber 20. For example, the cladding layer may be comprised of reflective silica.

In some embodiments, the outer layer 29 may include a polymer layer disposed around the cladding layer for further mechanical protection, and to increase the tensile strength of the laser fiber 20. To improve lubricity, a low-friction jacket (i.e. PTFE) may be disposed on the outside of the polymer layer. Accordingly, the laser fiber 20 may be configured to freely slide within the sheath 18, and should be designed to withstand the maximum expected curvature of the sheath 18. The laser fiber 20 may be terminated on the proximal end by a standardized connector (e.g., an SMA connector) and threaded coupler to establish a mechanically secure and optically lossless connection to the laser generator system being used.

Referring now to FIGS. 26-43, the user interface 16 is shown in greater detail, according to various embodiments of the present disclosure. As mentioned above, the user interface 16 of the apparatus 10 may be rigidly attached to a working port 17 of the endoscope 12, and be configured to control the laser-sheath assembly 14. The user interface 16 may include all of the necessary functionality to enable the end-user to control the degrees of freedom afforded by the laser-sheath assembly 14. Such degrees of freedom may include insertion and retraction of the laser fiber 20 with respect to the distal end 19 of sheath 18 (as shown with reference to FIGS. 16 and 17), bidirectional deflection of the sheath 18 (as shown with reference to FIGS. 2, 11-14, and 22-24), rotation of the laser-sheath assembly 14 (as shown with reference to FIG. 15), and insertion/retraction of the laser-sheath assembly 14 relative to the tubing 15.

The deflection of the distal end 19 of the sheath 18 may be a linear operation, where the base 47*a* of the first tube 42 is linearly translated with respect to the base 47*b* of the second tube 44. Depending on the implementation, the user interface may include a first tube mount 74 (e.g., an inner tube mount) and a second tube mount 72 (e.g., an outer tube mount). As discussed in greater detail below, the first tube mount 74 may be attached to the first tube 42, and the second tube mount 72 may be attached to the second tube 44. The user interface 16 may include one or more mechanisms configured to translate the first tube mount 74 relative to the second tube mount 72, thus providing a linear translation of the first tube 42 relative to the second tube 44, and thus the deflection of the distal end 19 of the sheath 18 discussed above.

Figure 26:
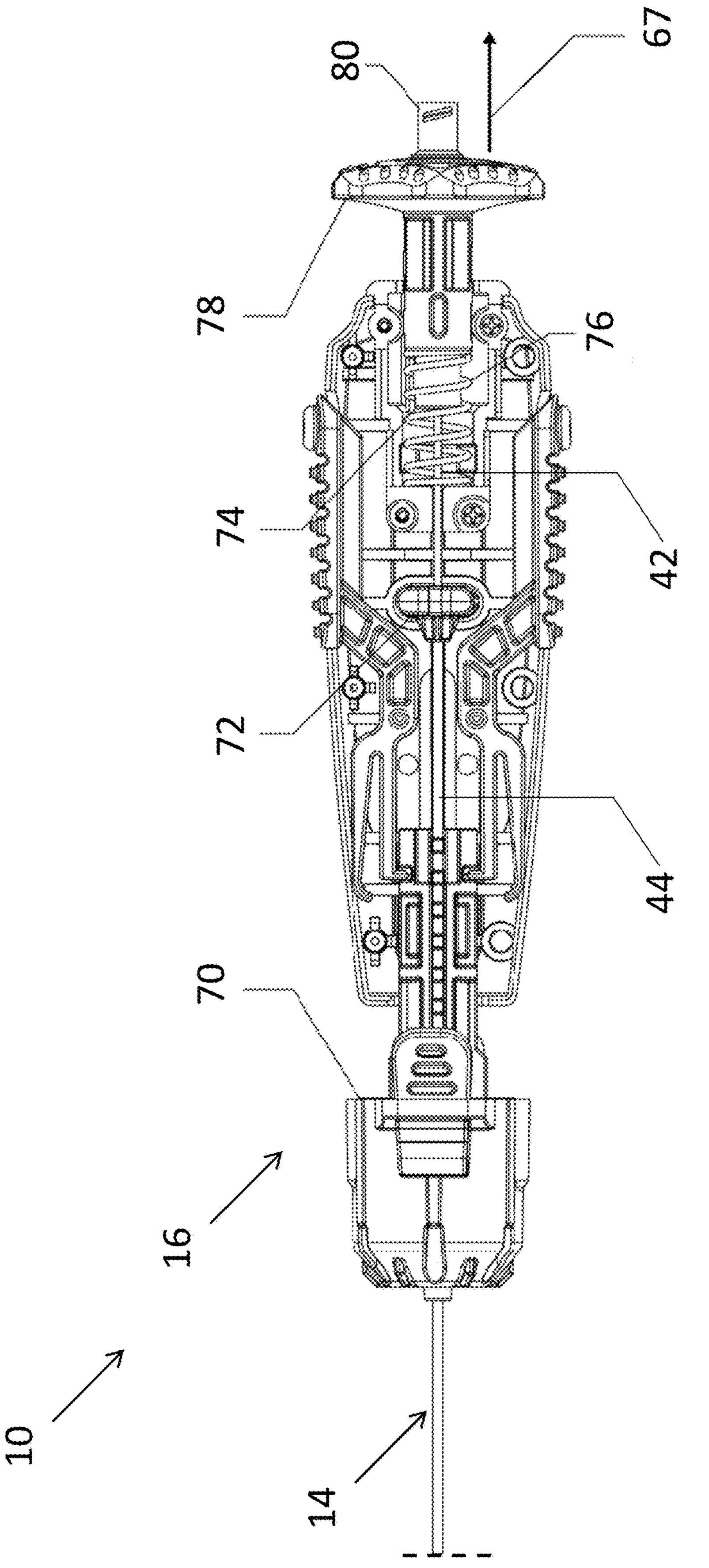
FIG. 26 is a cross sectional view of a user interface of an apparatus for endoscopic laser surgery being operated to form a bend in a sheath in a first direction, according to some embodiments of the present disclosure.
Figure 27:
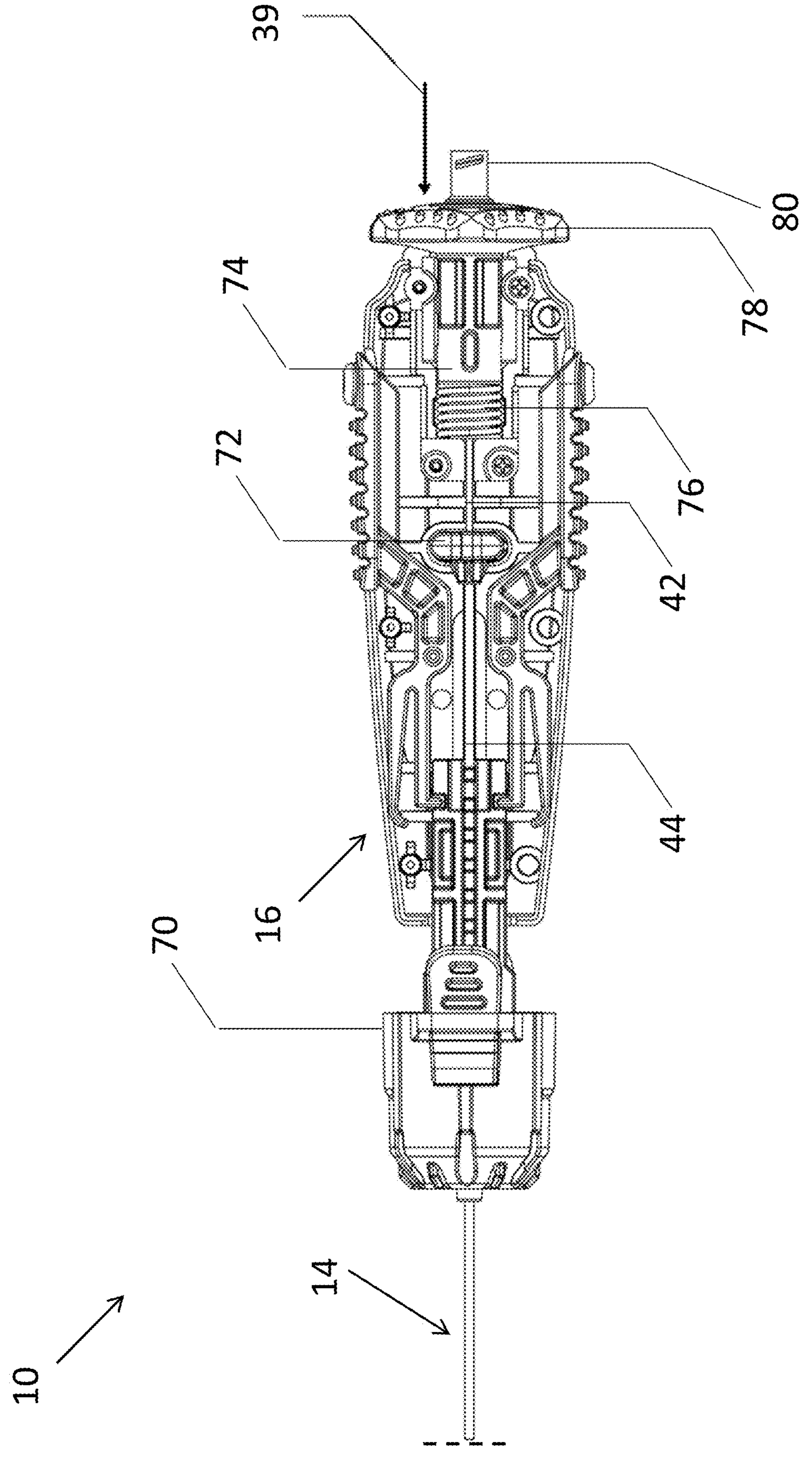
FIG. 27 is a cross sectional view of the user interface of FIG. 26 being operated to form a bend in the sheath in a second direction, according to some embodiments of the present disclosure.
Figure 28:
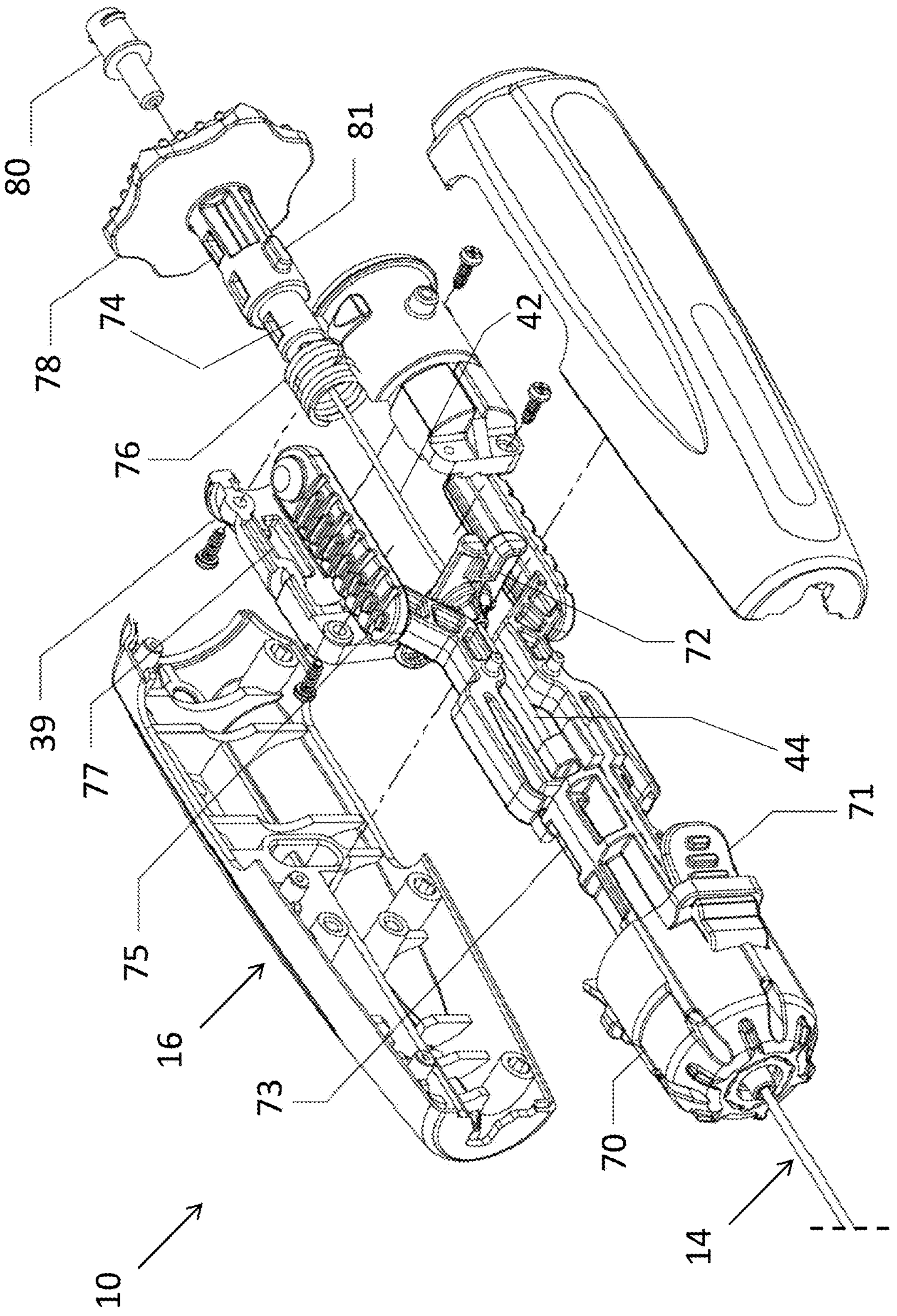
FIG. 28 is an exploded view of the user interface of FIG. 26, according to some embodiments of the present disclosure.

Referring particularly to FIGS. 26-28, such translation of the first tube 42 relative to the second tube 44 may be achieved via linear sliding mechanism that includes a plunger. Accordingly, the user interface 16 may include a linear sliding mechanism including a plunger 78 attached to the first tube mount 74, and a return spring positioned in between the plunger and the second tube mount 72.

As suggested above, deflection of the distal end 19 of the sheath 18 may be achieved by the plunger 78 interacting with the return spring 76, which may be configured for passively retracting the first tube mount 74 (and thus the first tube 42) in a second direction 67 (shown with reference to FIG. 14). For example, when no user-input load is applied to the plunger 78, the return spring 76 drives the plunger 78 (and thus the first tube mount 74) in the second direction 67 (e.g., proximally) away from the inner tube mount 72, as shown with reference to FIG. 26. Accordingly, the plunger 78 may pull on the first tube 42 with respect to the second tube 44, causing the sheath 18 to deflect in the first direction 24, such that the distal end 19 of the sheath 18 travels along a first path of curvature 25, as shown with reference to FIGS. 2 and 13. When the user applies a force to the plunger 78 in a first direction 39, as shown with reference to FIG. 27, the second tube mount 72 may be pushed (against the bias of the return spring 76) towards the first tube mount 74. Thus, the first tube 42 may be pushed into the second tube 44, causing the sheath 18 to deflect in the second direction 26, such that the distal end 19 of the sheath 18 travels along the second path of curvature 27, as shown with reference to FIGS. 2 and 11.

In some embodiments, user interface 16 further includes a mechanism to lock (or otherwise retain) and unluck the orientation of the sheath 18. For example, the user interface 16 may include a spring housing 39 and a plunger travel tab 81. The spring housing 39 may features a locking detent 77 that allows the plunger 78 to be locked in the midway point of its total travel which retains the orientation of the sheath 18 (e.g., via the relative position of the first and second tubes 42, 44) in an undeflected state (as shown with reference to FIG. 7). This may be achieved by rotating the plunger 78 within the spring housing 39, which may cause the plunger travel tab 81 to rotate into a detent cavity of the locking detent 77. The biasing force provided by the return spring 76 may push the plunger travel tab 81 against a retaining surface in the detent cavity of the locking detent 77, which may prevent linear translation of the first tube 42. The plunger 78 may be unlocked and allowed to travel freely by rotating the plunger 78 in the opposite direction, which may rotate the plunger travel tab 81 out of the detent cavity of the locking detent 77.

Figure 29:
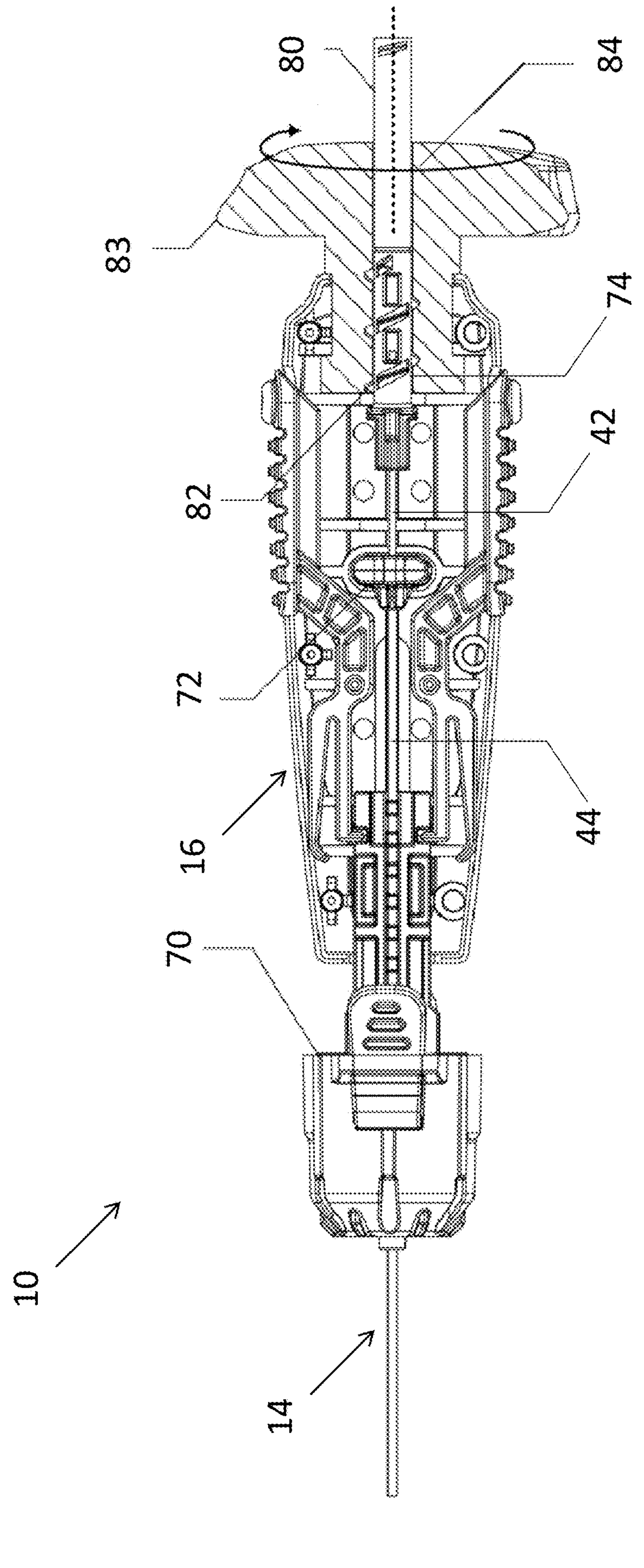
FIG. 29 is a cross sectional view of a user interface of an apparatus for endoscopic laser surgery being operated to form a bend in a sheath in a first direction, according to other embodiments of the present disclosure.
Figure 30:
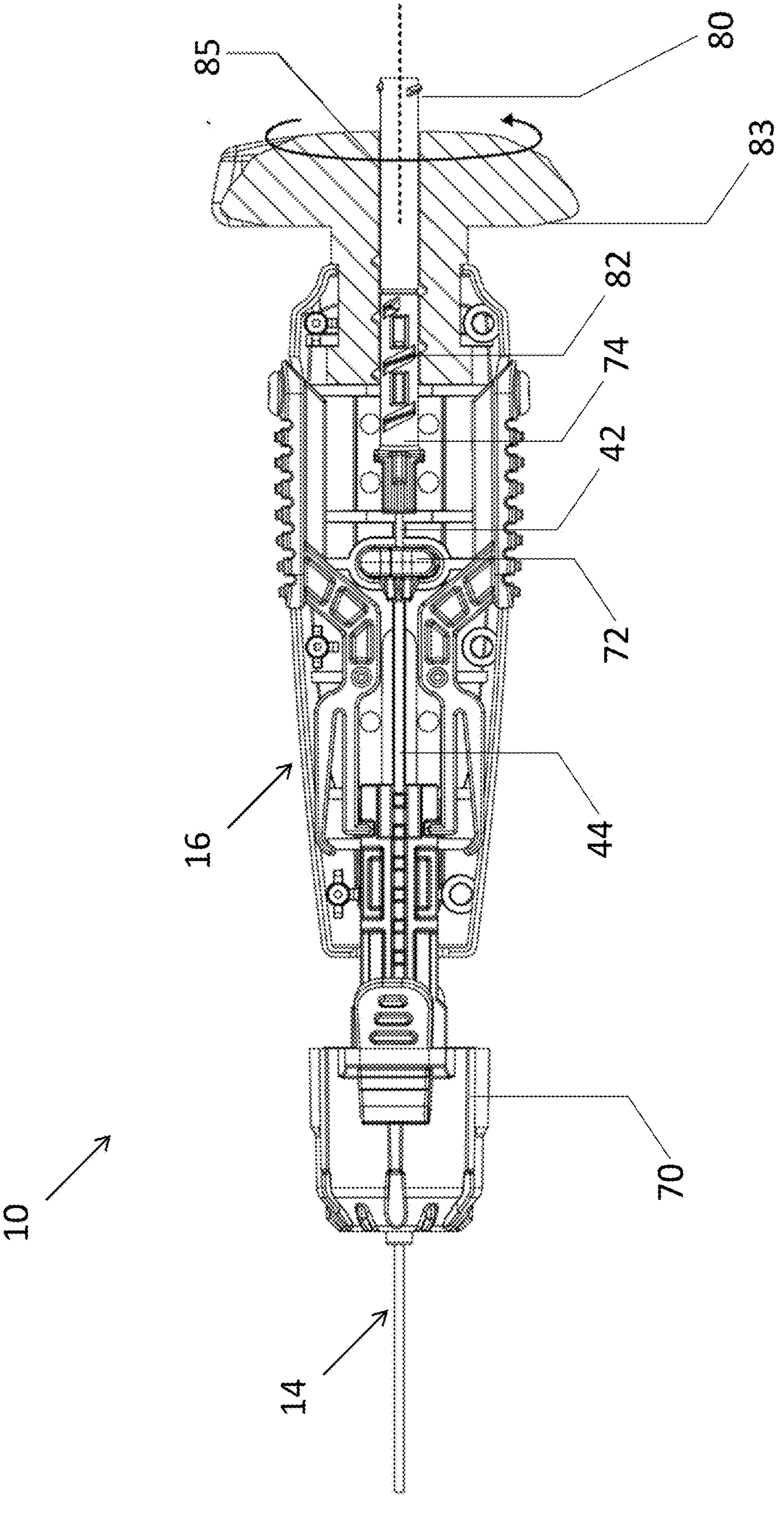
FIG. 30 is a cross sectional view of the user interface of FIG. 29 being operated to form a bend in the sheath in a second direction, according to some of the present disclosure.
Figure 31:
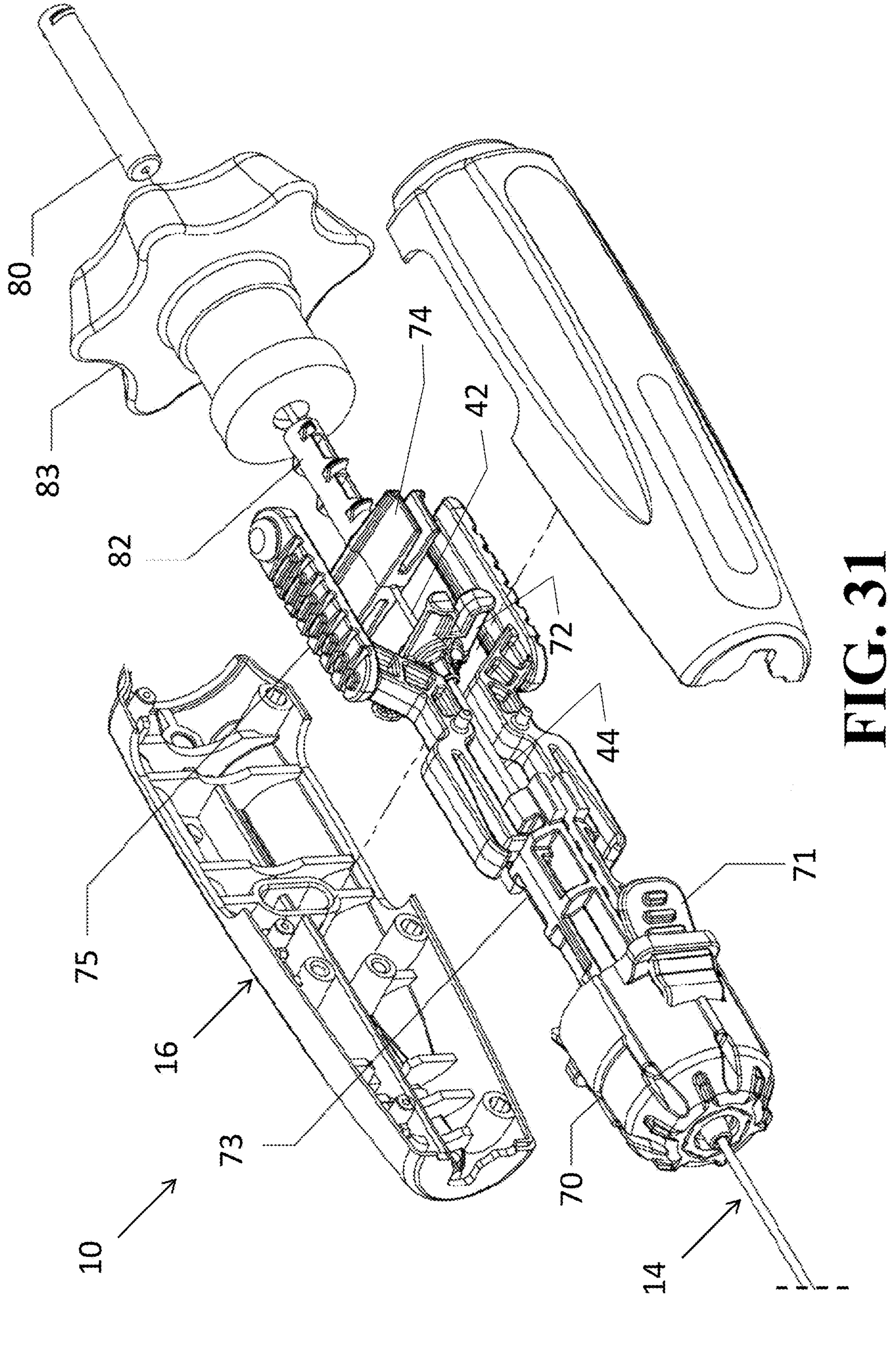
FIG. 31 is an exploded view of the user interface of FIG. 29, according to some embodiments of the present disclosure.

Referring particularly to FIGS. 29-31, such translation of the first tube 42 relative to the second tube 44 may be achieved via a rotary knob interface, according to some embodiments of the present disclosure. Such a rotary knob interface may use a number of rotary-to-linear transmissions (e.g., leadscrew, slider-crank, barrel cam, rack and pinion). Accordingly, the user interface 16 may include a knob 83 attached to the first tube mount 74, and a lead screw 82 positioned in between the knob 83 and the second tube mount 72. In this sense, the lead screw 82 may be rigidly attached to the first tube mount 74, which may be disposed within a threaded surface of the lead screw 82 coupled to the knob 83.

As the knob 83 is rotated in a first direction 84 (depicted with particular reference to FIG. 29), the lead screw 82 may be driven forward, pressing the first tube mount 74 towards the second tube mount 72 (thus pushing the first tube 42 with respect to the second tube 44) and causing the sheath 18 to deflect in the first direction 24, such that the distal end 19 of the sheath 18 travels along the first path of curvature 25, as shown with reference to FIGS. 2 and 13. As the knob 83 is rotated in a second direction 85 (depicted with particular reference to FIG. 30), the lead screw 82 may be driven backwards, drawing first tube mount 74 away from the second tube mount 72 (thus pulling the first tube 42 with respect to the second tube 44) and causing the sheath 18 to deflect in the second direction 26, such that the distal end 19 of the sheath 18 travels along the second path of curvature 27, as shown with reference to FIGS. 2 and 11.

In some embodiments, the lead screw 82 is non-back-driveable. In this sense, when the input torque is removed from the knob 83, the position of the lead screw 82 is maintained, thereby preserving the orientation of the sheath 18.

Figure 32:
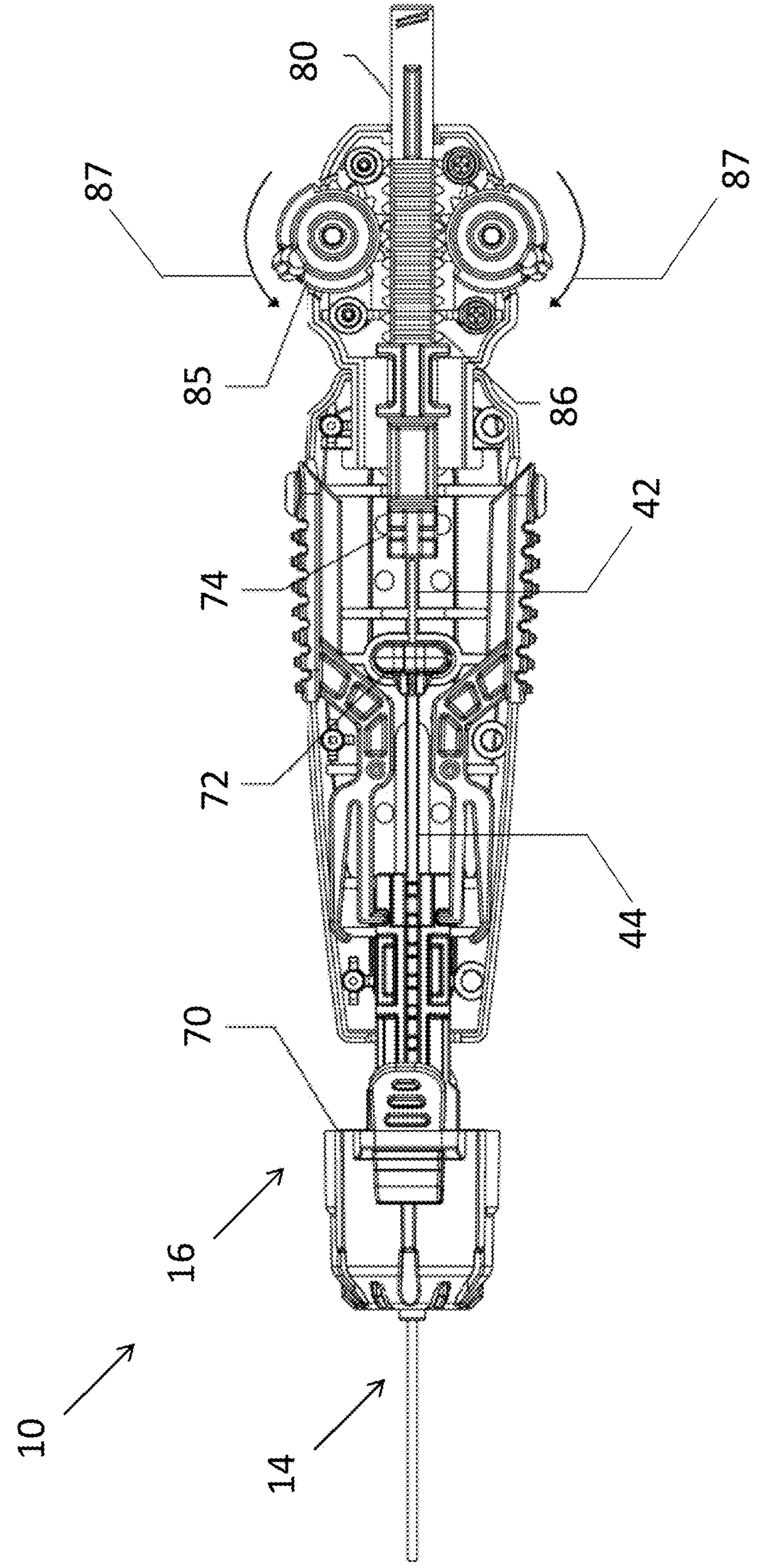
FIG. 32 is a cross sectional view of a user interface of an apparatus for endoscopic laser surgery being operated to form a bend in a sheath in a first direction, according to further embodiments of the present disclosure.
Figure 33:
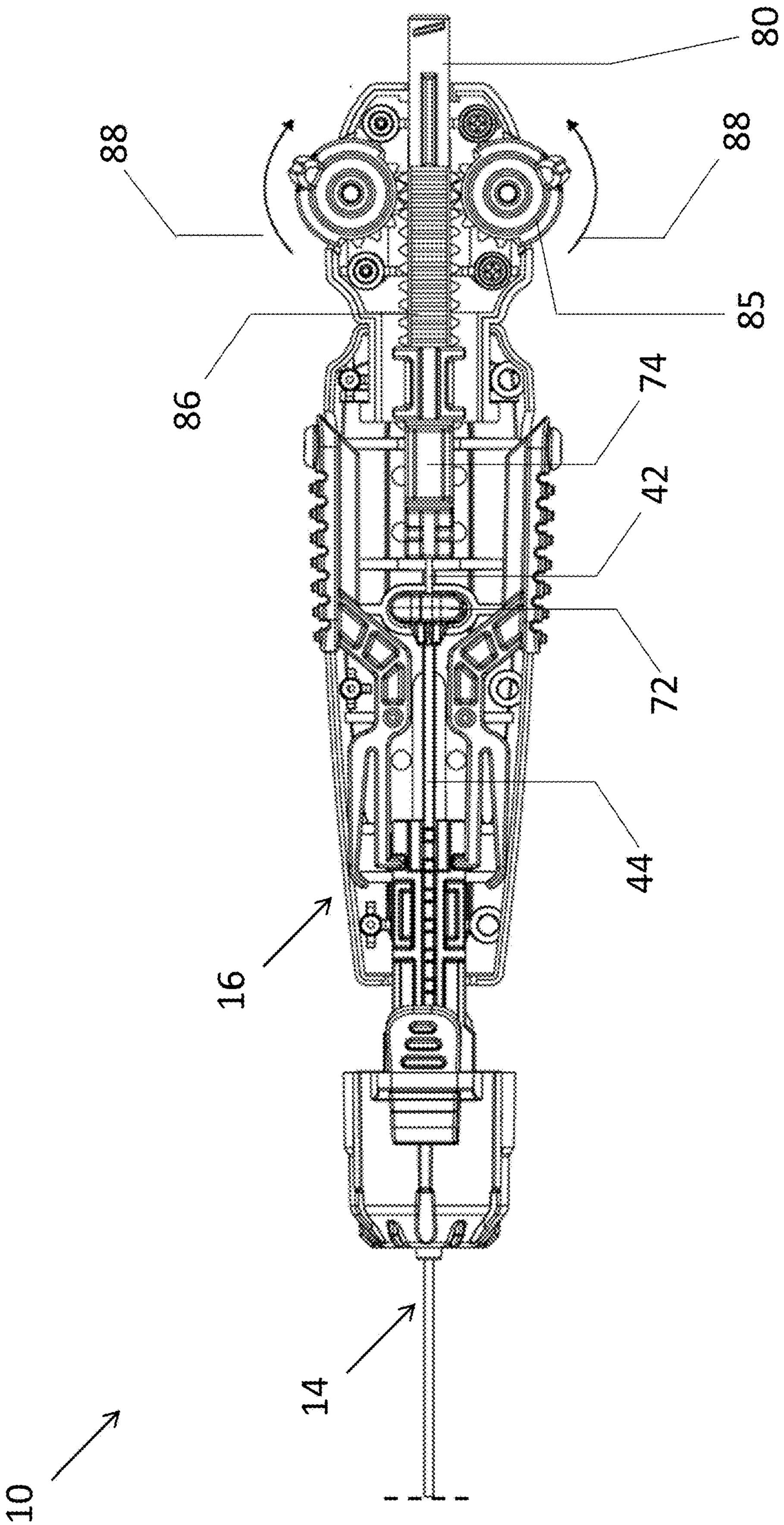
FIG. 33 is a cross sectional view of the user interface of FIG. 32 being operated to form a bend in the sheath in a second direction, according to some embodiments of the present disclosure.
Figure 34:
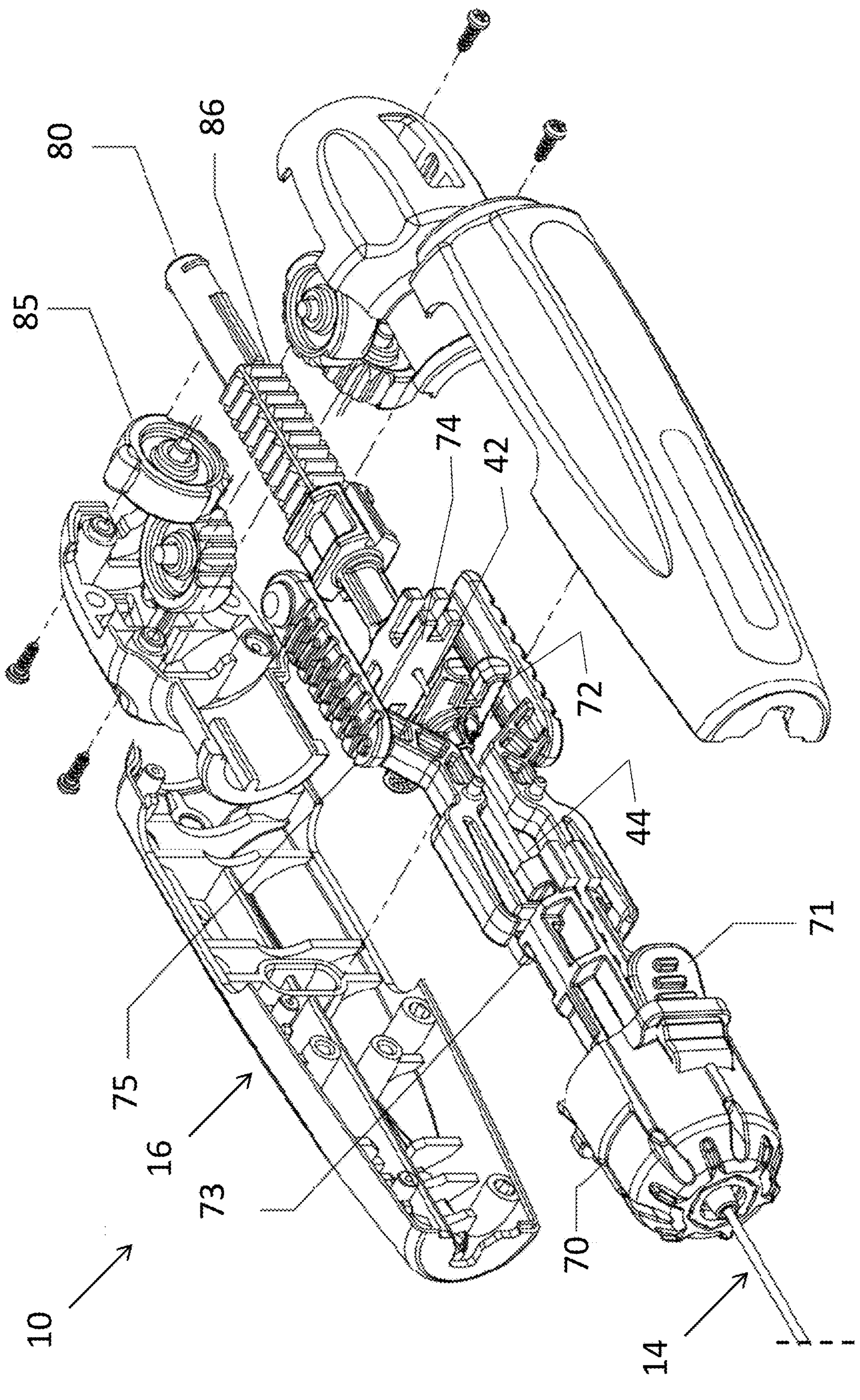
FIG. 34 is an exploded view of the user interface of FIG. 32, according to some embodiments of the present disclosure.
Figure 35:
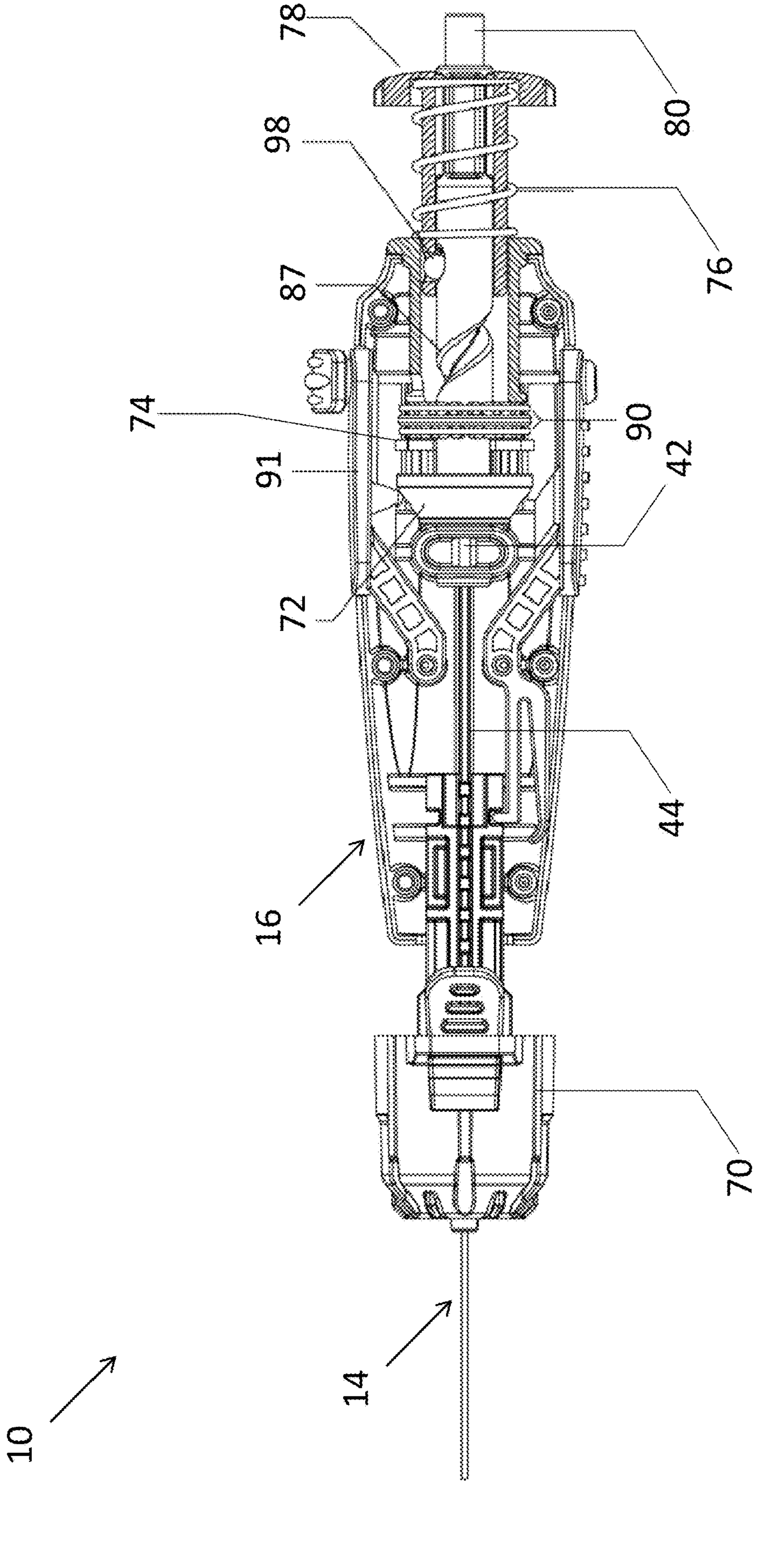
FIG. 35 is a cross sectional view of a user interface of an apparatus for endoscopic laser surgery, according to alternative embodiments of the present disclosure.

Referring particularly to FIGS. 32-34, such translation of the first tube 42 relative to the second tube 44 may be achieved via a thumbwheel and a rack-pinion mechanism. Accordingly, the user interface 16 may include a central drive rack 86 attached to the first tube mount 74, which may be driven towards or away from the second tube mount 72 via one or more input pinions 85. In this sense, the one or more input pinions 85 may surround the central drive rack 86, such that rotations applied to the input pinions 85 may be converted into a linear translation of the drive rack 86 (and thus the first tube mount 74 which is mechanically fixed to the first tube 42).

As the pinions 85 are rotated in a first direction 87 (depicted with particular reference to FIG. 32), the drive rack 86 may be driven forward, pressing the first tube mount 74 towards the second tube mount 72 (thus pushing the first tube 42 with respect to the second tube 44) and causing the sheath 18 to deflect in the first direction 24, such that the distal end 19 of the sheath 18 travels along the first path of curvature 25, as shown with reference to FIGS. 2 and 13.

As the pinions 85 are rotated in a second direction 88 (depicted with particular reference to FIG. 33), the drive rack 86 may be driven backwards, drawing the first tube mount 74 away from the second tube mount 72 (thus pulling the first tube 42 with respect to the second tube 44) and causing the sheath 18 to deflect in the second direction 26, such that the distal end 19 of the sheath 18 travels along the second path of curvature 27, as shown with reference to FIGS. 2 and 11.

Referring particularly to FIGS. 35-38, rotation of the laser-sheath assembly 14 (as depicted with reference to FIG. 15) may be achieved via a rotary motion of the laser-sheath assembly 14 with respect to the tubing 15, according to some embodiments of the present disclosure. In some embodiments, rotation of the laser-sheath assembly 14 is achieved via a gross rotation of the entire user interface 16, enabled by a rotary bearing interface on the working port 17 of the endoscope 12 (depicted with reference to FIG. 1), or through a rotation of the user interface 16 with respect to the handle 13 of the endoscope 12 (if the user interface 16 is not rigidly attached to the handle 13 via the working port 17).

In further embodiments, the laser-sheath assembly 14 is independently rotated within the user interface 16 via an actuation knob or plunger coupled to a transmission through a rotary bearing interface. For example, as discussed above, the plunger 78 may be attached to the first tube mount 74 (which is attached to the first tube 42), and the second tube mount 72 may be attached to the second tube 44. In some embodiments, the plunger 78 is coupled to a rotary sub-assembly that rotates both the first and second tubes 42, 44 at the same time. For example, the first tube mount 74 may include a helical groove machined into a cylindrical cam 87 (which may be rigidly mounted to the first tube 42), and a hole that spatially constrains a ball bearing 98.

To keep the plunger 78 from rotating with the cylindrical cam 87, the first tube mount 74 may include a cam drum 89, and a keyway may be formed on the plunger 78, which rides along a linear rail designed formed on the cam drum 89. As the plunger 78 is driven forward, the ball bearing 98 and the helical groove on the cylindrical cam 87 may create a barrel cam transmission which causes the cylindrical cam 87 to rotate axially. In this sense, the pitch of the groove on the cylindrical cam 87 may determine the amount of rotation that is generated over the linear travel of the plunger 78, as shown with reference to FIG. 37. The second tube 44 may be rotated along with the first tube 42 (e.g., through rotation coupling), while also allowing the first and second tubes 42, 44 to be linearly displace with respect to each-other, thereby imparting deflection of the tip 19 of the steerable sheath 18. This may be achieved by a keyed sliding surface which transmits torques between the cylindrical cam 87 and the second tube mount 72.

Figure 36:
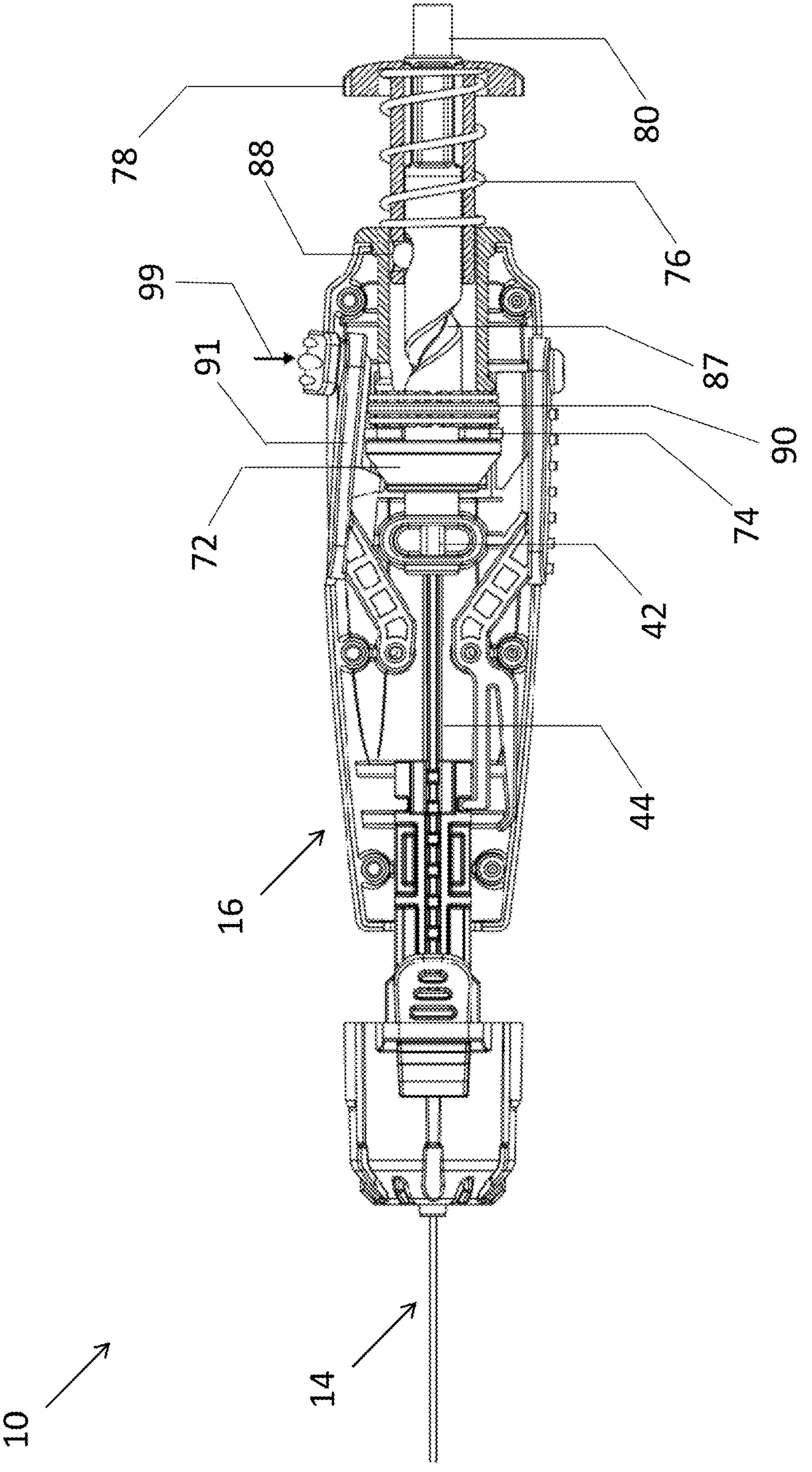
FIG. 36 is a cross sectional view of the user interface of FIG. 35 being operated to form a bend in a sheath, according to some embodiments of the present disclosure.
Figure 37:
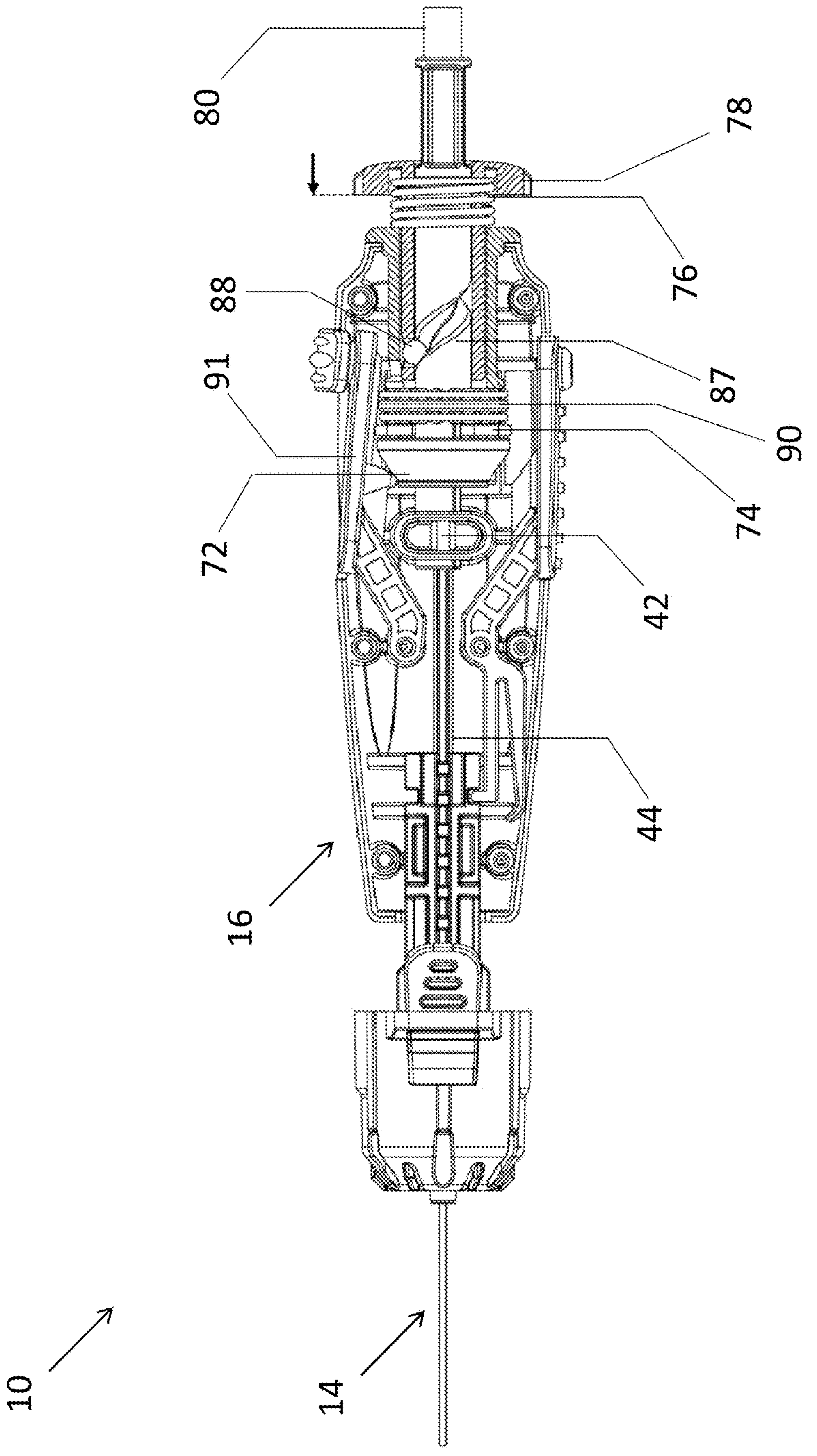
FIG. 37 is a cross sectional view of the user interface of FIG. 35 being operated to rotate a sheath, according to some embodiments of the present disclosure.
Figure 38:
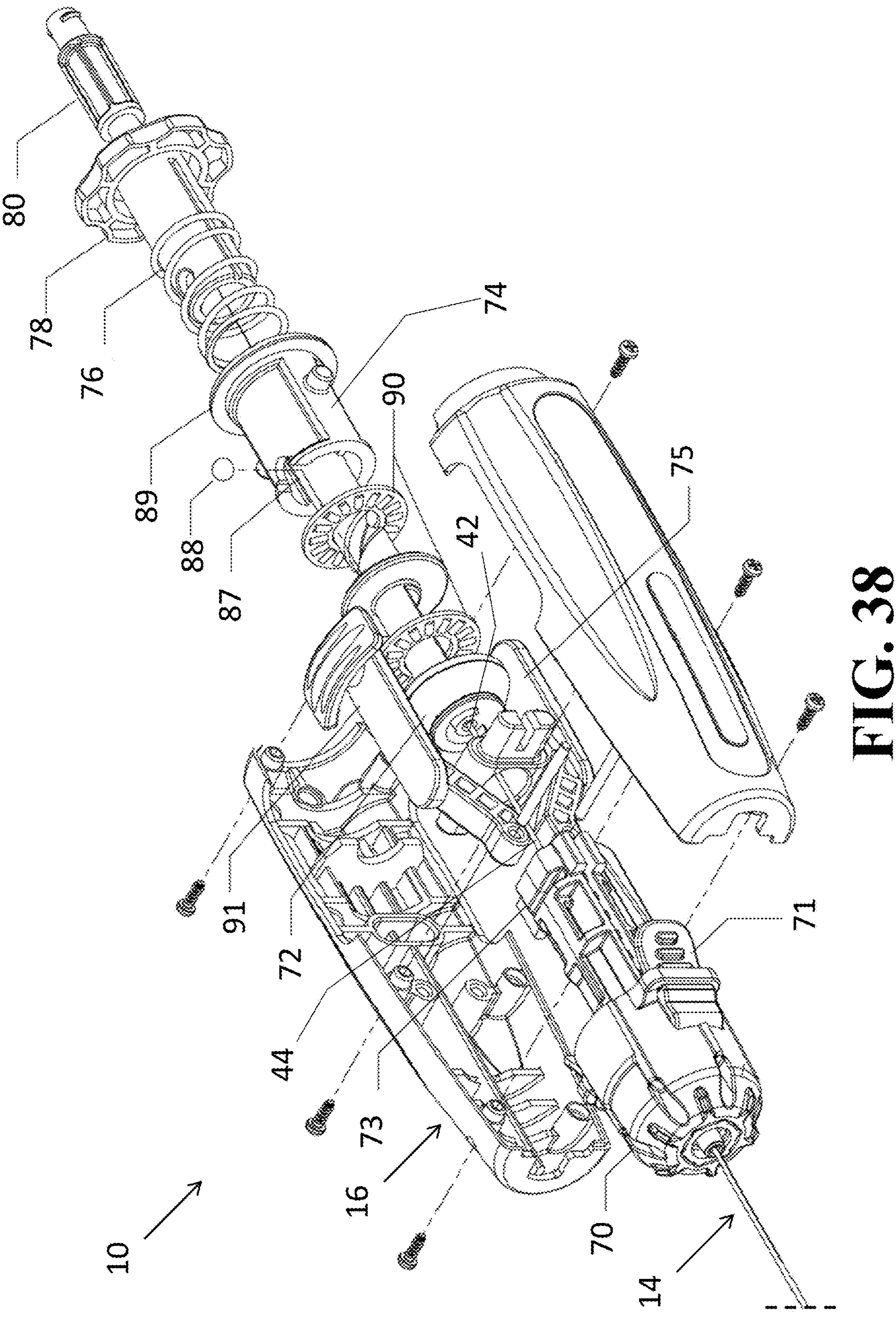
FIG. 38 is an exploded view of the user interface of FIG. 35, according to some embodiments of the present disclosure.
Figure 39:
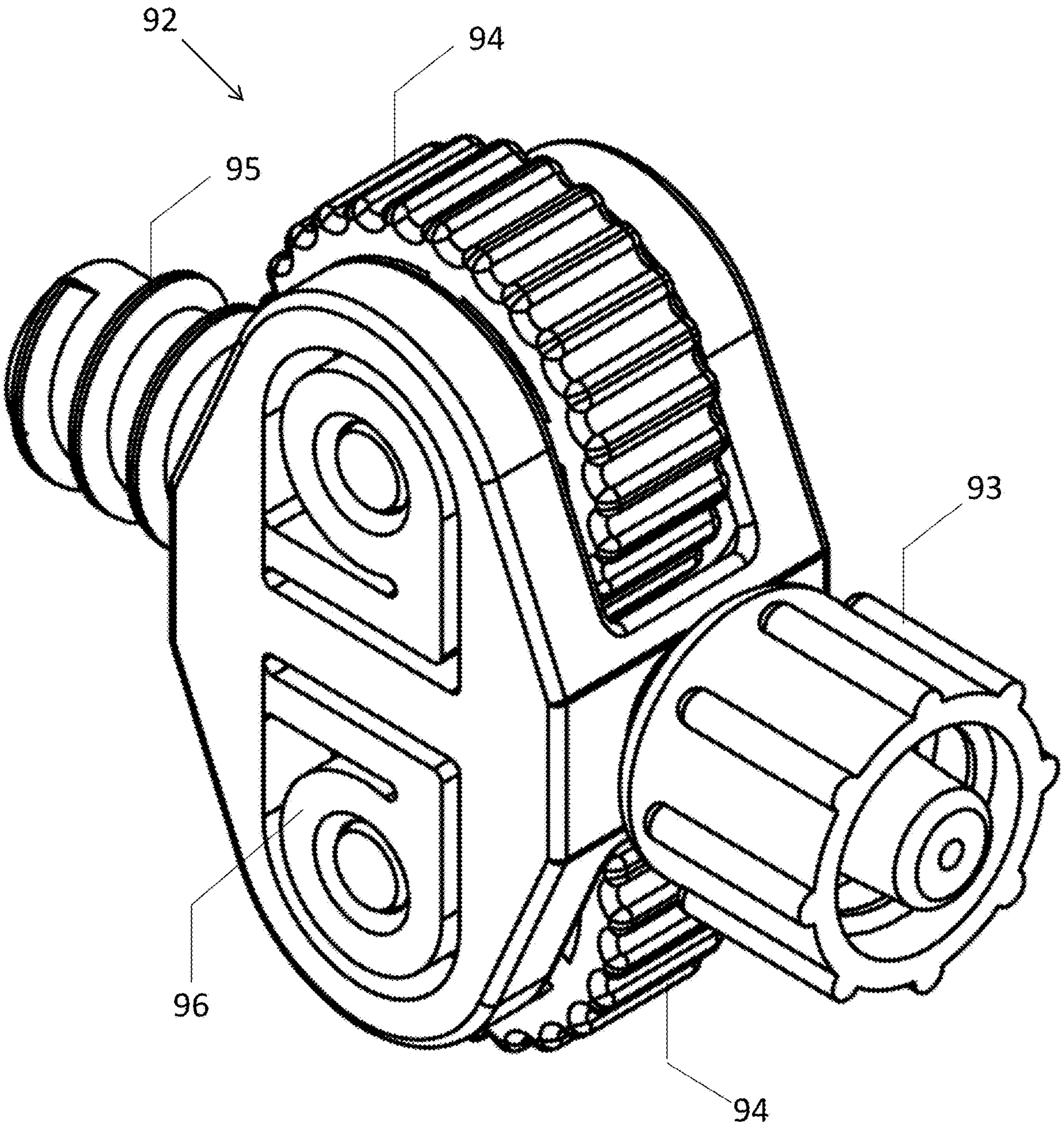
FIG. 39 is a perspective view of a feeding device for translating a laser fiber of an apparatus for endoscopic laser surgery, according to some embodiments of the present disclosure.
Figure 40:
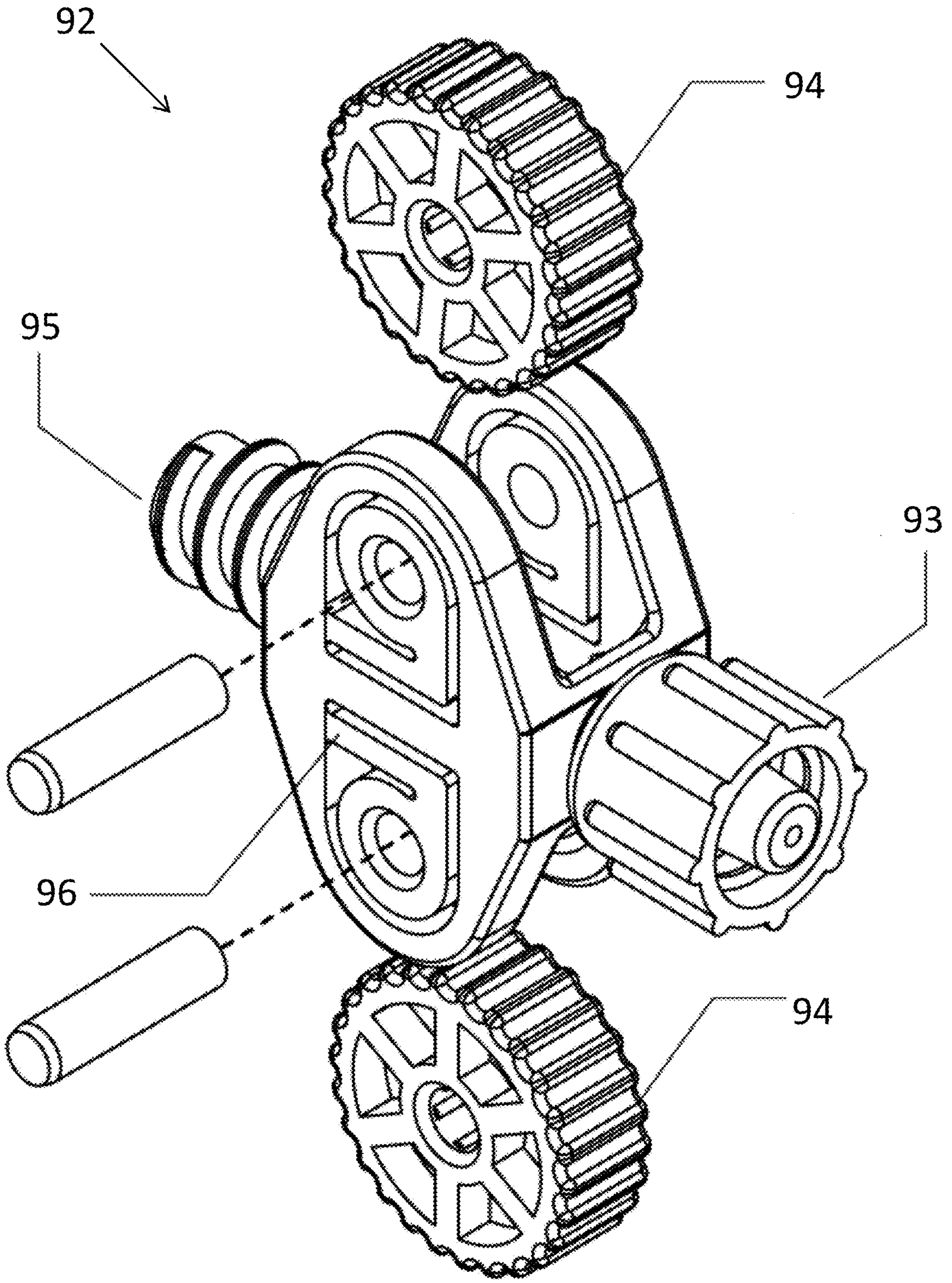
FIG. 40 is an exploded view of the feeding device of FIG. 39, according to some embodiments of the present disclosure.
Figure 41:
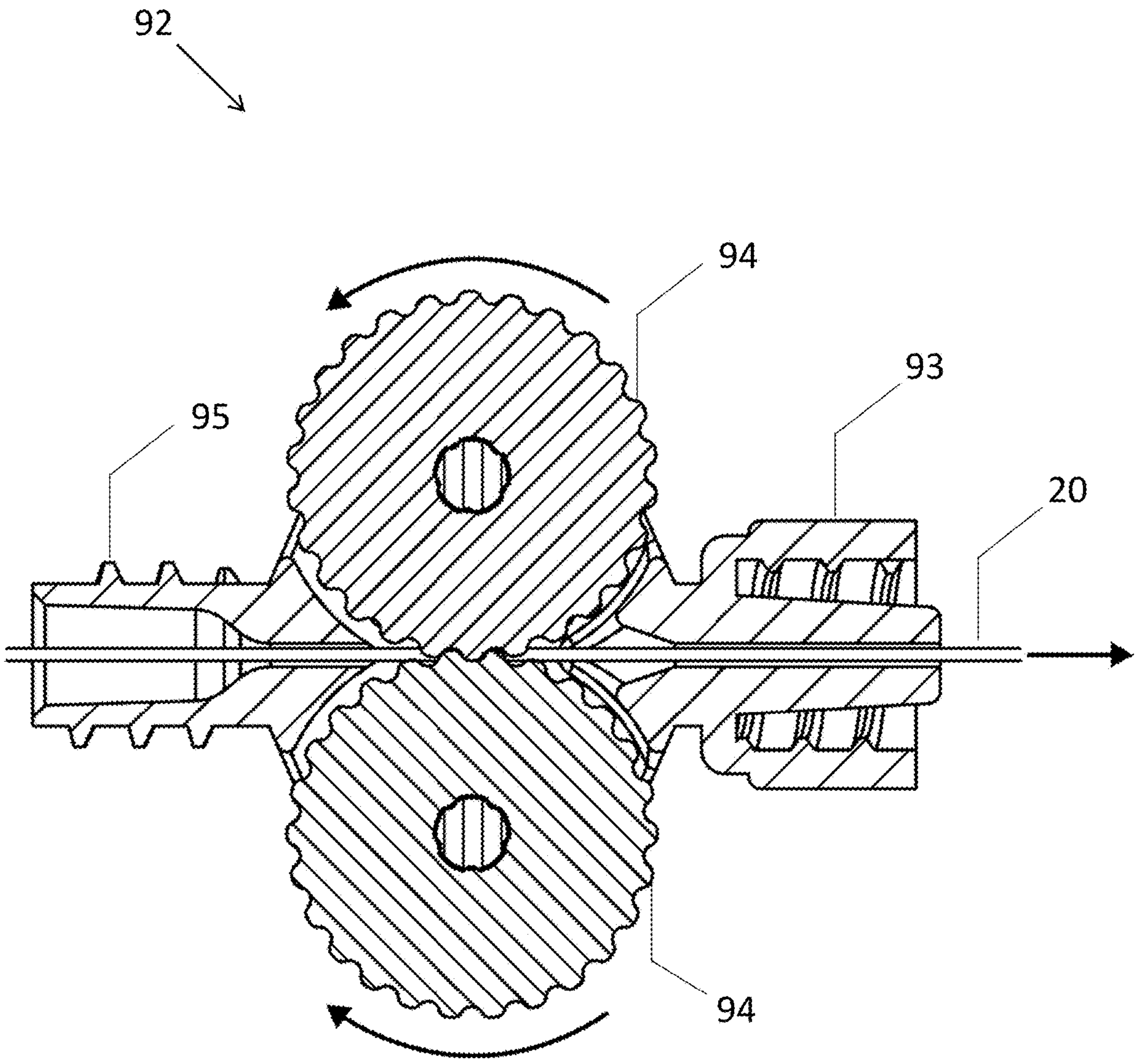
FIG. 41 is a cross-sectional view of the feeding device of FIG. 39, according to some embodiments of the present disclosure.
Figure 42:
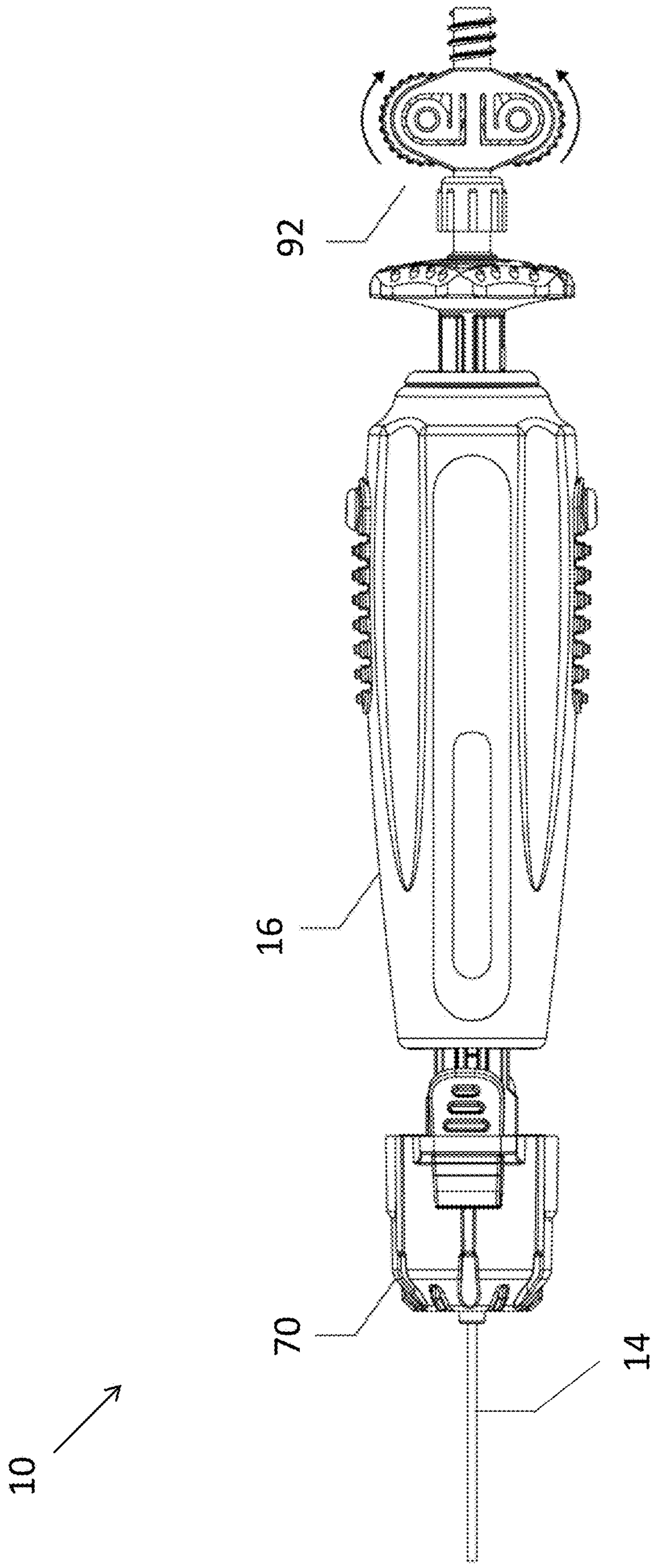
FIG. 42 is a side view of a user interface of an apparatus for endoscopic laser surgery with the feeding device of FIG. 39 being operated to project the laser fiber from a sheath, according to some embodiments of the present disclosure.
Figure 43:
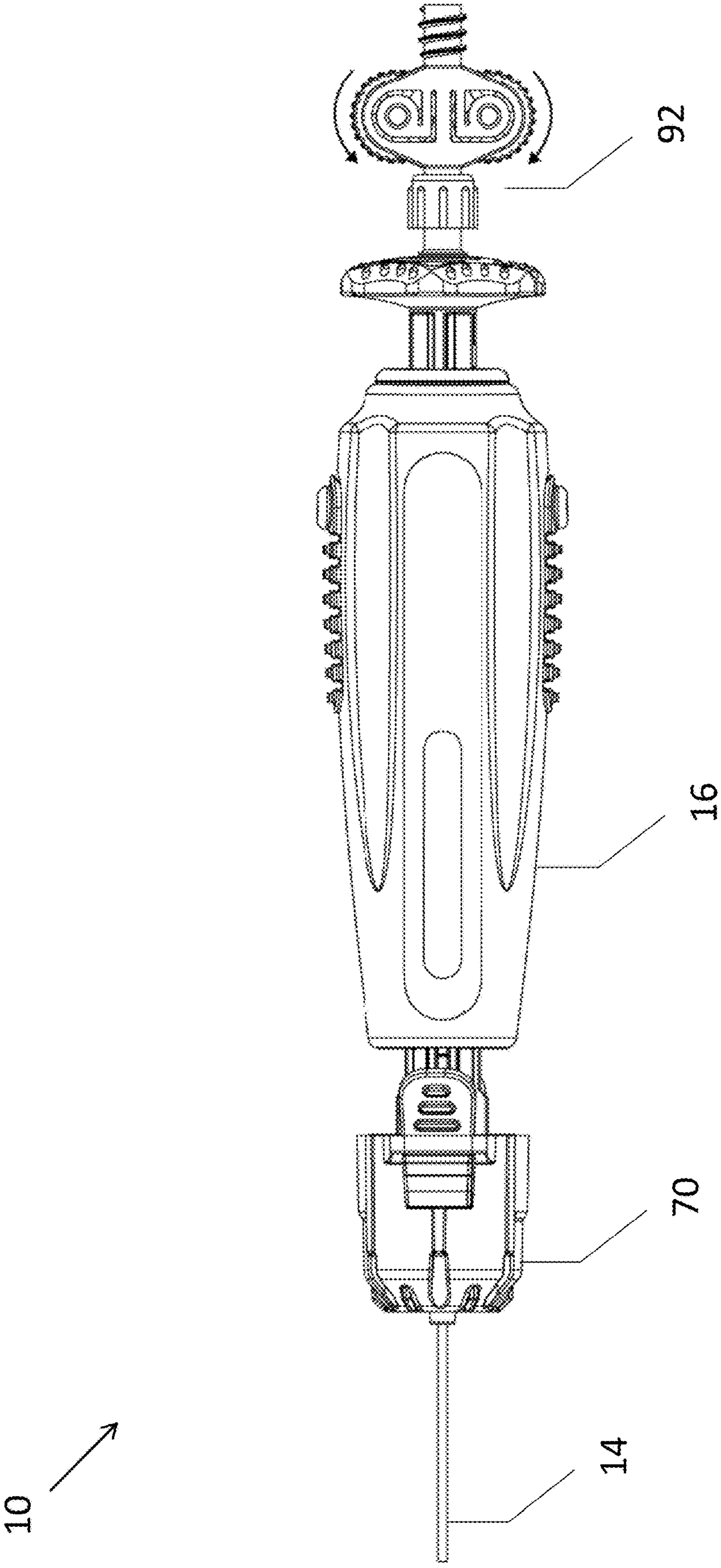
FIG. 43 is a side view of the user interface of FIG. 42, being operated to retract the laser fiber into the sheath, according to some embodiments of the present disclosure.

In such embodiments, and as shown with reference to FIG. 36, an input actuation 99 may be pressed in order to pivot a deflection lever 91, thereby activating the inner tube mount 72 discussed above for pushing the first tube 42 with respect to the second tube 44 and causing the sheath 18 to deflect in the first direction 24, such that the distal end 19 of the sheath 18 travels along the first path of curvature 25, as shown with reference to FIGS. 2 and 13.

Referring generally to FIGS. 26-38, insertion and retraction of the laser-sheath assembly 14 relative to the tubing 15 may be actuated in any number of ways. For instance, such insertion and retraction may be achieved through a gross axial motion of the user interface 16, which may be enabled by a linear bearing interface on the working port 17 between the user interface 16 and the handle 13 of the endoscope 12 (if the user interface 16 is rigidly attached to the handle 13), or simply through linear translation of the user interface 16 with respect to the handle 13 (if the user interface 16 is not rigidly attached to the handle 13 at the working port 17).

In further embodiments, a translation mechanism configured to facilitate the aforementioned insertion or retraction of the laser-sheath assembly 14 may include a locking mechanism to maintain the translation of the user interface 16 with respect to the endoscope 12 when the actuating force or torque (e.g., the actuation to translate the user interface 16 with respect to the endoscope 12) is removed. Such locking may also be achieved via a friction interface between the user interface 16 and the working port 17. In even further embodiments, the apparatus 10 includes a spring-preloaded return mechanism to bias the laser-sheath assembly 14 to be passively-inserted or passively-retracted relative to the tubing 15 of the endoscope 12.

In some embodiments, inserting and retracting laser fiber 20 with respect to the sheath 18 is facilitated by a linear motion, where the proximal end of the laser fiber 20 must be linearly displaced with respect to the proximal end of the sheath 18. For example, a pass-through may be achieved where a user controls the insertion of the laser fiber 20 into the proximal end of the user interface 16 directly. In some cases, the apparatus 10 includes a Tuohy-Borst connector to lock the inserted position of the laser fiber 20 at the proximal end of the sheath 18.

Referring now to FIGS. 39-43, the user interface 16 may include a feeding device 92. The feeding device 92 may be an attachment to facilitate inserting the laser fiber 20 into the proximal end of the user interface 16. Advantageously, the feeding device 92 may be useful for where the laser fiber 20 is a smaller-diameter laser fiber that is prone to kinking.

In some embodiments, the feeding device 92 includes a male luer attachment 93 for enabling the feeding device 92 to be removably attached to a corresponding female luer receptacle on the proximal end of the user interface 16 (e.g., the luer 80). The feeding device 92 may include two opposing friction rollers 94 which are pre-loaded against each other via flexural elements 96 that are integrated into the feeding device 92. The laser fiber 20 may be inserted into an inlet luer fitting 95 of the feeding device 92. In turn, the laser fiber 20 may be engaged by the opposing friction rollers 94. As shown with particular reference to FIG. 41-43, by rotating the opposing friction rollers 94 in a first direction (as shown with reference to FIG. 42), the laser fiber 20 may be axially advanced (as shown with reference to FIG. 16), and by rotating the opposing friction rollers 94 in a second direction (opposite the first, as shown with reference to FIG. 43) the laser fiber 20 may be axially retracted (as shown with reference to FIG. 17).

Depending on the implementation, the feeding device 92 may be constructed from a suitable injection-molded biocompatible polymer (i.e. PC or ABS). The opposing friction rollers 94 may optionally be constructed from a low-durometer silicone or thermoplastic elastomer (TPE) with frictional properties suitable for gripping the laser fiber 20 as it the laser fiber 20 is passed through the opposing friction rollers 94.

Referring generally to FIGS. 26-43, the user interface 16 may include a scope mount 70. The scope mount 70 may be a mechanism for rigid attachment of the user interface 16 to the working port 17 of the endoscope 12 through which the laser-sheath assembly 14 is passed.

In some embodiments, the scope mount 70 is a female luer connector that is screwed onto a male luer fitting on the working port 17, facilitating a standard working port configuration in third-party endoscopes. In other embodiments, the scope mount 70 includes a scope attachment quick release 71, which may provide a "snap-on" engagement between the user interface 16 and the working port 17. In other embodiments still, the user interface 16 includes a strap or band for tightening around the handle 13 of the endoscope 12 for additional mechanical security. In further embodiments, the user interface 16 itself is free-floating. For instance, the scope mount 70 may be replaced with a strain relieving member to limit the strain experienced by the laser-sheath assembly 14 as it exits the user interface 16.

Figure 44:
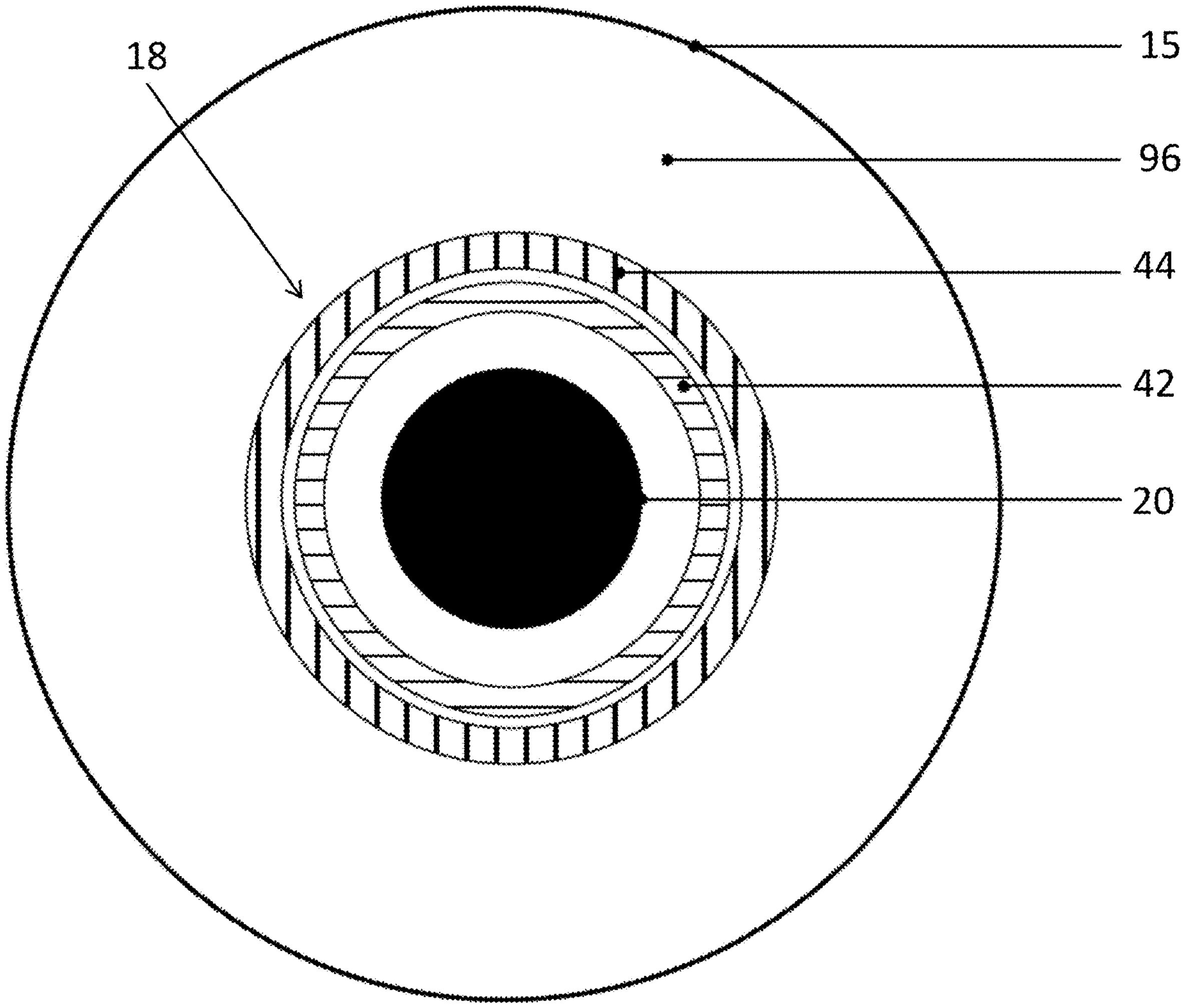
FIG. 44 is an axial cross-sectional view of a laser-sheath assembly for an apparatus for endoscopic laser surgery, according to other embodiments of the present disclosure.
Figure 45:
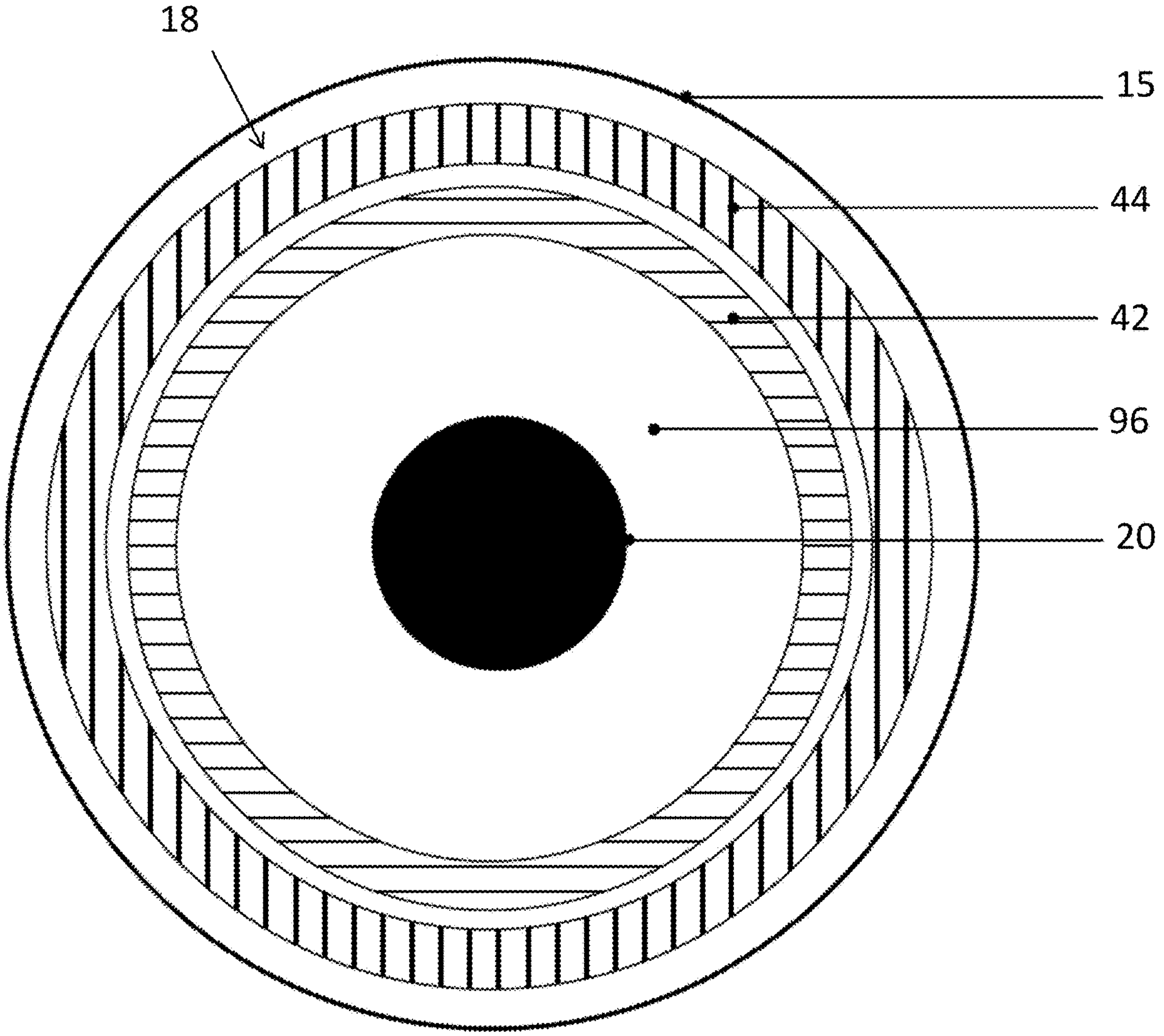
FIG. 45 is an axial cross-sectional view of a laser-sheath assembly for an apparatus for endoscopic laser surgery, according to further embodiments of the present disclosure.

Referring now to FIGS. 44-45, methods for irrigant delivery to a surgical site via the apparatus 10 are discussed, according to some embodiments of the present disclosure. For instance, maintaining sufficient irrigation is of critical importance for managing appropriate intrarenal pressure during flexible ureteroscopy. Too little irrigation can cause tissue injury due as the heat generated from laser lithotripsy is not properly dissipated. Further, too little irrigation can result in fluid and detritus build-up which can obfuscate the surgical field of view. As such, it is desirable to design for appropriate irrigant delivery to the surgical site.

Given the typical working channel size of standard flexible ureteroscopes (3.6 F, or 1.2 mm), the presence of any tool within the working channel (e.g., the tubing 15) can reduce irrigation flow. Accordingly, the user interface 16 and sheath 18 may be configured such that irrigant can either (1) pass through the sheath 18 (between the sheath 18 and the laser fiber 20) and be delivered to the surgical site, or (2) pass around the sheath 18 within the tubing 15 of the endoscope 12 and be delivered to the surgical site, as shown in FIGS. 44 and 45.

As shown with particular reference to FIG. 44, irrigant may pass between the outside of the sheath 18 and within the tubing 15 (e.g., through an irrigant path 96 between the second tube 44 and the tubing 15). For instance, the laser fiber 20 may be inserted into the proximal end of the sheath 18 through a Y-connector, where one leg of the 'Y' features an irrigation inlet, and the other leg of the 'Y' features a Tuohy-Borst connector which can be tightened around the laser fiber to establish a water-tight seal and prevent backflow of the irrigant, thereby promoting irrigation flow through the sheath and around the laser fiber.

As shown with particular reference to FIG. 45, irrigant may pass between the outside of the laser fiber 20 and inside the sheath 18. In this sense, the aforementioned irrigant path 96 may be between the laser fiber 20 and the first tube 42. For example, irrigation may be plumbed into the system between the handle and the working channel via an integrated T-connector, and the interface between the handle and the T-connector is made water-tight through the integration of a rubber seal to prevent leakage and backflow, thereby promoting irrigant flow around the sheath within the working channel. Irrigant may be pumped into the system using any number of irrigation methods, including a gravity-fed irrigant bag, a single-action syringe pump, or an automated peristaltic pump.

Referring now to FIGS. 46-49, the apparatus 100 may also have utility in rigid endoscopic procedures, according to some embodiments of the present disclosure. For instance, the apparatus 100 may have utility in rigid endoscopic procedures that target the prostate and the bladder using a trans-urethral approach. For instance, in the embodiments shown with reference to FIGS. 46-49, the tubing 15 of the endoscope 12 may be a rigid endoscope tube (rather than a flexible tube).

Another potential clinical application of the apparatus 100 may be the endoscopic removal of central airway obstructions, in which the current standard-of-care utilizes a similarly rigid endoscope to direct and steer laser fibers (e.g., the laser-sheath assembly 14) in a patient's throat to remove airway obstructions. In such procedures, the standard technique may require the physician to physically move and rotate a rigid endoscope to steer the laser which can put substantial force and torque on the patient, potentially causing trauma and complications. The ability to steer the laser fiber (e.g., by operating the laser-sheath assembly 14 as discussed herein) independently of the rigid endoscope may allow the physician to keep the rigid endoscope stationary, thereby alleviating pressure on the patient.

In such embodiments related to rigid endoscope procedures, the proximal section 46 of the sheath 18 (e.g., the flexible section 52 and the stiff section 50) shown with reference to FIGS. 9 and 10 may not be necessary. Rather, the base 47 of the sheath 18 may be entirely rigid (e.g., the rigid section 54 may make up the entirety of the base 47 of the sheath 18). In other embodiments, passive flexibility along the base 47 of the sheath 18 may be desirable to prevent accidental misalignment between the laser-sheath assembly 14 and the rigid tubing 15 through which it is passed.

Figure 46:
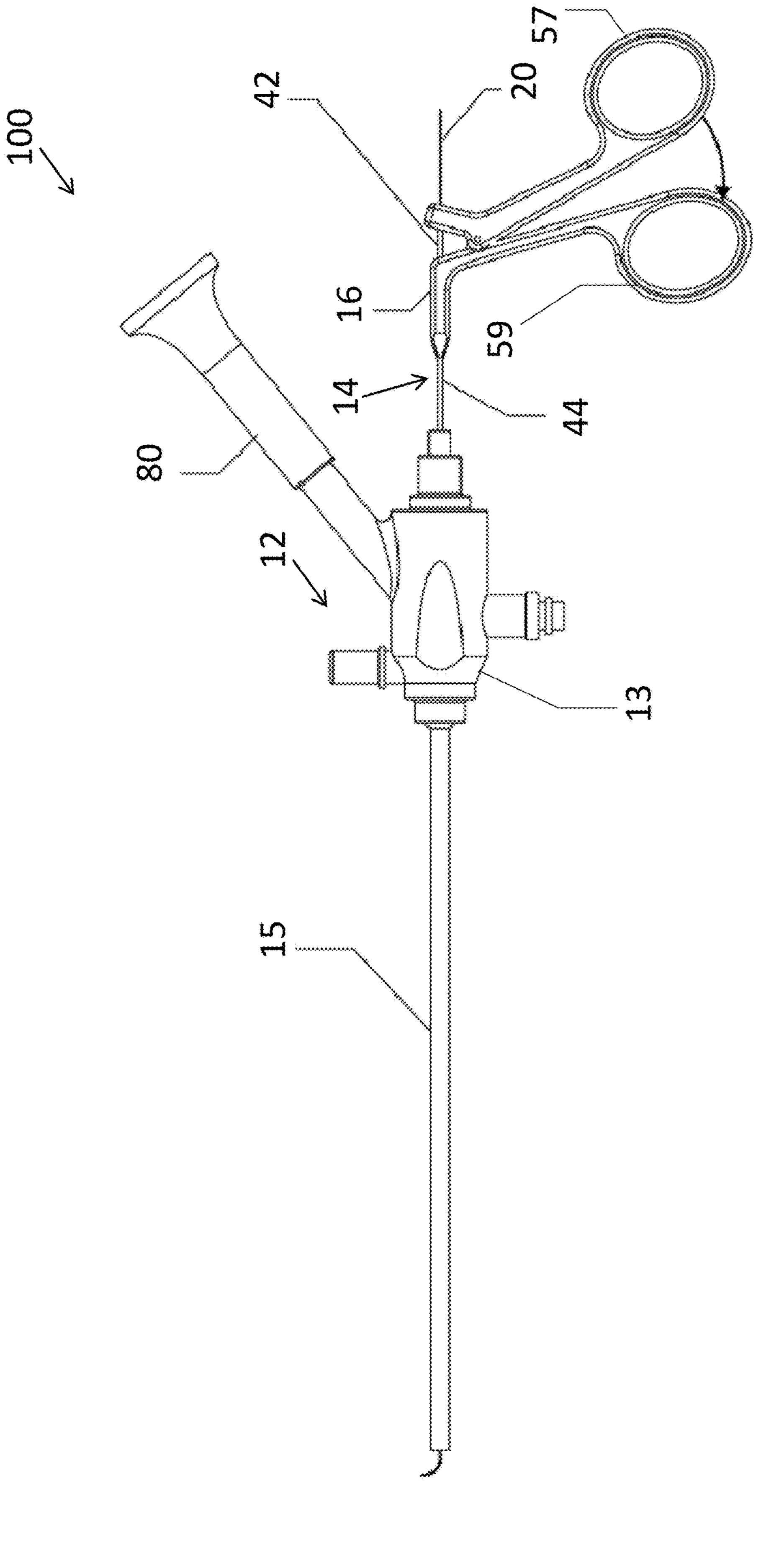
FIG. 46 is a side view of a user interface of an apparatus for endoscopic surgery being operated to form a bend in a sheath in a first direction, according to more embodiments of the present disclosure.
Figure 47:
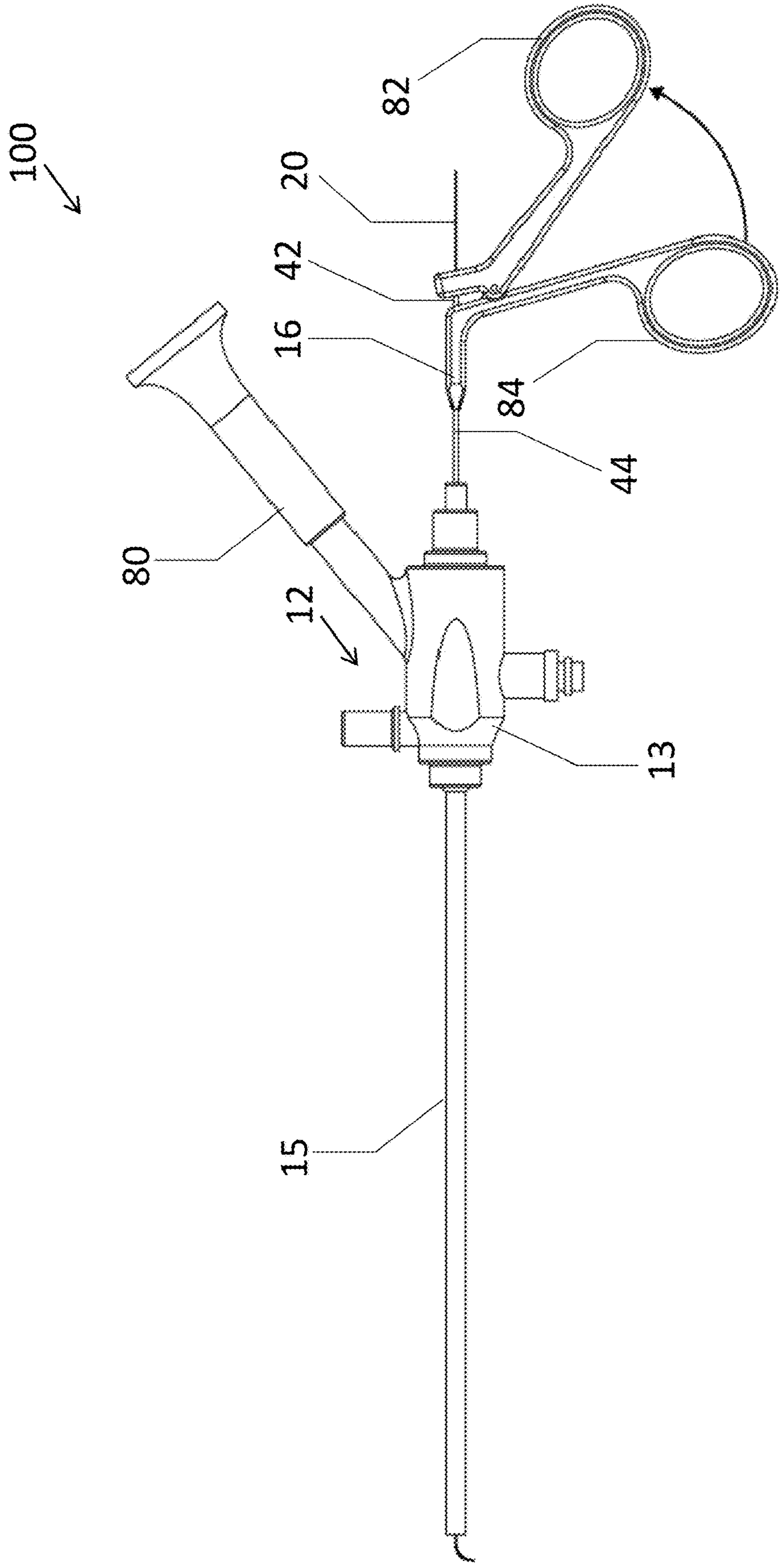
FIG. 47 is a side view of the user interface of FIG. 46 being operated to form a bend in the sheath in a second direction, according to some embodiments of the present disclosure.

As a first example, in FIGS. 46 and 47 the laser-sheath assembly 14 is shown passed through the tubing 15 of the endoscope 12, where the endoscope 12 is a rigid cystoscope or nephroscope. The laser-sheath assembly 14 may be actuated by the user interface 16 which, in some embodiments, is a scissor mechanism-based user interface. In such embodiments, the user interface 16 may include a first scissor component 57 and a second scissor component 59 which, when moved in relation to one another, imparts the differential motion between the first and second tubes 42, 44 of the sheath 18. For instance, when the first and second scissor components 57, 59 are moved together as shown with particular reference to FIG. 46, the first tube 42 may be pushed with respect to the second tube 44 and causing the sheath 18 to deflect in the first direction 24, such that the distal end 19 of the sheath 18 travels along the first path of curvature 25, as shown with reference to FIGS. 2 and 13. In turn, when the first and second scissor components 57, 59 are moved apart as shown with particular reference to FIG. 47, the first tube 42 may be pulled with respect to the second tube 44, causing the sheath 18 to deflect in the second direction 26, such that the distal end 19 of the sheath 18 travels along the second path of curvature 27, as shown with reference to FIGS. 2 and 11.

Figure 48:
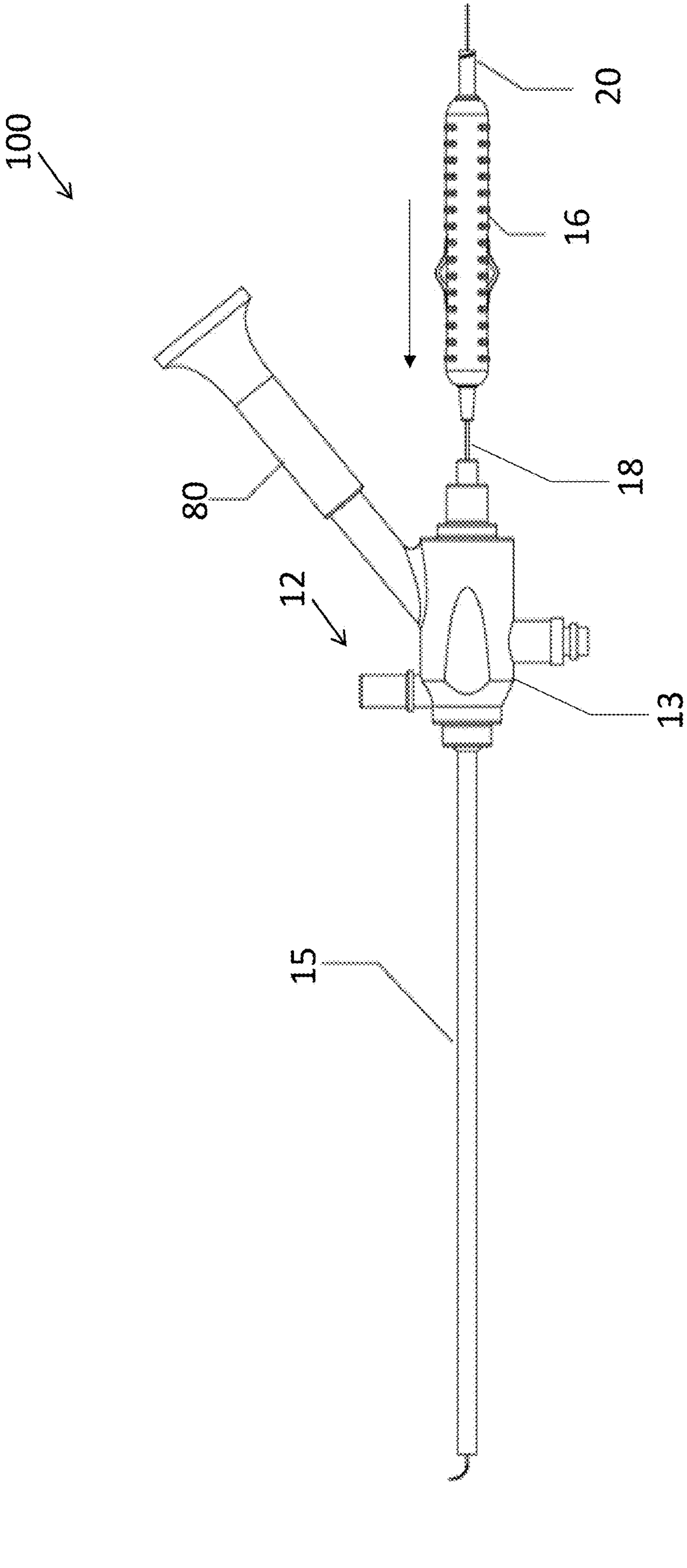
FIG. 48 is a side view of a user interface of an apparatus for endoscopic surgery being operated to form a bend in a sheath in a first direction, according to supplemental embodiments of the present disclosure.
Figure 49:
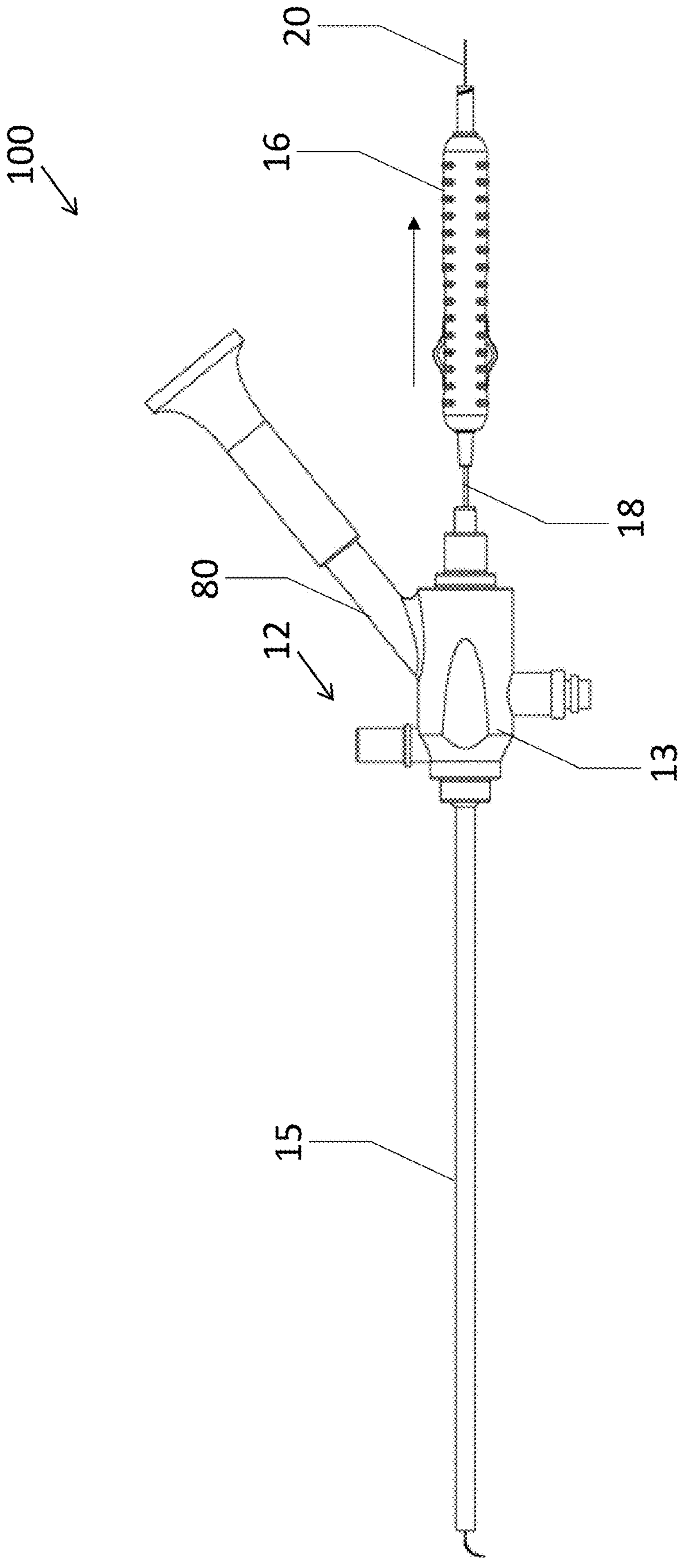
FIG. 49 is a side view of the user interface of FIG. 48 being operated to form a bend in the sheath in a second direction, according to some embodiments of the present disclosure.
Figure 50:
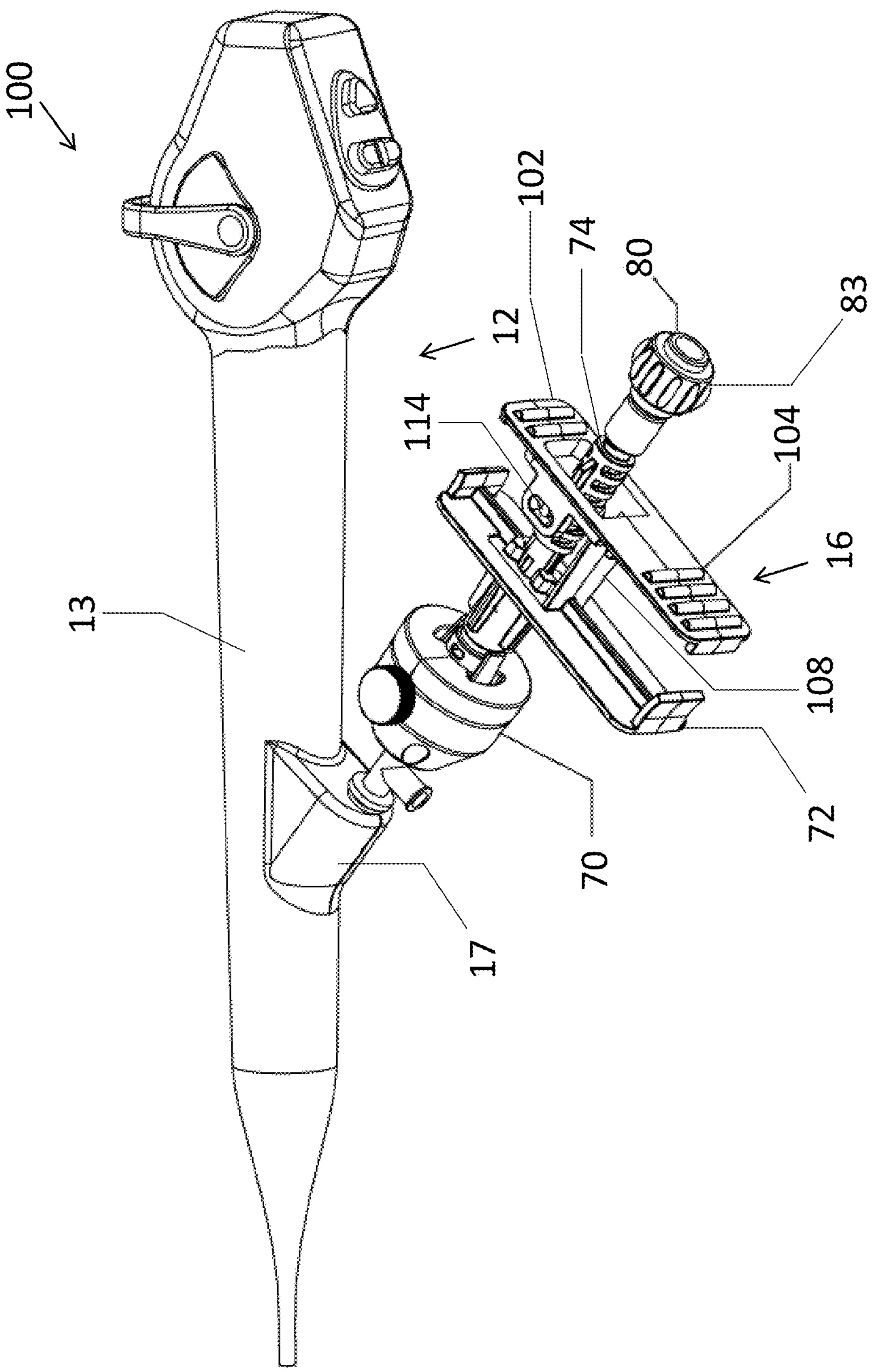
FIG. 50 is a perspective view of an apparatus for endoscopic laser surgery, according to extra embodiments of the present disclosure.

As a second example of a rigid endoscope application, FIGS. 48 and 49 show the user interface 16 configured as a linear slider-based user interface used to control the distal deflection of the laser-sheath assembly 14. When the user interface 16 is slid towards the handle 13 of the endoscope 12 as shown with reference to FIG. 48, the first tube 42 may be pushed with respect to the second tube 44, causing the sheath 18 to deflect in the first direction 24, such that the distal end 19 of the sheath 18 travels along the first path of curvature 25, as shown with reference to FIGS. 2 and 13. When the user interface 16 is slid away from the handle 13 of the endoscope 12 as shown with reference to FIG. 49, the first tube 42 may be pulled with respect to the second tube 44, causing the sheath 18 to deflect in the second direction 26, such that the distal end 19 of the sheath 18 travels along the second path of curvature 27, as shown with reference to FIGS. 2 and 11.

Referring generally to FIGS. 50-61, the user interface 16 is shown, according to further embodiments of the present disclosure. As mentioned above, the user interface 16 may include the first tube mount 74 attached to the first tube 42, and the second tube mount 72 attached to the second tube 44, and further include one or more mechanisms configured to translate the first tube mount 74 relative to the second tube mount 72, thus providing a linear translation of the first tube 42 relative to the second tube 44, and in turn the deflection of the distal end 19 of the sheath 18 discussed above. In some embodiments, such translation of the first tube 42 relative to the second tube 44 is achieved via a living hinge mechanism. For example, the second tube mount 72 may include a living hinge 108 (e.g., a flexural element) spanning away from the handle 13 towards the first tube mount 74. In this sense, the first tube 42 may be mechanically affixed to the first tube mount 74, which include the living hinge 108, which may provide an element (living hinge flexure) that is designed to be flexurally compliant.

In some embodiments, the first tube 42 is attached to a component which is configured to slide axially within the outer tube mount 74. For example, the user interface 16 may further include a sliding cam interface 114 having a dowel pin attached to the first tube mount 74 and a track. The user interface 16 may further include a first trigger 102 (e.g., a lever element) attached to the track and extending from the user interface 16 in a first direction. In some embodiments, and as shown with particular reference to FIGS. 51-53, the user interface 16 may further include a second trigger 104 attached to the track and extending from the user interface 16 in a second direction opposite the first direction. For example, the first and second triggers 102, 104 may be arranged in a see-saw fashion, such that one of the first and second triggers 102, 104 may be pressed towards the second tube mount 72 at a time (while the other is drawn away from the handle second tube mount 72). When one of the first and second triggers 102, 104 are pressed towards the second tube mount 72, the track of the sliding cam interface 114 may be leaned, forcing a linear translation in the dowel pin within the track of the sliding cam interface 114, thus providing a linear translation in the first tube mount 74, and in turn providing a linear translation in the first tube 42 relative to the second tube 44.

Accordingly, when either of the first or second triggers 102, 104 are pressed towards the second tube mount 72, the living hinge 108 may be deformed. As the living hinge 108 is deformed, the second tube mount 72 may thus mechanically interacts the dowel pin of the sliding cam interface 114, which may be affixed to the first tube mount 74, which may slides within the track of the sliding cam interface 114, thereby linearly displacing the first tube 42 with respect to the second tube 44.

Figure 53:
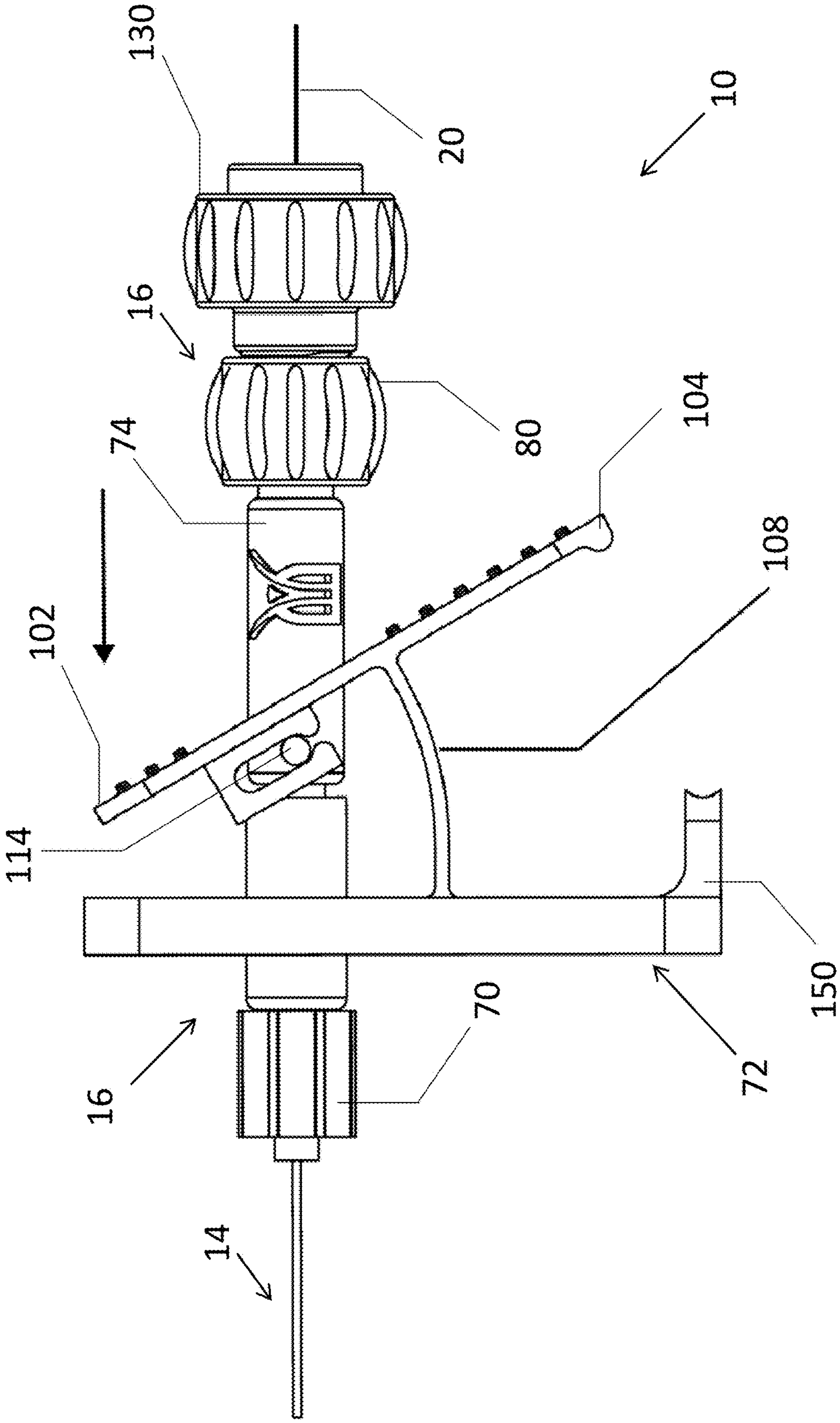
FIG. 53 is a side view of the user interface of FIG. 50 being operated to form a bend in a sheath in a first direction, according to some embodiments of the present disclosure.
Figure 54:
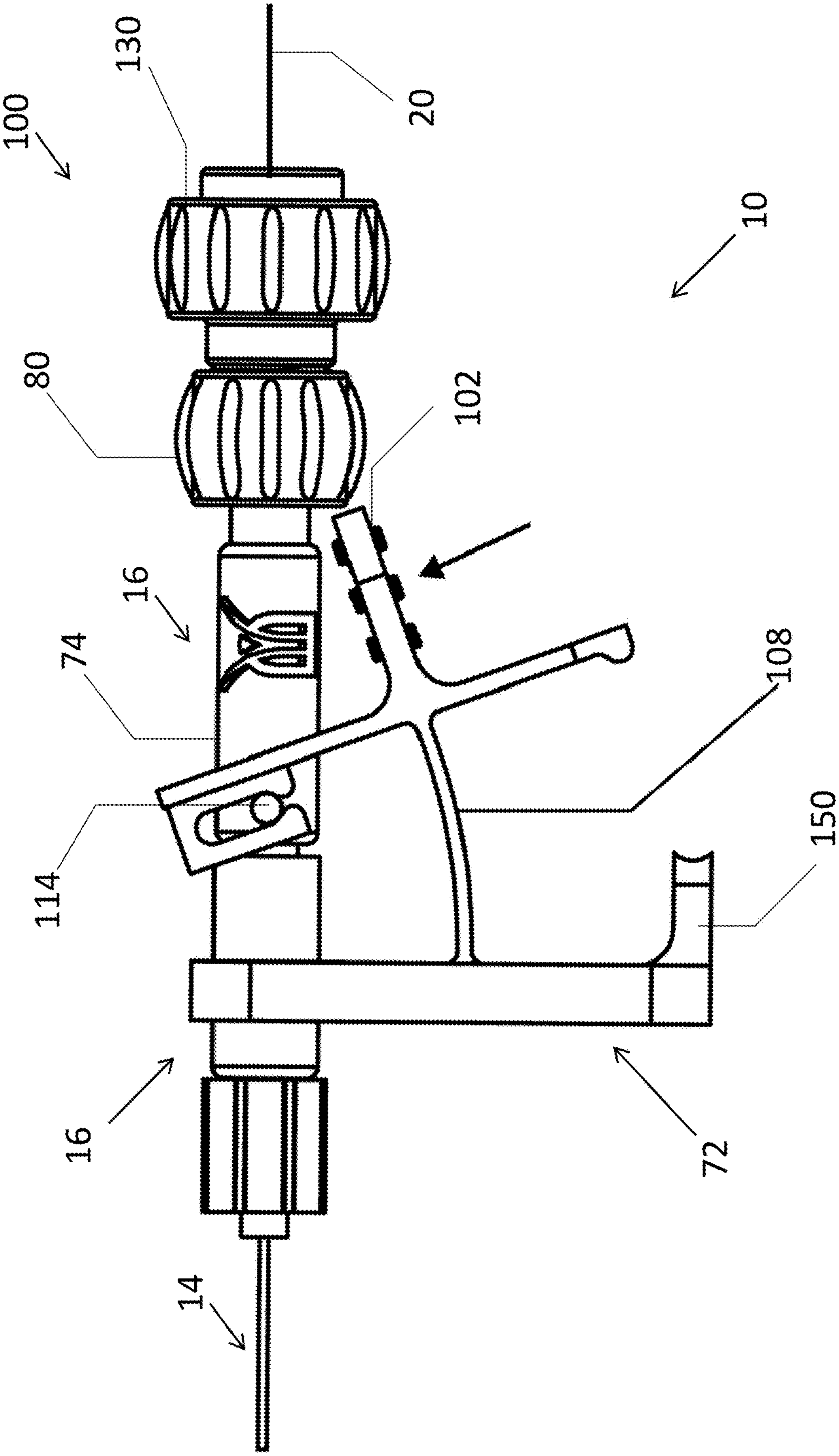
FIG. 54 is a side view of a user interface for an apparatus for endoscopic laser surgery being operated to form a bend in a sheath in a first direction, according to auxiliary embodiments of the present disclosure.
Figure 55:
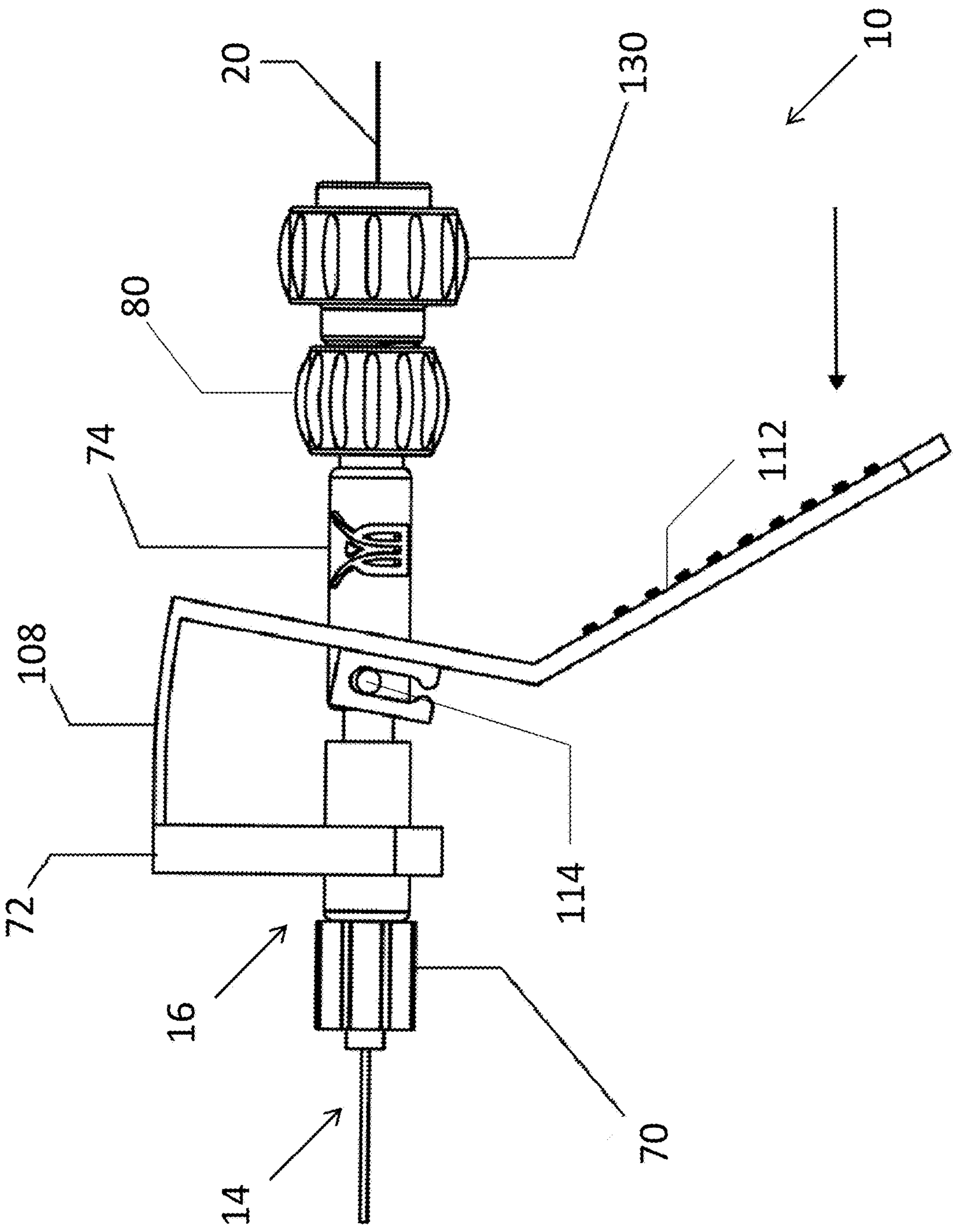
FIG. 55 is a side view of a user interface for an apparatus for endoscopic laser surgery being operated to form a bend in a sheath in a first direction, according to further embodiments of the present disclosure.
Figure 56:
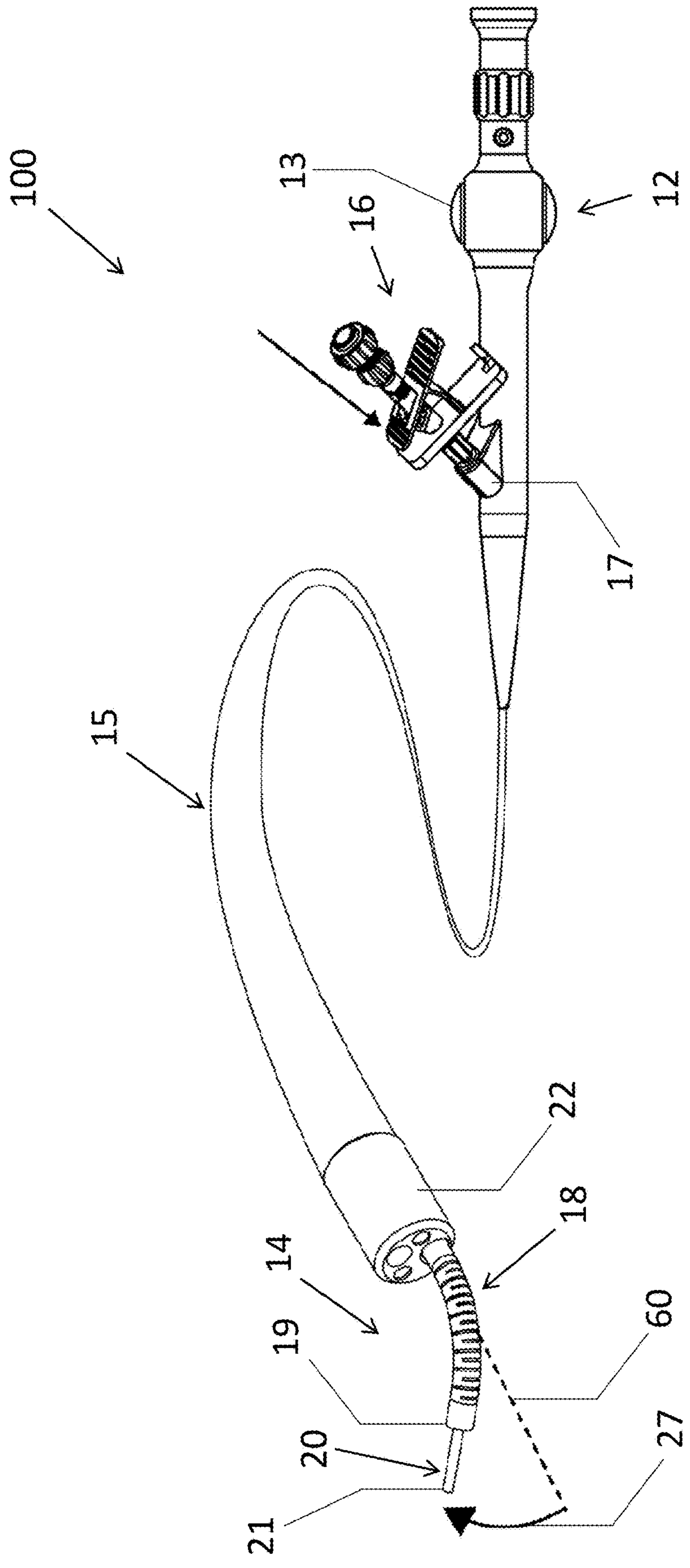
FIG. 56 is a perspective view of an apparatus for endoscopic laser surgery with the user interface of FIG. 50 being operated to form a bend in a sheath in a first direction, according to some embodiments of the present disclosure.

In particular, and as depicted with particular reference to FIGS. 53-55, when a force is applied to the first trigger 102 (thus pressing the first trigger 102 towards the second tube mount 72), a moment is applied to the living hinge 108, causing it to bend and displace the first tube 42 with respect to the second tube 44, causing the sheath 18 to deflect in the first direction 24, such that the distal end 19 of the sheath 18 travels along a first path of curvature 25, as shown with reference to FIGS. 2 and 13, and as further depicted with reference to FIG. 56.

Figure 57:
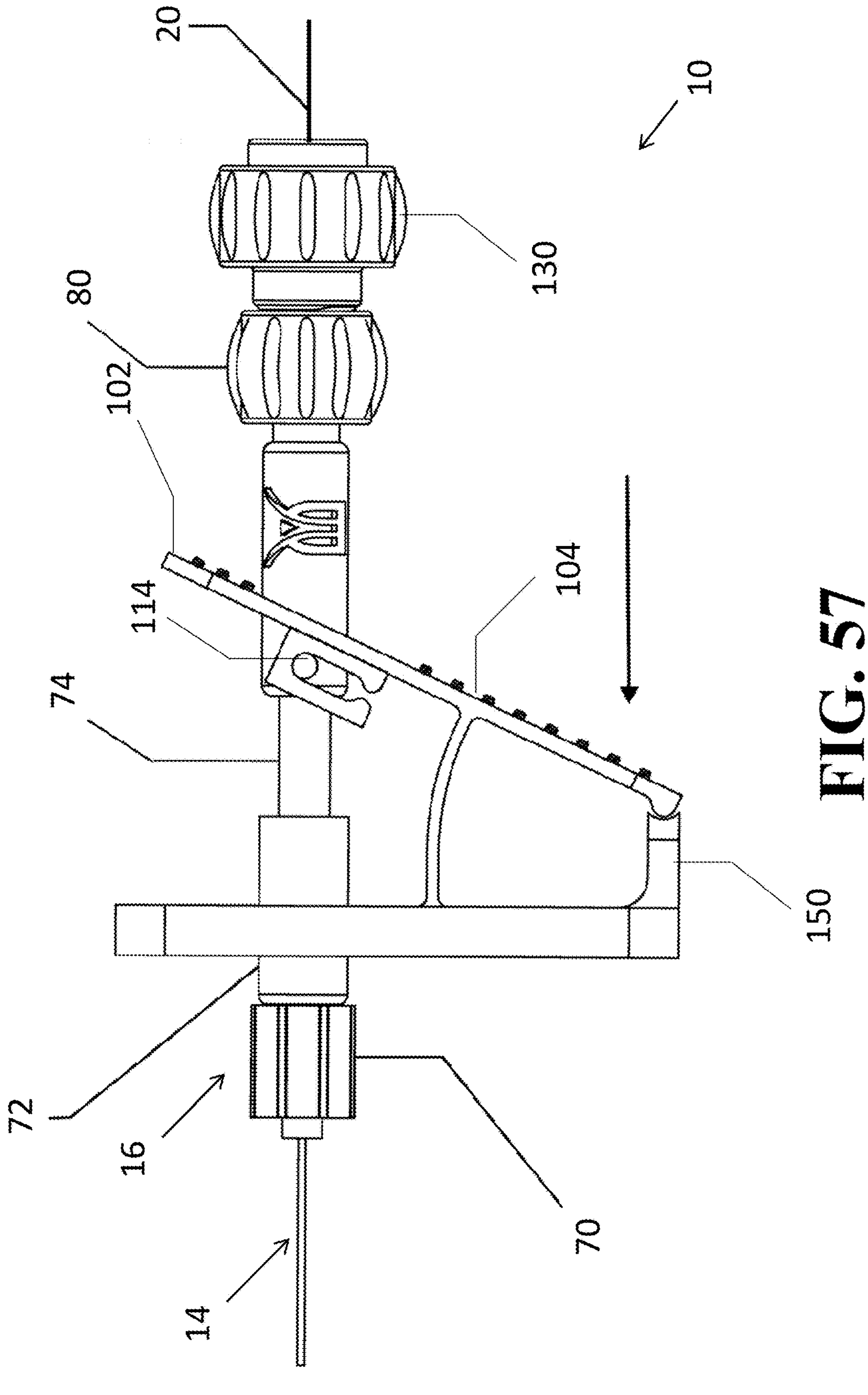
FIG. 57 is a side view of the user interface of FIG. 50 being operated to form a bend in a sheath in a second direction, according to some embodiments of the present disclosure.
Figure 58:
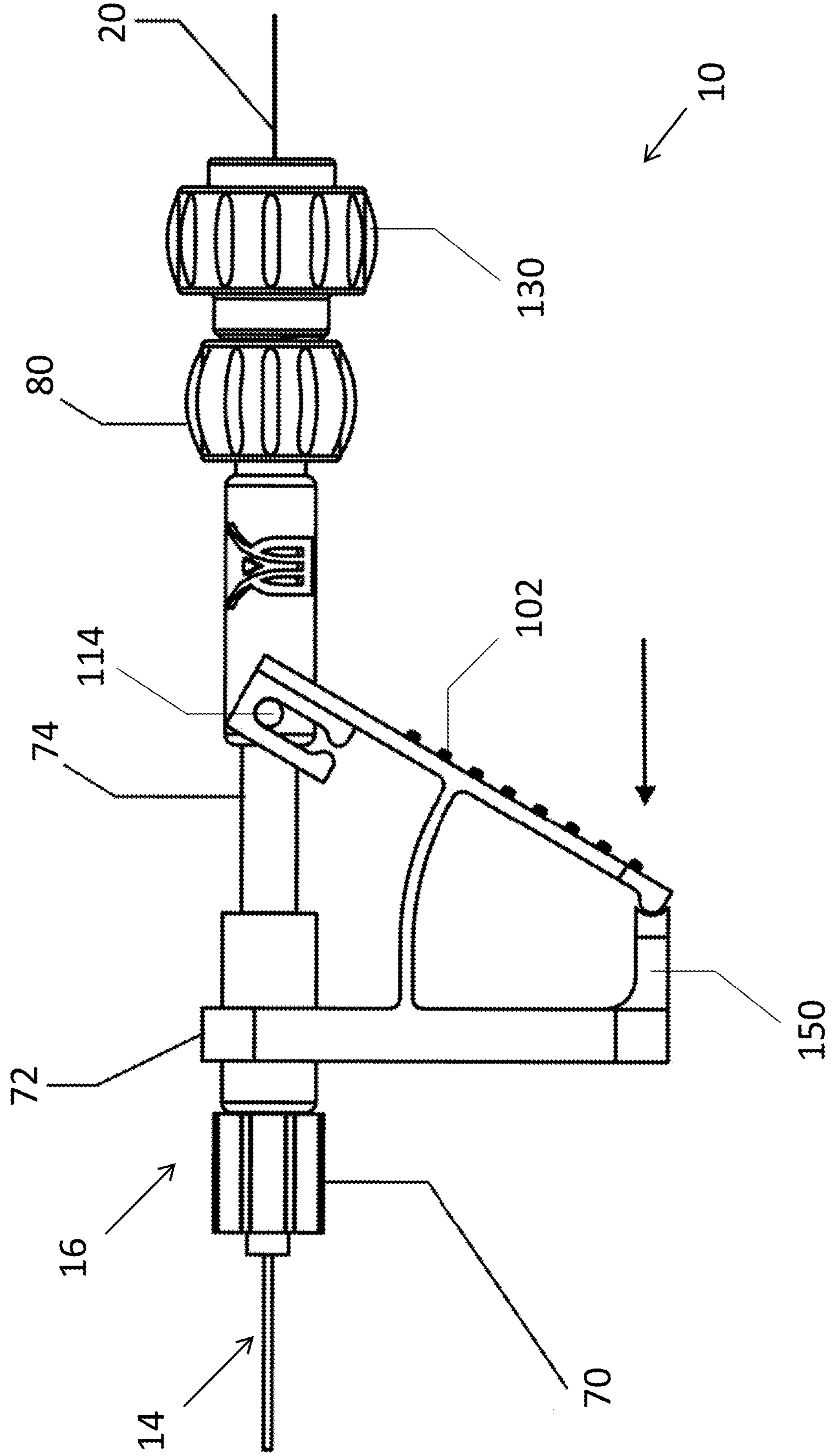
FIG. 58 is a side view of a user interface of an apparatus for endoscope laser surgery being operated to form a bend in a sheath in a second direction, according to supplemental embodiments of the present disclosure.
Figure 59:
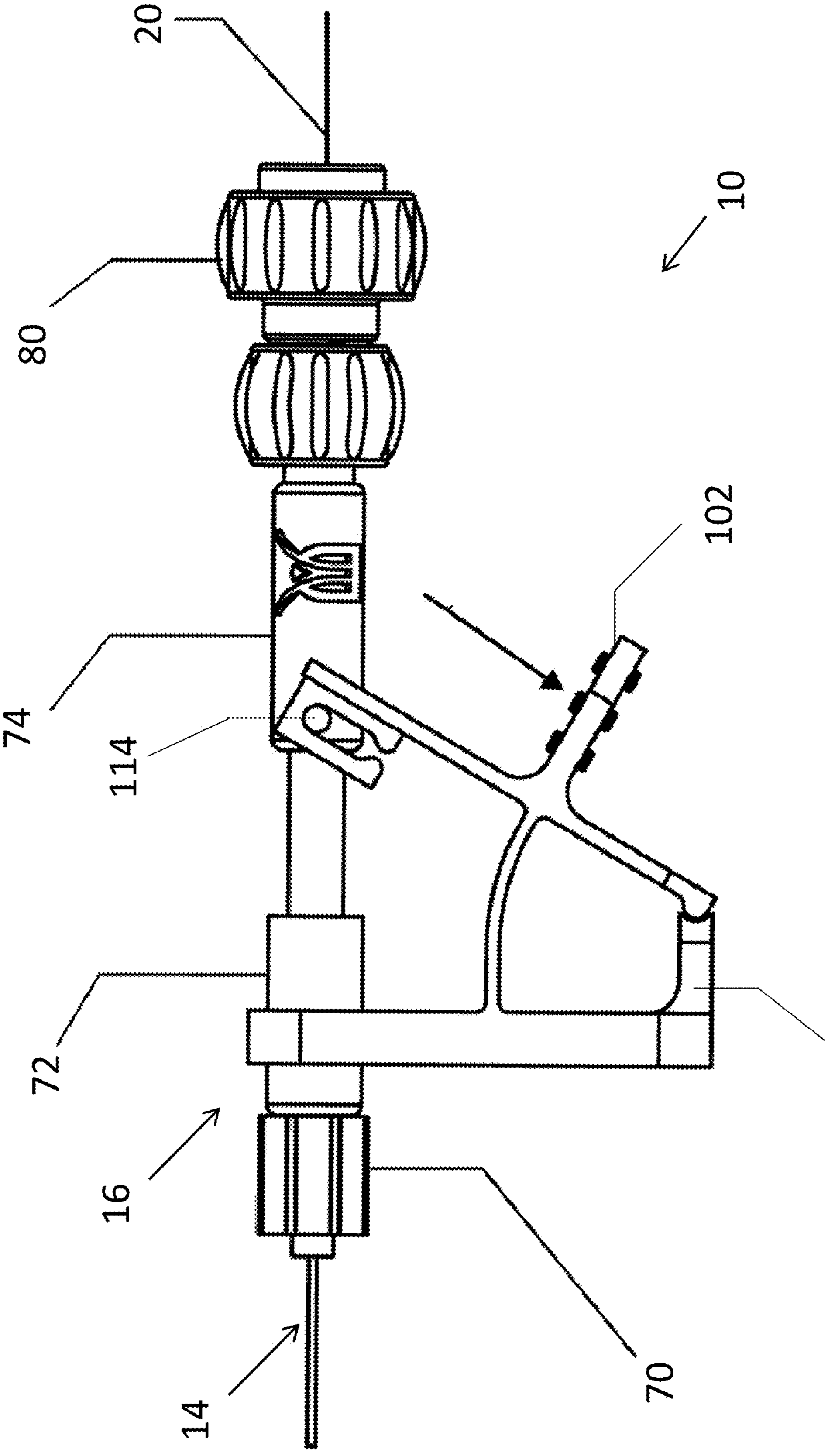
FIG. 59 is a side view of a user interface for an apparatus for endoscope laser surgery being operated to form a bend in a sheath in a second direction, according to accessory embodiments of the present disclosure.
Figure 60:
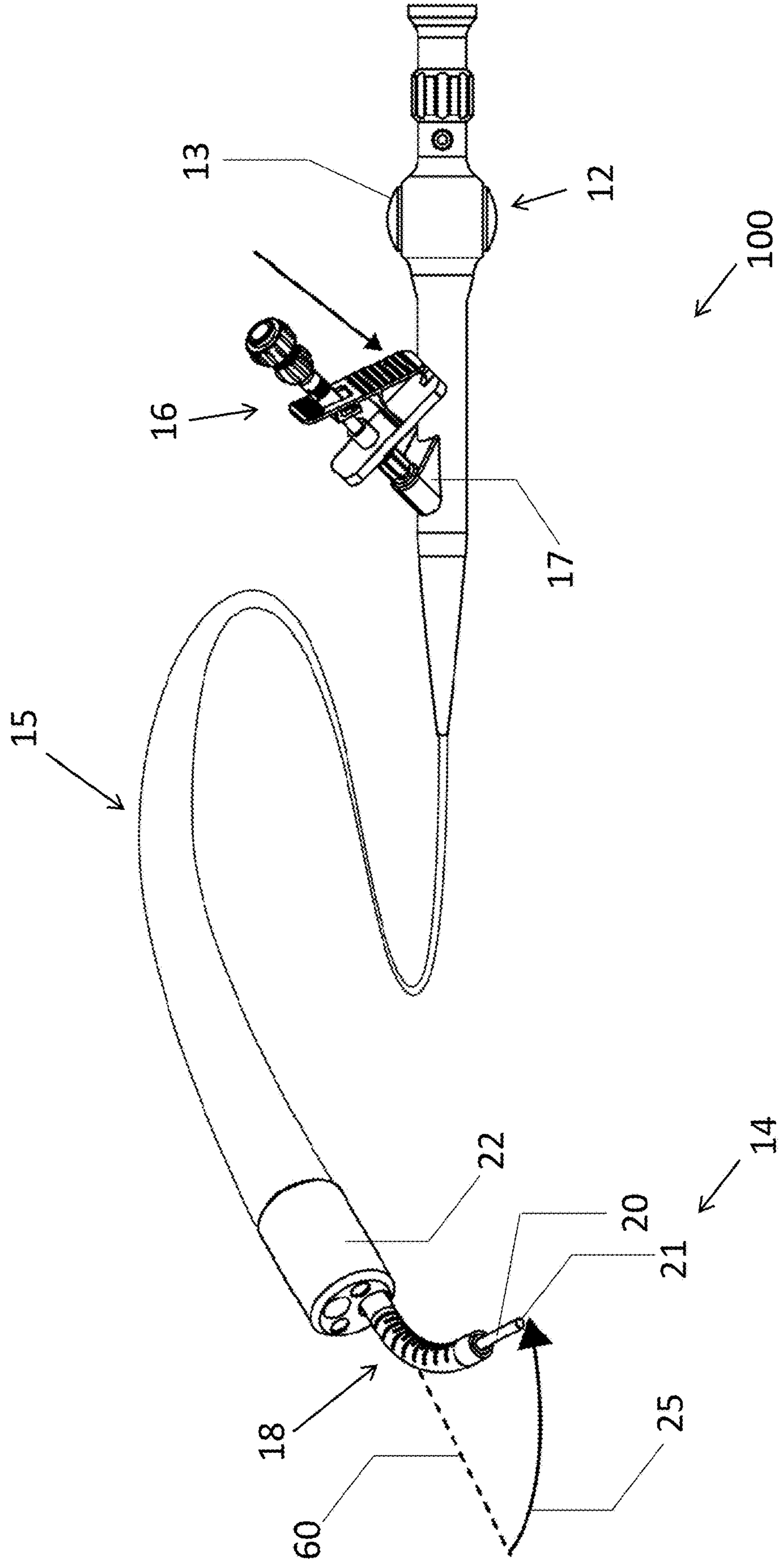
FIG. 60 is a perspective view of an apparatus for endoscopic laser surgery with the user interface of FIG. 50 being operated to form a bend in a sheath in a second direction, according to some embodiments of the present disclosure.

Conversely, and as depicted with particular reference to FIG. 57, if a load is applied to a second trigger 104 (thus pressing the second trigger 104 towards the second tube mount 72), an opposite moment is applied to the living hinge 108, causing it to displace the first tube 42 with respect to the second tube 44 in the opposite direction, causing the sheath 18 to deflect in the second direction 26, such that the distal end 19 of the sheath 18 travels along the second path of curvature 27, as shown with reference to FIGS. 2 and 11, and as further depicted with reference to FIG. 60. In some embodiments, when the user interface 16 does not include the second trigger 104, when the first trigger 102 is pressed towards the second tube mount 72, the sheath 18 may deflect in the second direction 26. In other embodiments, when the user interface 16 does not include the second trigger 104, when the first trigger 102 is pressed towards the second tube mount 72, the sheath 18 may deflect in the first direction 24.

Thus, the user interface 16 may exploit a flexural element (e.g., the living hinge 108) and the sliding cam interface 114 in order to generate the required axial displacement of the first tube 42 with respect to the second tube 44 in order to actuate the steerable tip (e.g., deflect the sheath 18). In some embodiments, and as shown with particular reference to FIGS. 53, 54, and 57, the user interface 16 includes mechanical stops 150 configured to prevent the living hinge 108 from exceeding its strain limit, and also limit the overall deflection of the sheath 18 based on application requirements. For example, the mechanical stop 150 may be disposed on the second tube mount 72.

The first and second triggers 102, 104 may be biased to a neutral position due to the living hinge 108, and the track of the sliding cam interface 114 may be oriented to be positioned in a neutral position contemporaneously with the first and second triggers 102, 104. When the first and second triggers 102, 104 are in a neutral position, the laser-sheath assembly 14 may be in a neutral (uncurved) position. In other words, when a force is removed from either of the first and second triggers 102, 104, the living hinge 108 passively straightens out under its own elasticity, which returns the sheath 18 to its neutral, straight configuration.

In some embodiments, the user interface 16 includes a locking element to prevent the aforementioned passive straightening of the living hinge 108, thus keeping the sheath 18 in a deflected configuration when the user's input force on one of the triggers 102, 104 is removed. For example, the user interface 16 may include a screw-driven clamping surface which can be tightened around the first tube mount 74, preventing it from returning to the neutral configuration when the force is removed. As another example, the user interface 16 may include a ratcheting mechanism that holds the deflection when the force is removed, and releases the deflection via a toggle function.

Figure 61:
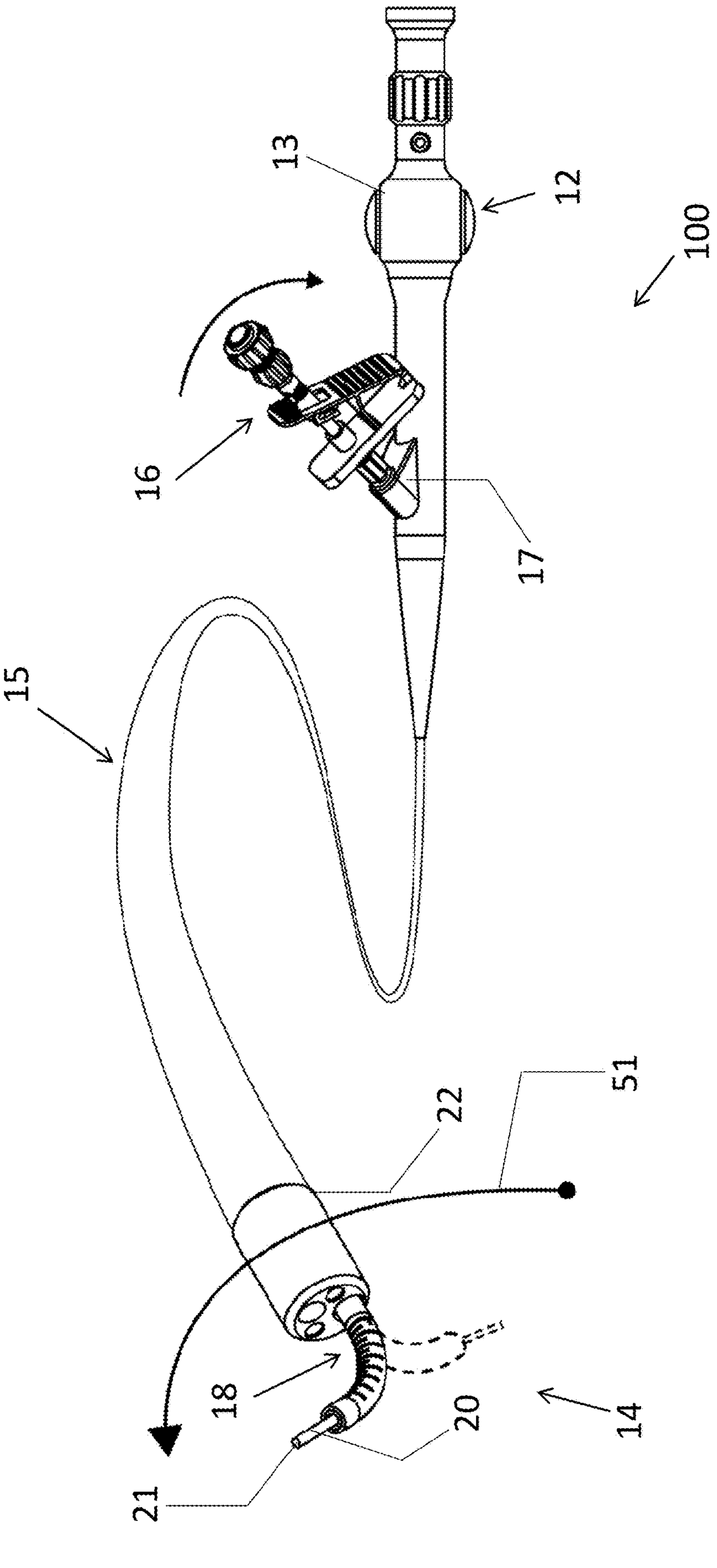
FIG. 61 is a perspective view of an apparatus for endoscopic laser surgery with the user interface of FIG. 50 being operated to rotate a sheath, according to some embodiments of the present disclosure.

Referring particularly to FIG. 61, the user interface 16 is shown being rotated about the working port 17, according to some embodiments of the present disclosure. In some embodiments, the rotation of the distal end 19 of the sheath 18 (e.g., a rotation 51 about the central axis 65 depicted with reference to FIG. 15) is achieved by rotating the user interface 16 about the working port 17. For example, the user may use their free hand to control the rotational orientation of the user interface 16, and thus the sheath 18. In further embodiments, the user interface 16 further includes a rotation collar 130. The rotation collar 130 may be rotatable about the body and other components of the user interface 16. Advantageously, the rotation collar 130 may enable the user to position the orientation of the first and second triggers 102, 104 in an optimal rotational configuration (e.g., such that the user can use their scope-controlling hand to access the first and second triggers 102, 104), lock the lever into place, and then rotate the rotation collar 130 until the deflection plane of the sheath 18 is in an advantageous or more ergonomic orientation.

Figure 51:
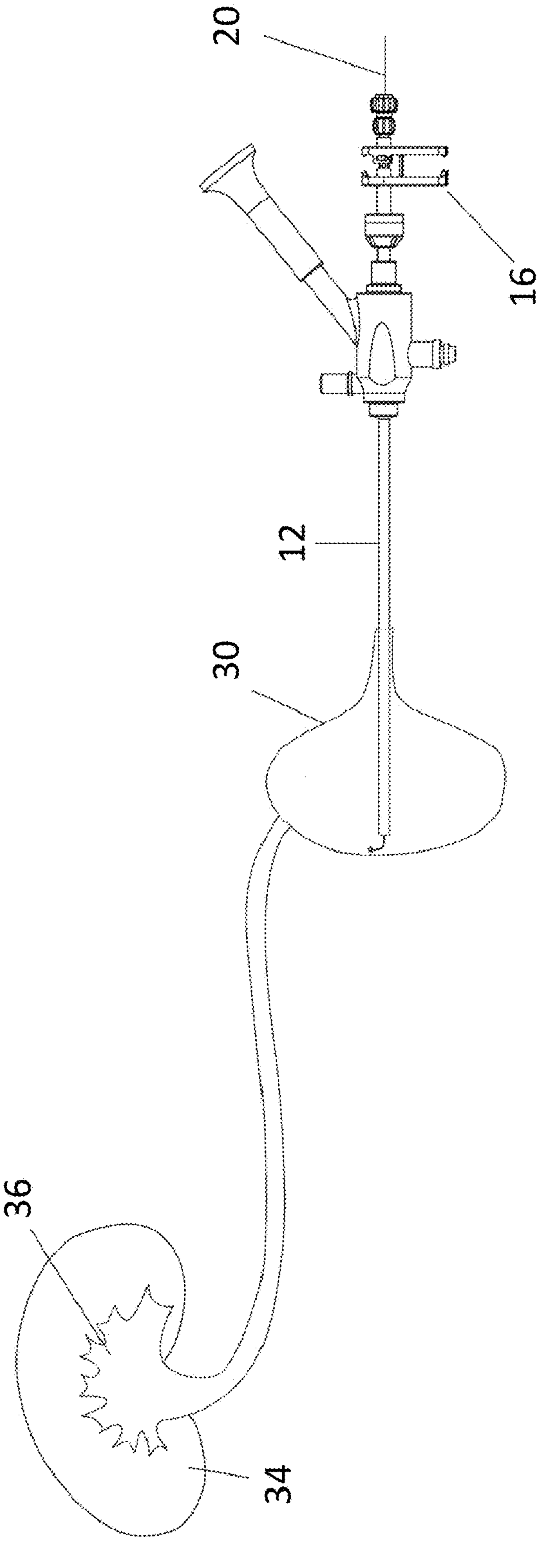
FIG. 51 is a schematic of the user interface of FIG. 50 being used to perform endoscope surgery, according to some embodiments of the present disclosure.
Figure 52:
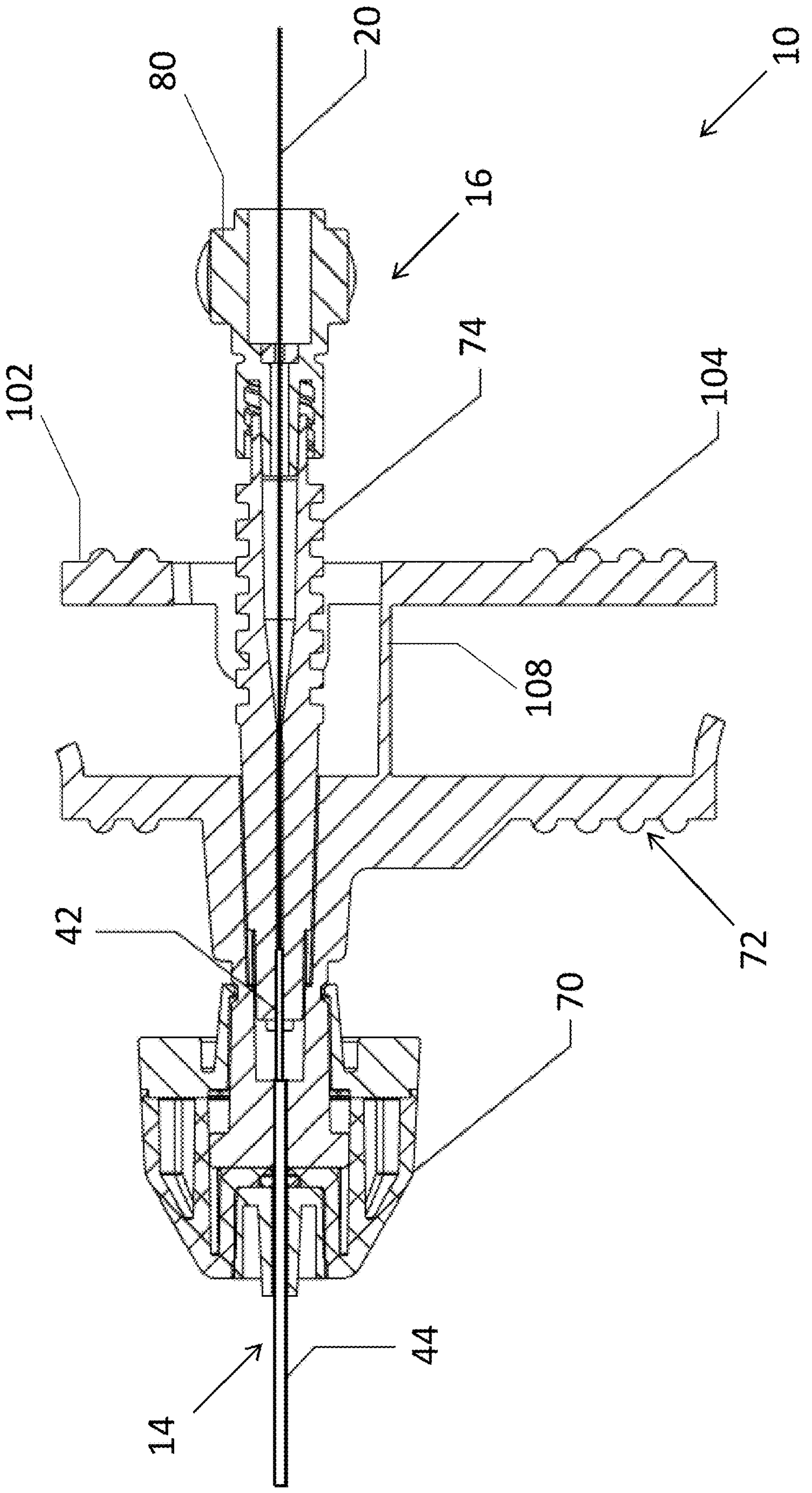
FIG. 52 is a cross sectional view of the user interface of FIG. 50, according to some embodiments of the present disclosure.

Referring particularly to FIG. 51, in addition to being used with flexible endoscopes, this embodiment (e.g., the user interface 16 including the living hinge 108) also has utility when used with rigid endoscopes.

Figure 62:
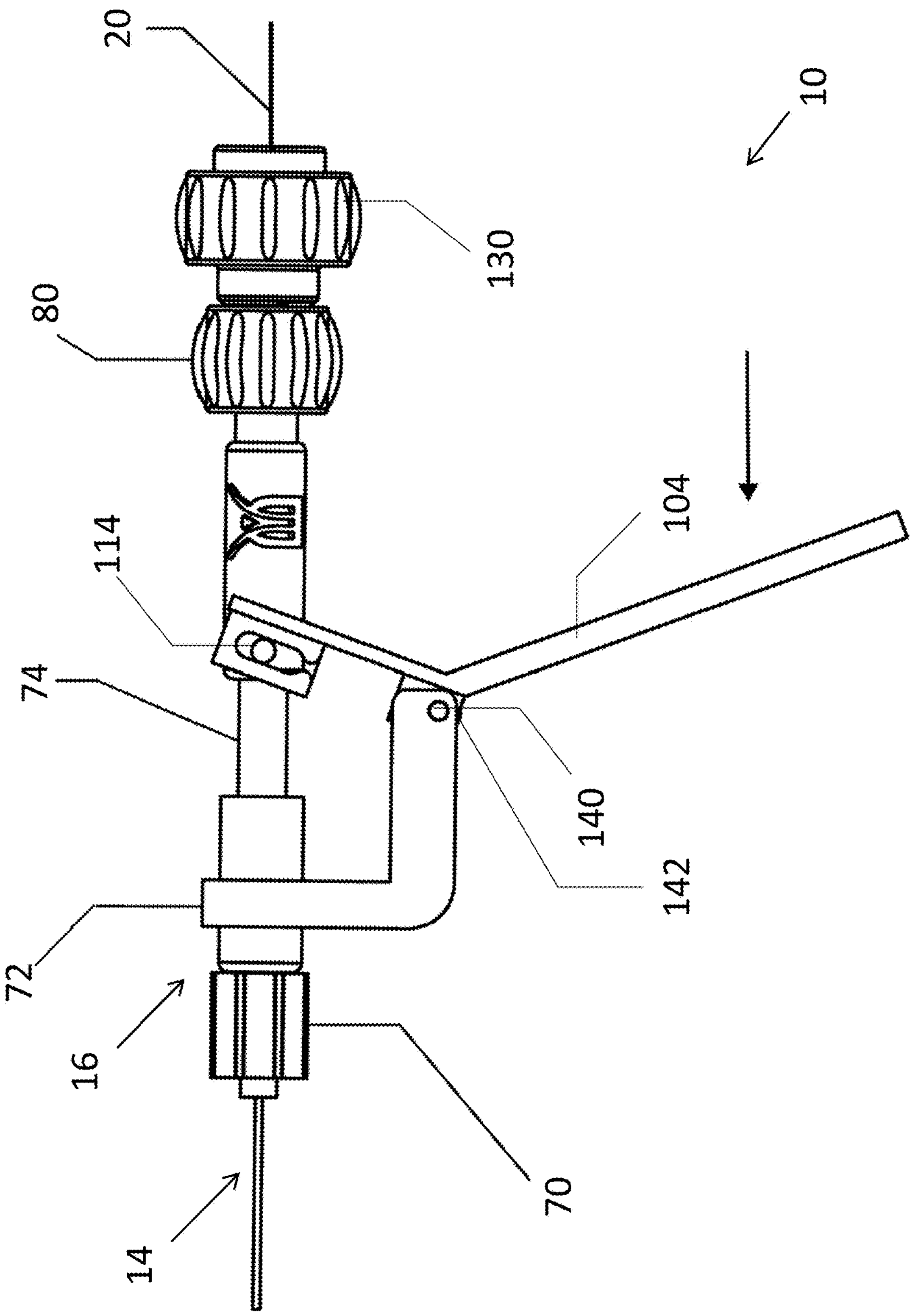
FIG. 62 is a side view of a user interface of an apparatus for endoscopic laser surgery being operated to form a bend in a sheath in a first direction, according to substitute embodiments of the present disclosure.

Referring particularly to FIG. 62, the user interface 16 may include a pin joint 140 and a torsion spring 142 instead of or in addition to the living hinge 108, according to some embodiments of the present disclosure. The torsion spring 142 may be oriented in line with the pin joint 140, such that the torsion spring 142 provides a biasing force similar to the living hinge 108 discussed above. An input force applied to the first trigger 102 may results in a rotation of the first trigger 102 about the pin joint 140, which may cause the first tube 42 to displace with respect to the second tube 44. Removing the force applied to the first trigger 102 may causes the sheath 18 to return to its neutral, straight configuration.

Figure 63:
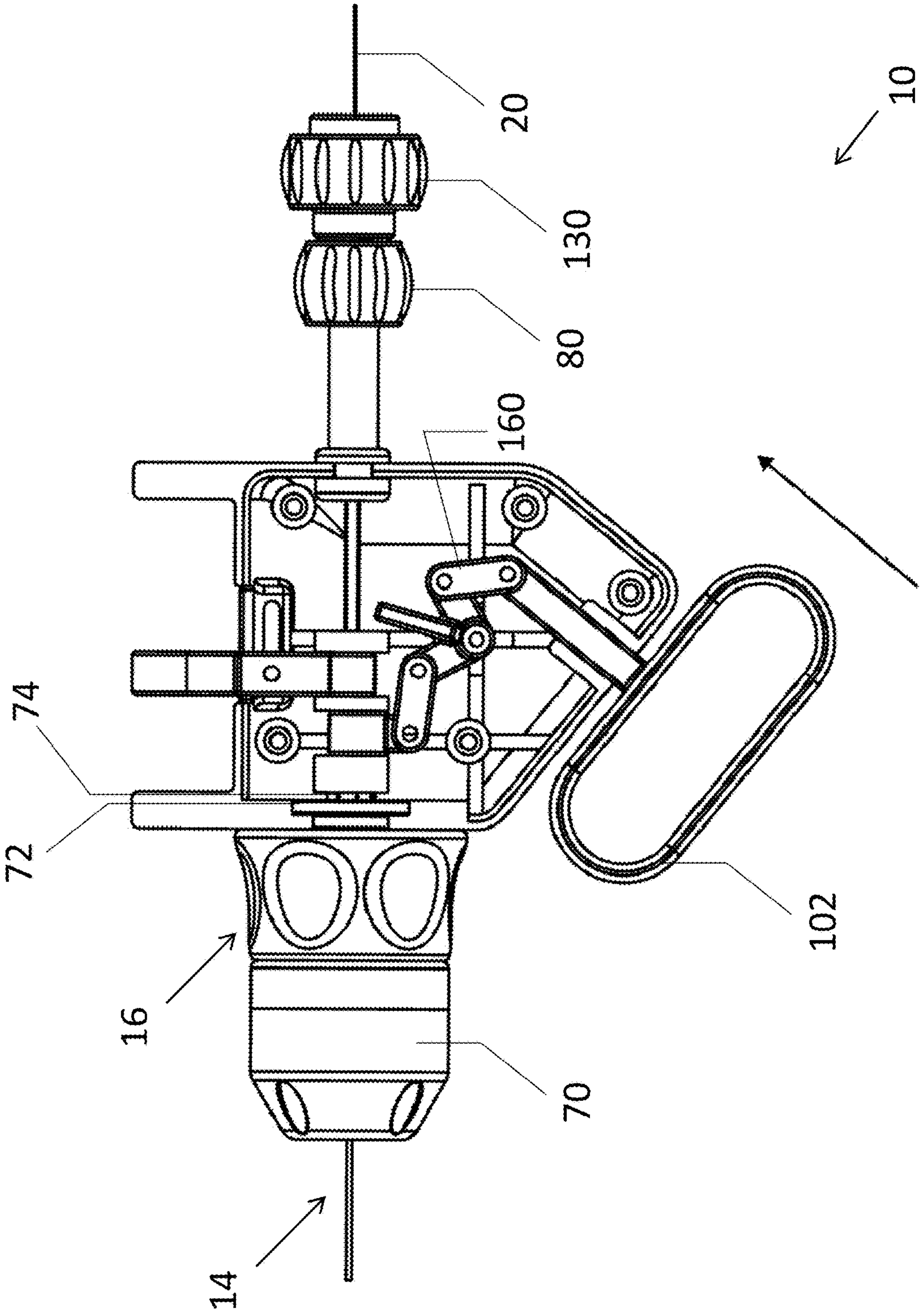
FIG. 63 is a side view of a user interface of an apparatus for endoscopic surgery being operated to form a bend in a sheath in a first direction, according to subsidiary embodiments of the present disclosure.
Figure 64:
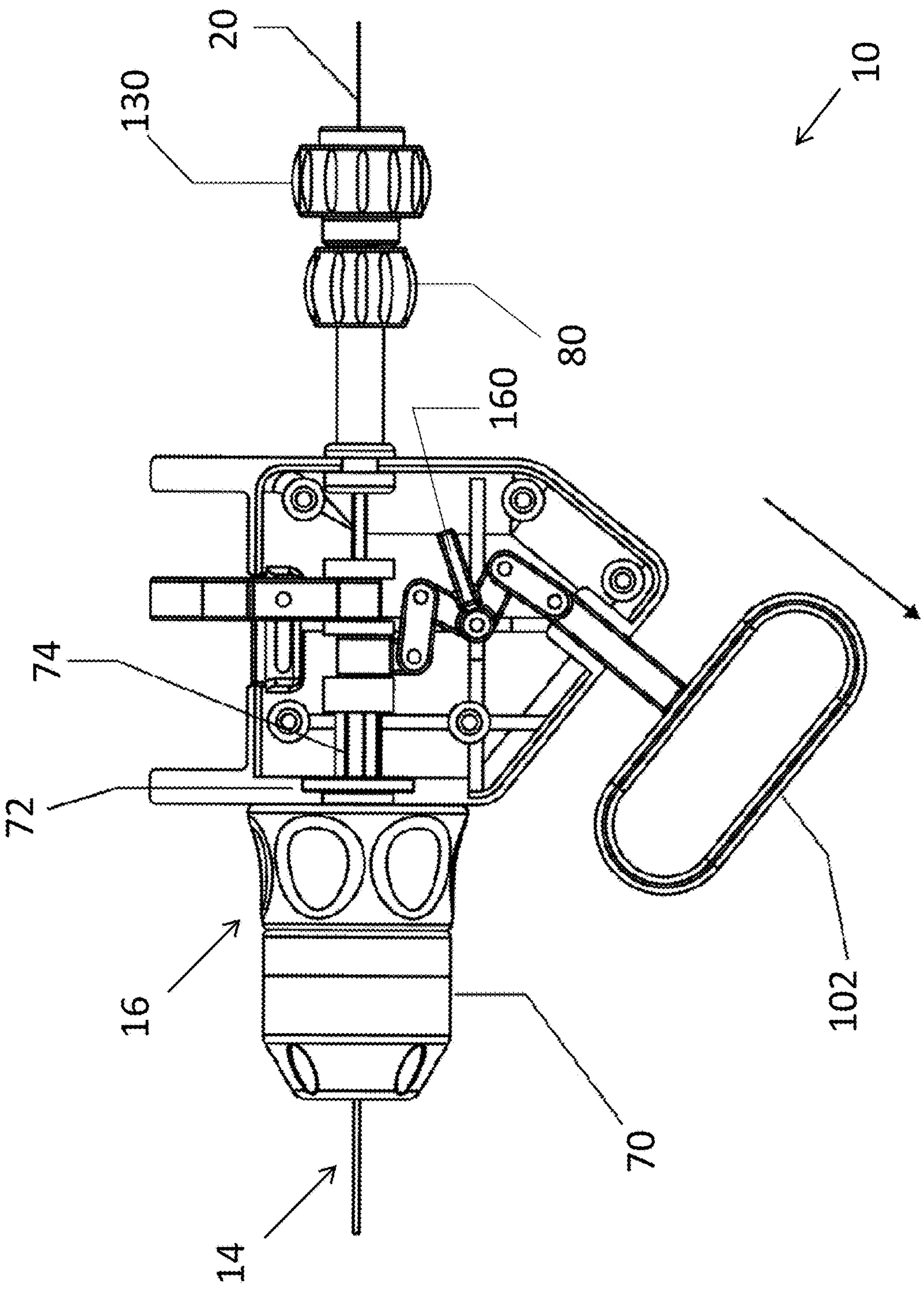
FIG. 64 is a side view of the user interface of FIG. 63 being operated to form a bend in a sheath in a second direction, according to some embodiments of the present disclosure.

Referring now to FIGS. 63 and 64, the user interface 16 may include a linkage system 160, according to some embodiments of the present disclosure. For example, the linear translation of the first tube 42 relative to the outer tube 44 discussed above may be enabled by the linkage system 160. Thus, applying a force/displacement to the first trigger 102 may result in a displacement of the first tube mount 74 with respect to the outer tube mount 74 as dictated by the kinematics of a series of linkages.

In the drawings, not all reference numbers are included in each drawing, for the sake of clarity. In addition, positional terms such as "upper," "lower," "side," "top," "bottom," etc. refer to the apparatus when in the orientation shown in the drawing, or as otherwise described. A person of skill in the art will recognize that the apparatus can assume different orientations when in use.

In accordance with the discussion of the apparatus 100 above, the present disclosure further provides for a method of performing endoscopic surgery. The method may include providing the sheath 18 and the laser fiber 20 disposed in the sheath 18. The method may further include forming a first bend in the sheath 18, wherein forming the first bend causes the distal end 19 of the sheath 18 to be steered toward an anatomical region within a patient. The method may further include advancing the laser fiber 20 relative to the sheath 18. Advancing the laser fiber 20 relative to the sheath 18 may cause the distal tip 21 of the laser fiber 20 to project out of the distal end 19 of the sheath 18, such that the distal tip 21 of the laser fiber 20 is positioned about an object located within the anatomical region. The method may further include transmitting energy along the laser fiber 20 and from the distal tip 21 of the laser fiber 20 to the object.

Thus, although there have been described particular embodiments of the present invention of a new and useful APPARATUSES AND METHODS FOR ENDOSCOPE LASER FIBER STEERING, it is not intended that such references to particular embodiments be construed as limitations upon the scope of this invention.

What is claimed is:

1. An endoscopic apparatus, comprising:

a sheath including a first tube concentrically nested within a second tube; and a laser fiber disposed in the sheath and movable therein along a longitudinal axis of the sheath, the laser fiber including a glass silica core, a cladding layer disposed around the glass silica core, and a distal tip, wherein the sheath is actuable to form a first bend by relative axial translation between the first tube and the second tube, wherein advancing movements of the laser fiber cause the distal tip of the laser fiber to project out of a distal end of the sheath, and wherein, after projection of the distal tip of the laser fiber out of the distal end of the sheath, retreating movements of the laser fiber cause the distal tip of the laser fiber to retract towards the distal end of the sheath.

2. The apparatus of claim 1, wherein the cladding layer is comprised of reflective silica.

3. The apparatus of claim 1, wherein the glass silica core is configured to deliver laser energy.

4. The apparatus of claim 1, wherein the first tube includes a first deflectable section, the second tube includes a second deflectable section, the first and second deflectable portions being selectively weakened portions of the first and second tubes that are angularly oriented, relative to a longitudinal axis of the sheath, in directions that are offset from each other by an angle equal to or less than one-hundred and eighty degrees, and wherein the first and second tubes are joined at a location distal to the first and second deflectable portions.

5. The apparatus of claim 4, wherein the first tube further includes a third deflectable section, the second tube includes a fourth deflectable section, the third and fourth deflectable sections being selectively weakened portions of the first and second tubes that are angularly oriented, relative to the longitudinal axis of the sheath, in directions that are offset from each other by the angle equal to or less than one-hundred and eighty degrees, wherein the location at which the first and second tubes are joined is distal to the third and fourth deflectable sections, and wherein the sheath is actuable to form a second bend by the relative axial translation between the first tube and the second tube.

6. The apparatus of claim 5, wherein the first bend is in an opposite direction of the second bend.

7. The apparatus of claim 6, wherein the sheath includes a rigid section located proximal relative to the first and third deflectable sections of the first tube, and the second and fourth deflectable sections of the second tube.

8. An endoscopic apparatus, comprising:

a sheath including a first tube concentrically nested within a second tube; and a laser fiber disposed in the sheath and movable therein along a longitudinal axis of the sheath, wherein the first tube includes a first deflectable section, the second tube includes a second deflectable section, the first and second deflectable sections being selectively weakened portions of the first and second tubes that are angularly oriented, relative to a longitudinal axis of the sheath, in directions that are offset from each other by an angle equal to or less than one-hundred and eighty degrees, wherein the first and second tubes are joined at a location distal to the first and second deflectable sections, wherein the sheath is actuable to form a first bend by relative axial translation between the first tube and the second tube, wherein advancing movements of the laser fiber cause a distal tip of the laser fiber to project out of a distal end of the sheath, and wherein, after projection of the distal tip of the laser fiber out of the distal end of the sheath, retreating movements of the laser fiber cause the distal tip of the laser fiber to retract towards the distal end of the sheath.

9. The apparatus of claim 8, wherein the laser fiber includes a glass silica core.

10. The apparatus of claim 9, wherein the glass silica core is configured to deliver laser energy.

11. The apparatus of claim 9, wherein the laser fiber includes a cladding layer disposed around the glass silica core, the cladding layer comprised of reflective silica.

12. The apparatus of claim 8, wherein the first tube further includes a third deflectable section, the second tube includes a fourth deflectable section, the third and fourth deflectable sections being selectively weakened portions of the first and second tubes that are angularly oriented, relative to the longitudinal axis of the sheath, in directions that are offset from each other by the angle equal to or less than one-hundred and eighty degrees, wherein the location at which the first and second tubes are joined is distal to the third and fourth deflectable sections, and wherein the sheath is actuable to form a second bend by the relative axial translation between the first tube and the second tube.

13. The apparatus of claim 12, wherein the first bend is in an opposite direction of the second bend.

14. The apparatus of claim 8, wherein the sheath includes a rigid section located proximal relative to the first deflectable section of the first tube and the second deflectable section of the second tube.

15. A method of performing endoscopic surgery, comprising:

providing a sheath and a laser fiber disposed in the sheath;

forming a first bend in the sheath, wherein forming the first bend causes a distal end of the sheath to be steered toward an anatomical region within a patient;

advancing the laser fiber relative to the sheath, wherein advancing the laser fiber relative to the sheath causes a distal tip of the laser fiber to project out of the distal end of the sheath, such that the distal tip of the laser fiber is positioned about an object located within the anatomical region;

transmitting energy along the laser fiber and from the distal tip of the laser fiber to the object; and after projection of the distal tip of the laser fiber out of the distal end of the sheath, retreating the laser fiber relative to the sheath, wherein retreating the laser fiber relative to the sheath causes the distal tip of the laser fiber to retract toward the distal end of the sheath.

16. The method of claim 15, wherein sheath includes a first tube concentrically nested within a second tube.

17. The method of claim 16, wherein the first tube includes a first deflectable section, the second tube includes a second deflectable section, the first and second deflectable sections being selectively weakened portions of the first and second tubes that are angularly oriented, relative to a longitudinal axis of the sheath, in directions that are offset from each other by an angle equal to or less than one-hundred and eighty degrees, wherein the first and second tubes are joined at a location distal to the first and second deflectable sections, and wherein the sheath is actuable to form the first bend by relative axial translation between the first tube and the second tube.

18. The method of claim 15, wherein the laser fiber includes a glass silica core.

19. The method of claim 18, wherein the glass silica core is configured to deliver laser energy.

20. The method of claim 19, wherein the laser fiber includes a cladding layer disposed around the glass silica core, the cladding layer comprised of reflective silica.

* * * * *